(12) United States Patent
Lee et al.

(10) Patent No.: US 9,247,192 B2
(45) Date of Patent: Jan. 26, 2016

(54) MOBILE TERMINAL AND AUDIO ZOOMING METHOD THEREOF

(71) Applicant: LG ELECTRONICS INC., Seoul (KR)

(72) Inventors: Keansub Lee, Seoul (KR); Hosung Song, Seoul (KR); Yonghee Lee, Seoul (KR); Youngjoo Son, Seoul (KR); Joontae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 13/925,439

(22) Filed: Jun. 24, 2013

(65) Prior Publication Data

US 2013/0342731 A1    Dec. 26, 2013

(30) Foreign Application Priority Data

Jun. 25, 2012  (KR) .................. 10-2012-0068205
Jun. 25, 2012  (KR) .................. 10-2012-0068210
Jun. 25, 2012  (KR) .................. 10-2012-0068212

(51) Int. Cl.

| H04N 5/225 | (2006.01) |
| H04N 5/77 | (2006.01) |
| H04R 5/04 | (2006.01) |
| H04S 7/00 | (2006.01) |
| H04N 5/232 | (2006.01) |
| H04N 9/804 | (2006.01) |
| H04N 9/82 | (2006.01) |

(Continued)

(52) U.S. Cl.
CPC ........... *H04N 5/772* (2013.01); *H04N 5/23229* (2013.01); *H04N 5/23293* (2013.01); *H04N 9/8042* (2013.01); *H04N 9/8211* (2013.01); *H04R 5/04* (2013.01); *H04S 7/30* (2013.01); *H04R 1/406* (2013.01); *H04R 3/005* (2013.01); *H04R 2201/401* (2013.01); *H04R 2499/11* (2013.01); *H04S 2400/11* (2013.01); *H04S 2400/15* (2013.01); *H04S 2420/01* (2013.01)

(58) Field of Classification Search
CPC ....................................................... H04R 5/04
USPC ................................................... 348/207.99
See application file for complete search history.

(56) References Cited

U.S. PATENT DOCUMENTS

| 2003/0165084 A1 | 9/2003 | Blair et al. |
| 2010/0123785 A1 | 5/2010 | Chen et al. |

(Continued)

FOREIGN PATENT DOCUMENTS

| CN | 1650618 A | 8/2005 |
| EP | 1 526 756 A2 | 4/2005 |

(Continued)

*Primary Examiner* — Tuan Ho
(74) *Attorney, Agent, or Firm* — Birch, Stewart, Kolasch & Birch, LLP

(57) ABSTRACT

The present disclosure relates to a mobile terminal and an audio zooming method thereof capable of effectively capturing audio based on an image while capturing and reproducing video. According to the present disclosure, if an event for changing the capture location or range or capture mode of a subject occurs when capturing the subject while capturing the sound of the subject in a predetermined sound capture range, the sound of the subject may be captured by changing a sound capture angle and automatically controlling a sound capture range according to the relevant event, and if an event for changing the capture location or range or capture mode of a subject occurs, the sound of the subject may be captured by automatically controlling a sound capture range according to the event.

27 Claims, 53 Drawing Sheets

(51) Int. Cl.
*H04R 1/40* (2006.01)
*H04R 3/00* (2006.01)

(56) References Cited

U.S. PATENT DOCUMENTS

2011/0085061 A1   4/2011   Kim
2011/0317023 A1   12/2011  Tsuda et al.
2012/0019689 A1   1/2012   Zurek et al.
2012/0076304 A1   3/2012   Suzuki
2013/0343572 A1*  12/2013  Lee et al. .................. 381/92

FOREIGN PATENT DOCUMENTS

EP     EP 2 129 112 A1    12/2009
WO    WO 2011/064438 A1   6/2011

* cited by examiner

[LANDSCAPE MODE]

[PORTRAIT MODE]

[SCREEN ZOOM LINK MODE]

DISPLAY PLURALITY OF
SOUND CAPTURE RANGES

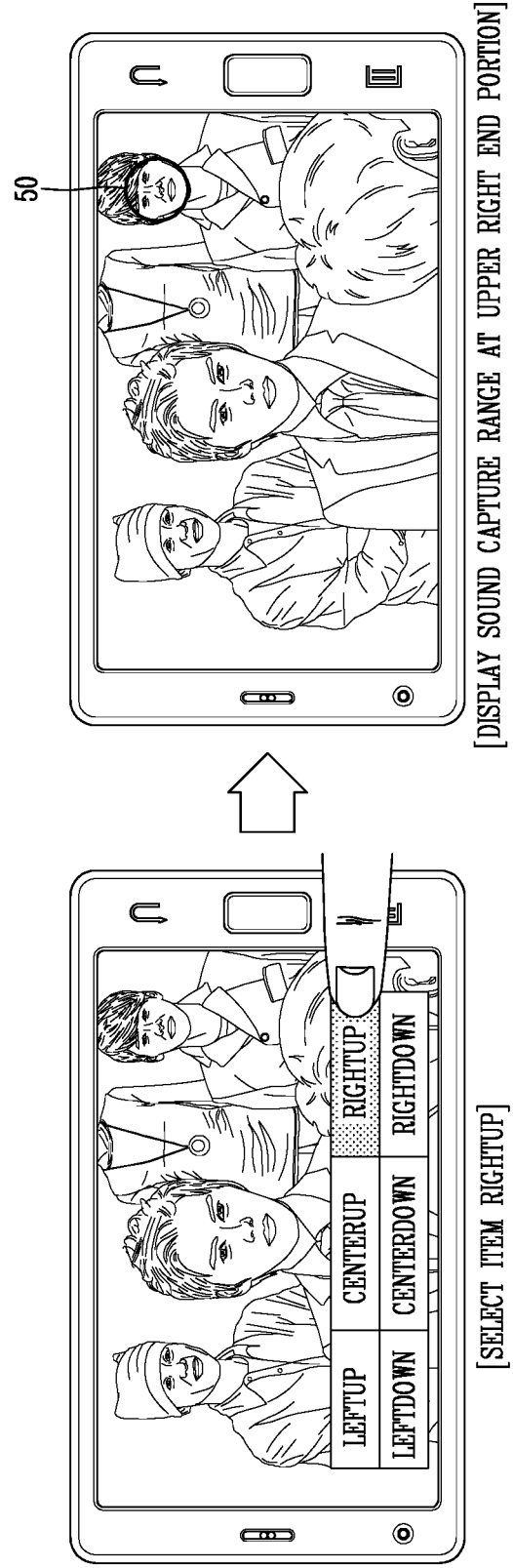

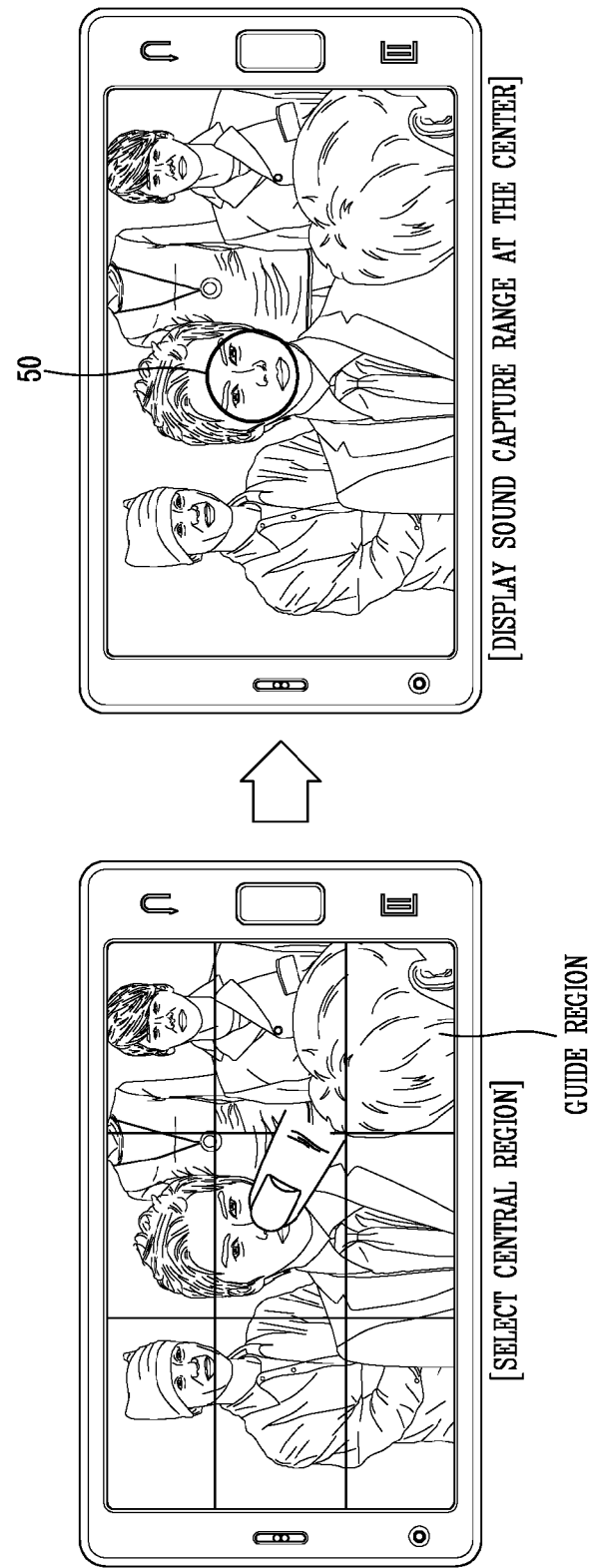

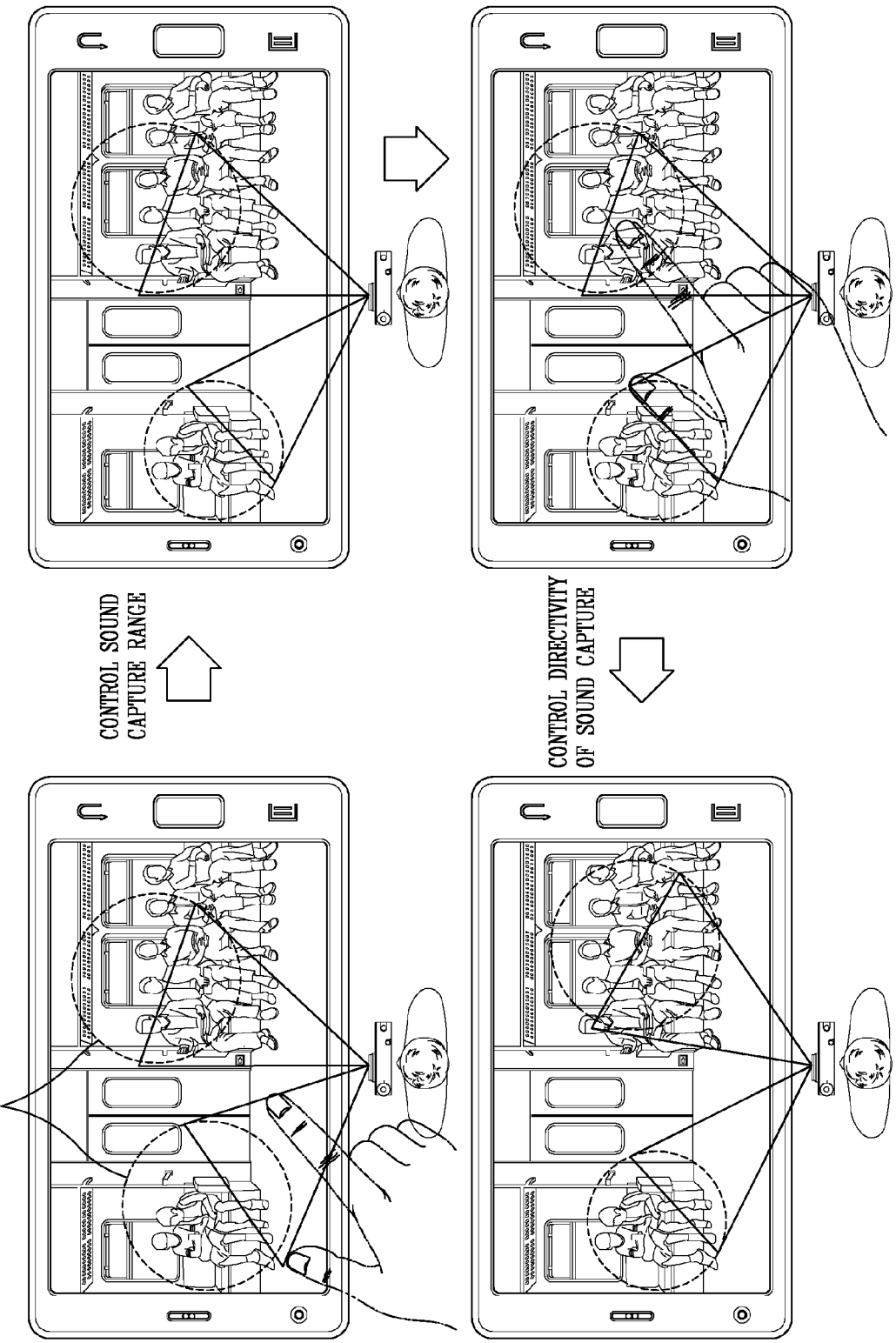

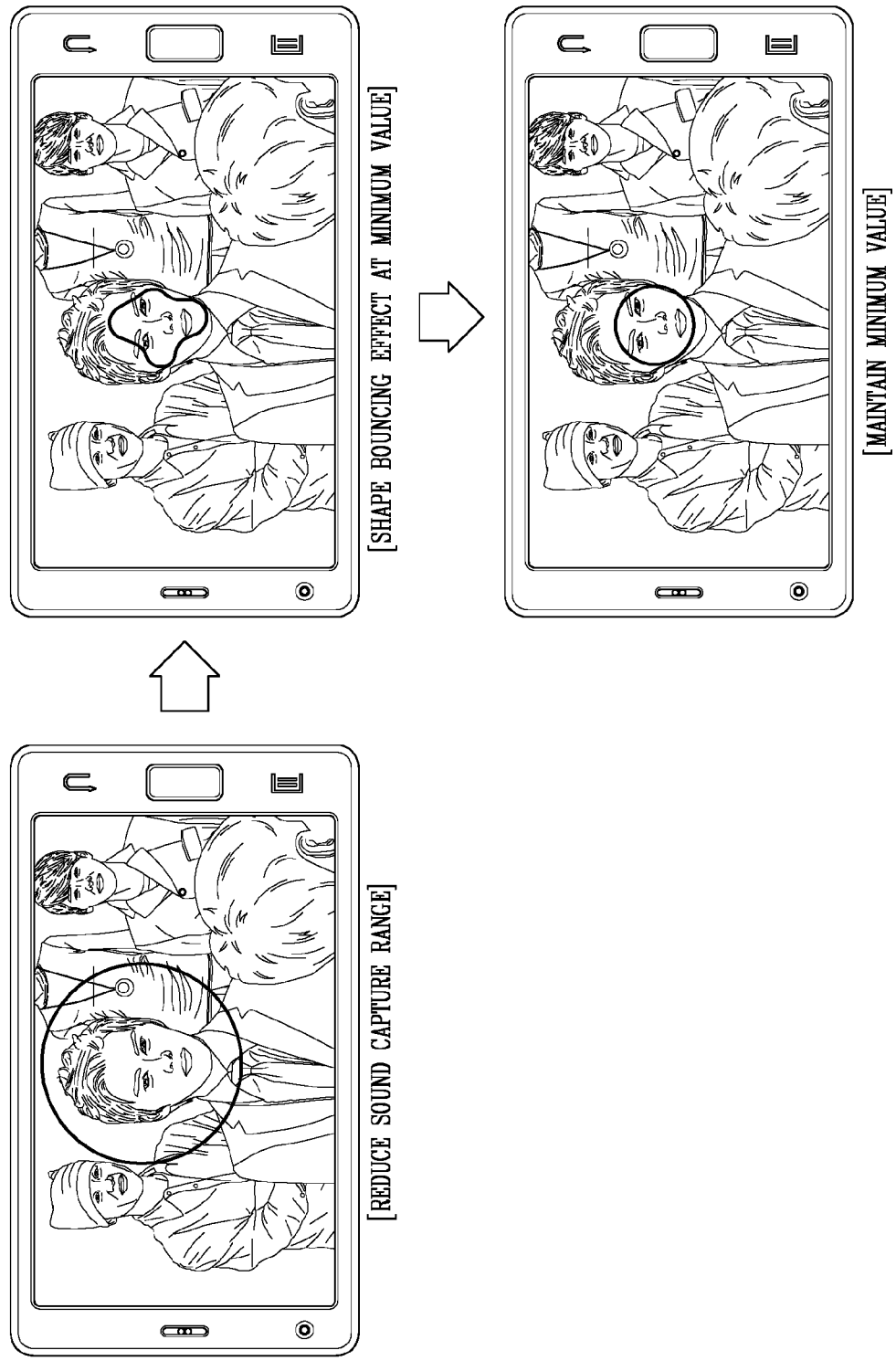

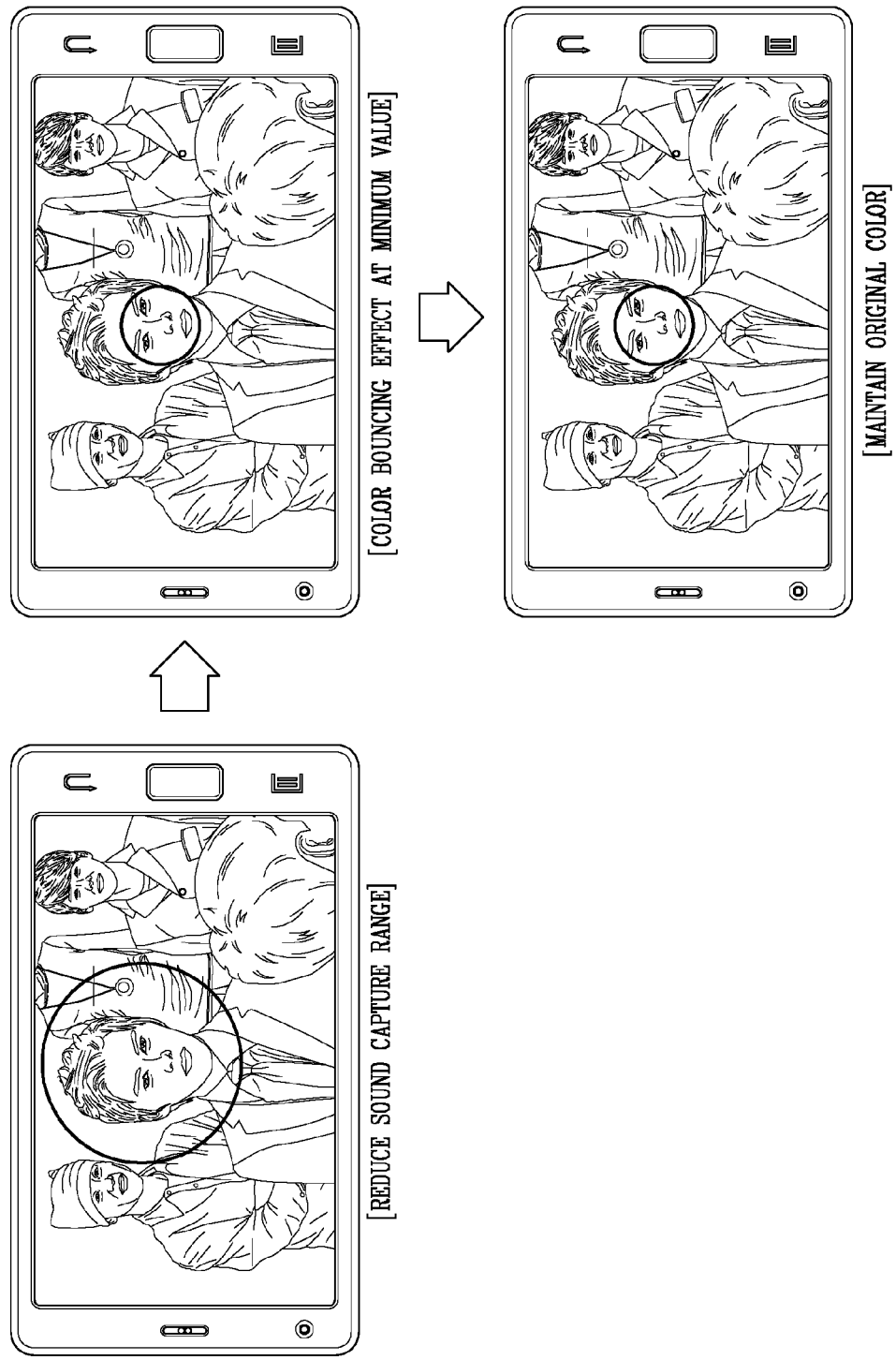

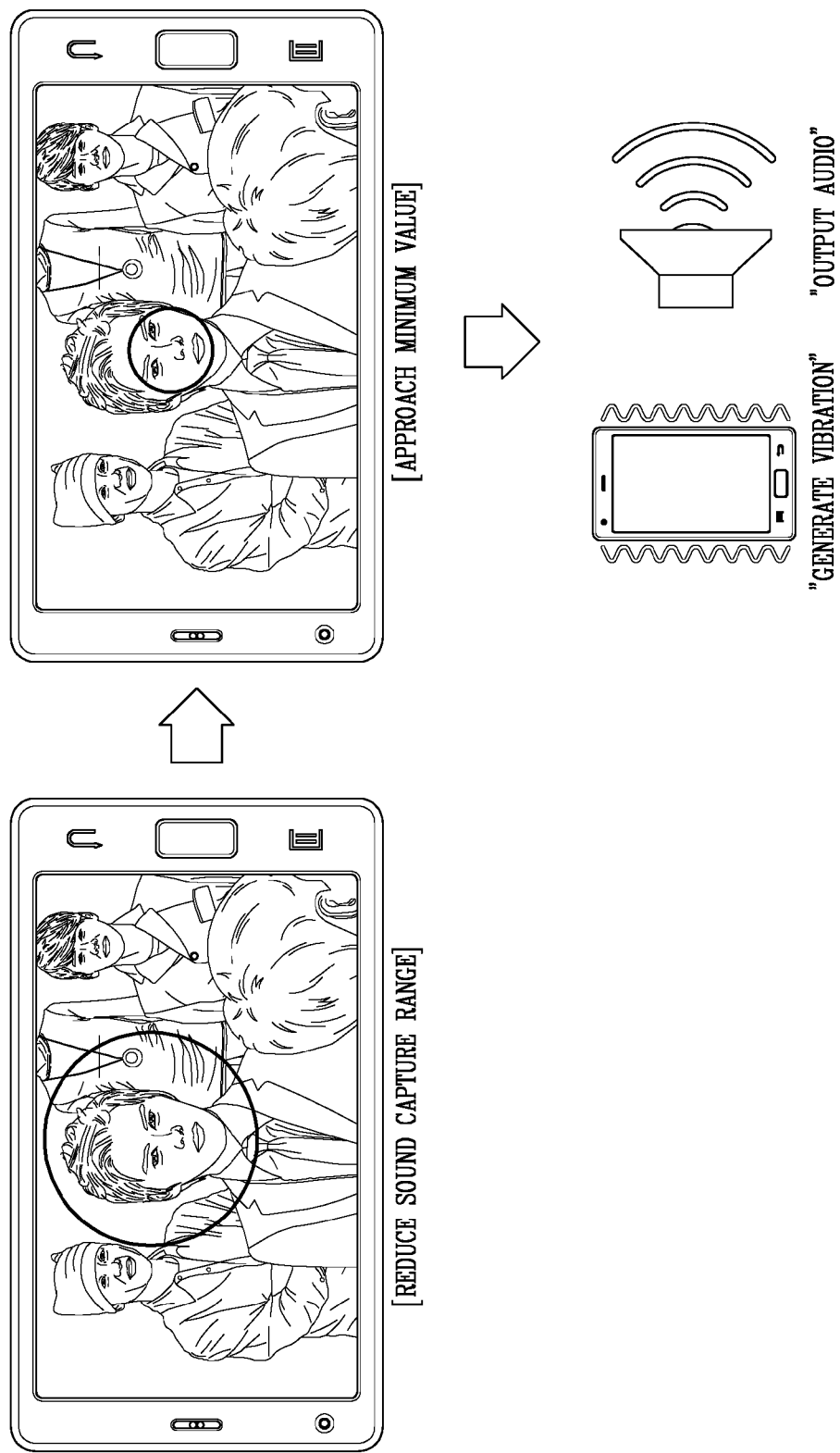

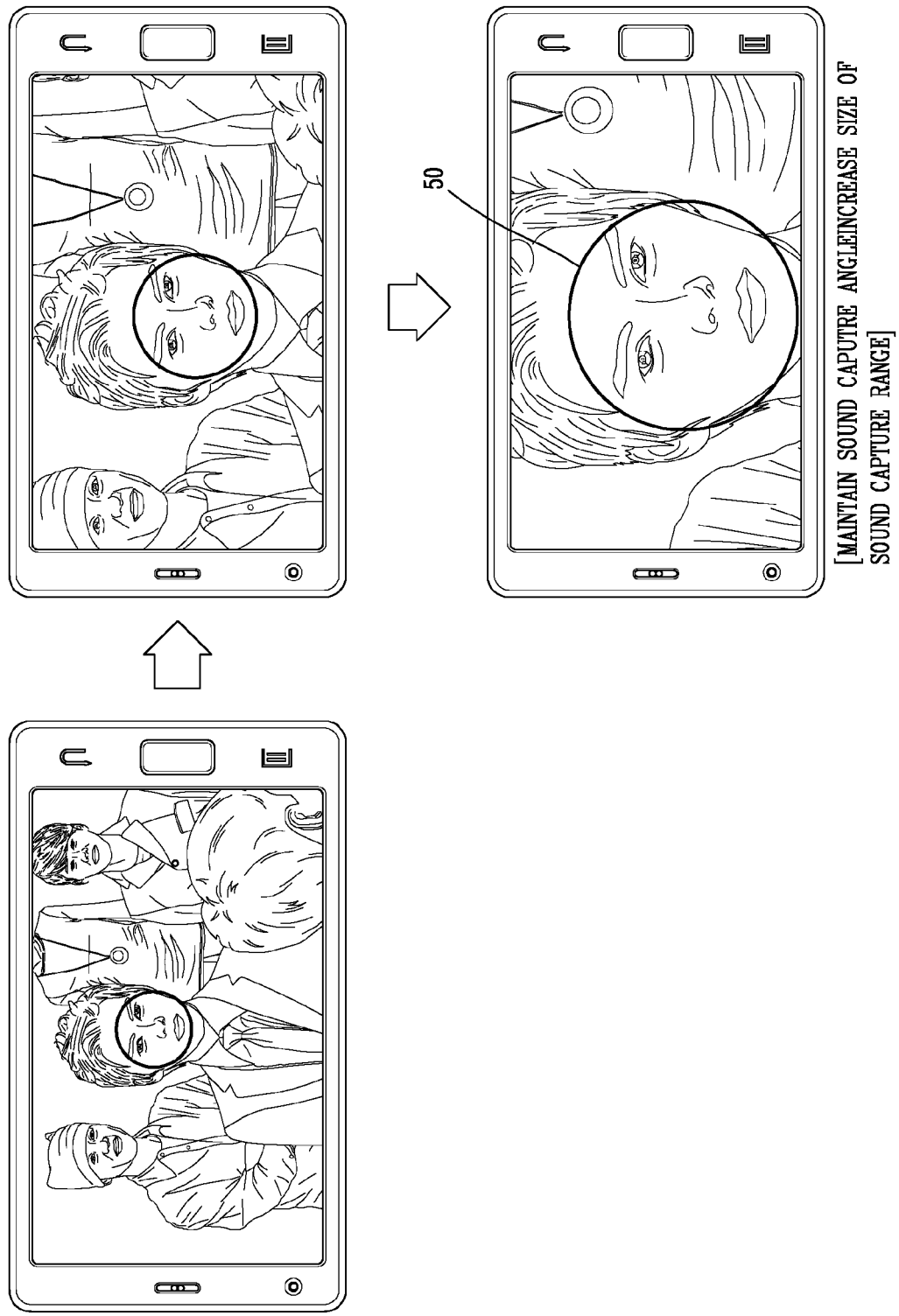

SOUND ICON(202) INDICATING
SOUND IOCATION

[SOUND EXISTS AT THE RIGHT SIDE OF SCREEN]

[SOUND EXISTS AT THE LEFT SIDE OF SCREEN]

[SET SOUND CAPTURE REGION TO ENLARGEMENT REGION]

[CAPTURE ONLY SOUND IN THE ENLARGEMENT REGION]

[SET SOUND CAPTURE REGION TO REMOVAL REGION]

[REMOVE SUBJECT SOUND IN THE REMOVAL REGION]

[READJUST FOCUS]

[SET SOUNDCAPTURE REGION TO THE READJUSTED FOCUS]

DISPLAY SUB IMAGE(A) AT LOWER
RIGHT END PORTION

OUTPUT SOUND IN SUB IMAGE(A) DIRECTION

MOVE SUB IMAGE(A) TO UPPER RIGHT END PORTION

OUTPUT SOUND IN THE MOVED SUB IMAGE(A) DIRECTION

MOBILE TERMINAL AND AUDIO ZOOMING METHOD THEREOF

RELATED APPLICATION

Pursuant to 35 U.S.C. §119(a), this application claims the benefit of earlier filing date and right of priority to Korean Application Nos. 10-2012-0068205, 10-2012-0068210 and 10-2012-0068212, filed on Jun. 25, 2012, the contents of which all these applications are incorporated by reference herein in its entirety.

BACKGROUND OF THE INVENTION

1. Field of the Invention

The present disclosure relates to a mobile terminal and an audio zooming method thereof capable of effectively capturing sound generated by a subject while capturing and reproducing video.

2. Description of the Related Art

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal. Of them, a touch function of the mobile terminal allows even users who are unskilled in a button/key input to conveniently perform the operation of a terminal using a touch screen. In recent years, it has settled down as a key function of the terminal along with a user UI in addition to a simple input.

The mobile terminal provides various functions for capturing a subject using a camera. The user may enlarge an image around a specific subject by manipulating the control options of a camera to perform capturing of a desired image by manually and automatically adjusting the focus of the image or using a face recognition function or the like.

For example, the user may selectively use a front or rear camera of the mobile terminal according to the location of the subject to perform capturing, and particularly change the capture mode (portrait mode or landscape mode) according to the scene to perform capturing. Furthermore, the user may selectively enlarge a subject around a specific region of the screen or readjust the focus even during the reproduction.

When capturing a subject or scene of interest using various capturing techniques, a voice or sound generated by the subject is captured and stored by a microphone array.

However, when capturing a subject or scene of interest using various capturing techniques, according to the related art, there is a drawback in which surrounding sounds and noises as well as sounds generated by the subject are captured at the same time.

In order to solve the problem, according to the related art, a subject of interest or specific region on the screen is pointed by a touch or laser pointer and then the sound of the pointed subject or region is selectively captured.

However, a sound capture method with a conventional manual pointing has a drawback in which the user should point a sound source one by one, and especially the sound of a specific subject or region is only captured in no connection with the capture image, and thus there is a limit in which the image and sound are not synchronized during the reproduction of video.

Furthermore, according to the sound capture method in the related art, there are difficulties in capturing sound such as controlling the sound capture range in detail when capturing a specific one person's voice in an environment that there exist a plurality of persons, and forming the directivity for the locations of two persons in a separate manner as well as adjusting the sound capture range in various ways, respectively, when capturing both the voices of two persons exiting at different locations, and the like.

In particular, according to the sound capture method in the related art, only a sound generated from the subject is always focused (fixed) to capture the sound on the assumption that the subject is located around the center of the screen and the sound is also generated from the relevant subject.

However, the foregoing sound capture method exhibits a significantly limited sound capture performance when the location of the subject is different from the location of a sound generated from the relevant subject. For example, in an actual situation that a singer or instructor sings a song or give a lecture using a microphone, there are a lot of cases where a speaker delivering the relevant song or voice exists at a different location though the signer or instructor is located at the center of the screen. In this case, when a sound is captured based on the location of the singer or instructor, it causes a side effect of removing the singer's or instructor's voice. In order to overcome the foregoing drawback, when captured with a wide screen to capture all sounds generated from the speaker, there has been a drawback of containing unnecessary background screens and surrounding noises.

Furthermore, in order to solve the problems of the sound capture method of the related art, according to the related art, an audio zooming method capable of optimizing a sound generated by the subject to capture the sound in connection with the user's control operation and various capturing techniques associated therewith has been provided, but the audio zooming method is mainly used only during the capturing phase at present. As a result, when the captured and stored images are reproduced, the sound captured during the capturing phase is reproduced as it was and thus it has a drawback in which the user is unable to select voices and sounds generated from a specific region for reproduction.

SUMMARY OF THE INVENTION

The objective of the present disclosure is to provide a mobile terminal and an audio zooming method thereof capable of capturing a sound generated from the subject in an optimal manner in connection with various capturing techniques.

The objective of the present disclosure is to provide a mobile terminal and an audio zooming method thereof capable of controlling the location and range of capturing a sound in detail based on the capture image.

The objective of the present disclosure is to provide a mobile terminal and an audio zooming method thereof capable of forming a sound directivity at a location different from that of the subject desired to be captured and reproduced to capture the sound of the relevant subject in an optimal manner.

The objective of the present disclosure is to provide a mobile terminal and an audio zooming method thereof capable of visually providing the information of sound sources existing in and out of the screen to allow the user to select the location and direction of capturing a sound.

The objective of the present disclosure is to provide a mobile terminal and an audio zooming method thereof capable of optimizing and reproducing a sound generated from a specific region of the reproduction screen.

The objective of the present disclosure is to provide a mobile terminal and an audio zooming method thereof capable of controlling the location and range of capturing a sound in detail on the reproduction screen.

In order to accomplish the foregoing objectives, an audio zooming method of a mobile terminal according to an embodiment of the present disclosure may include configuring a sound capture range of a subject in a predetermined capture mode; capturing a sound of the subject in the configured sound capture range; changing a sound capture angle to automatically control the sound capture range when an event for changing the capture location or range or capture mode of the subject occurs during the capturing phase; and capturing the sound of the subject in the controlled sound capture range.

In order to accomplish the foregoing objectives, a mobile terminal according to an embodiment of the present disclosure may include a display unit configured to display a screen containing a subject of interest; a memory configured to store information associated with capturing; and a controller configured to automatically control a sound capture range to capture the sound of the subject when an event for changing the capture location or range or capture mode of the subject occurs during the capturing phase.

In order to accomplish the foregoing objectives, an audio zooming method of a mobile terminal according to another embodiment of the present disclosure may include focusing a subject in a capture mode to capture an image; automatically recognizing a sound source in or out of the screen for outputting the sound of the subject to display it on an audio thumbnail at one side of the screen; forming a directivity on a sound source selected by the user on the audio thumbnail to perform audio focusing; and capturing the audio focused sound source.

In order to accomplish the foregoing objectives, a mobile terminal according to another embodiment of the present disclosure may include a display unit configured to display an image focused on a subject in a capture mode; and a controller configured to automatically recognize a sound source in or out of the screen for outputting the sound of the subject to display it on an audio thumbnail at one side of the screen, and perform audio focusing on a sound source selected by the user on the audio thumbnail to capture the relevant sound source.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10A through 10E are views illustrating an example of allowing the user to configure sound capture information in a general capture mode;

FIGS. 11A through 11D are views illustrating an example of manually changing the display size of a sound capture range;

FIGS. 12A through 12E are views illustrating an example of providing information on a variation limit of the sound capture range;

FIGS. 15A and 15B are views illustrating an example of providing a preset option in a sound capture range during the screen zoom in/out phase;

DETAILED DESCRIPTION OF THE INVENTION

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

A terminal can be implemented in various forms. A terminal disclosed herein may include mobile terminals such as a portable phone, a smart phone, a laptop computer, a digital broadcast terminal, a personal digital assistant (PDA), a portable multimedia player (PMP), a navigation, and the like, and stationary terminals such as a digital TV, a desktop computer, and the like. In the following description, it is assumed and described that the terminal is a mobile terminal. However, it would be easily understood by those skilled in the art that a configuration according to the following description may be applicable to the stationary terminal excluding constituent elements particularly configured for mobile purposes.

Figure 1:
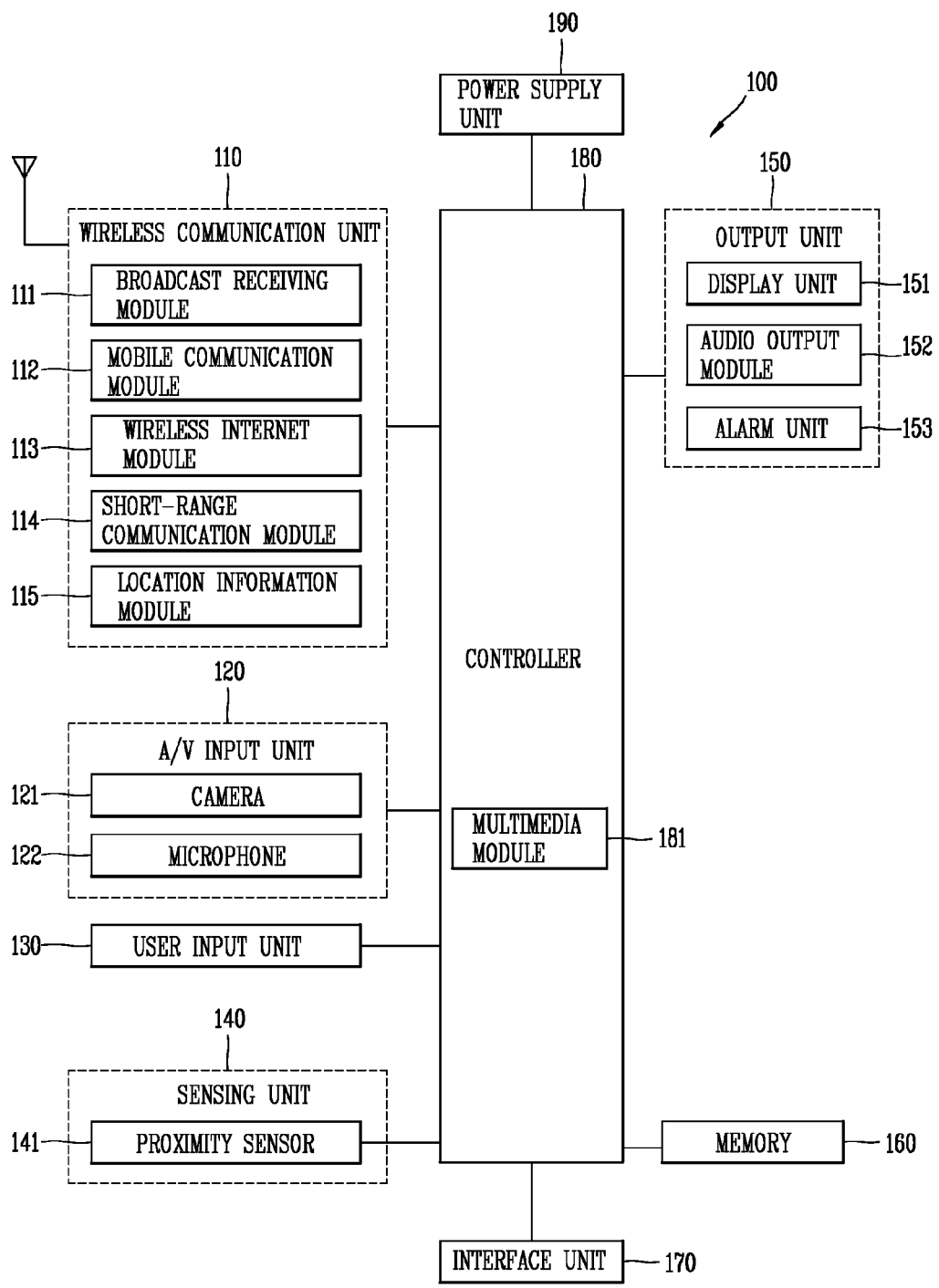
FIG. 1 is a block diagram illustrating a mobile terminal associated with an embodiment of the present disclosure.

FIG. 1 is a block diagram illustrating a mobile terminal associated with an embodiment of the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more modules allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

Furthermore, the mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

Furthermore, the location information module 115 is a module for checking or acquiring a location of the mobile terminal, and there is a Global Positioning System (GPS) module as a representative example. According to current technologies, the GPS module calculates spaced-apart distance information and accurate time information from three or more satellites and then applies trigonometry to the calculated information, thereby accurately calculating current position information based on latitude, longitude, and height. At present, there is widely used a method of calculating position and time information using three satellites and correcting an error of the calculated position and time information using another satellite. Furthermore, the GPS module can calculate speed information by continuously calculating a current position in real time.

On the other hand, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like. Particularly, when the touch pad forms an interlayer structure together with a display unit 151 which will be described later, it may be called a touch screen.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141. It will be described later in association with a touch screen.

Furthermore, the sensing unit 140 may include a geomagnetic sensor calculating the movement direction when the user moves, a gyro sensor calculating the rotation direction and an acceleration sensor.

The interface unit 170 performs a role of interfacing with all external devices connected to the mobile terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Here, the identification module may be configured as a chip for storing various information required to authenticate an authority for using the mobile terminal 100, which may include a User Identity Module (UIM), a Subscriber Identity Module (SIM), and the like. Also, the device provided with the identification module (hereinafter, referred to as 'identification device') may be implemented in the type of a smart card. Hence, the identification device can be coupled to the mobile terminal 100 via a port. The interface units 170, 175 may receive data or power from an external device and transfer the received data or power to each constituent element in the mobile terminal 100, or transmit data within the mobile terminal 100 to the external device.

Also, the interface unit 170 may serve as a path for power to be supplied from an external cradle to the mobile terminal 100 when the portable terminal 100 is connected to the external cradle, or as a path for transferring various command signals inputted from the cradle by the user to the mobile terminal 100. Such various command signals or power inputted from the cradle may be operated as signals for recognizing that the mobile terminal 100 has accurately been mounted on the cradle.

The output unit 150 is configured to provide an output for audio signal, video signal, or alarm signal, and the output unit 150 may include the display unit 151, an audio output module 152, an alarm unit 153, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call.

On the other hand, as described above, in case where the display unit 151 and the touch pad form an interlayer structure to constitute a touch screen, the display unit first display unit 151 may be used as an input device in addition to an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent type to allow viewing of the exterior through the display unit, which may be called transparent displays. An example of the typical transparent displays may include a transparent LCD (TOLED), and the like. The display unit 151 may be implemented in two or more in number according to a configured aspect of the mobile terminal 100. For example, an external display unit (not shown) and an internal display unit (not shown) may be simultaneously provided on the mobile terminal 100. The touch screen may be configured to detect a touch input pressure as well as a touch input position and area.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the mobile terminal may include call received, message received, key signal input, touch input, and so on. The alarm 153 may output not only video or audio signals, but also other types of signals such as signals notifying occurrence of events in a vibration manner. When a call signal or message is received, the alarm 153 may output a vibration to notify this.

Otherwise, when a key signal is inputted, the alarm 153 may output a vibration as a feedback to the inputted key signal. Through the foregoing vibration output, the user can recognize an event occurrence. The signal for notifying an event occurrence may be also outputted through the display unit 151 or the audio output module 152.

The memory 160 may store a program for processing and controlling of the controller 180, or may temporarily store input/output data (e.g., phonebook data, messages, still images, video and the like). Also, the memory 160 may store data related to various patterns of vibrations and audio output upon a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the memory 160 on the Internet.

The controller 180 typically controls an overall operation of the portable terminal 100. For example, the controller 180 performs the control and processing associated with telephony calls, data communications, video calls, and the like. Furthermore, the controller 180 may include a multimedia module 181 for reproducing multimedia files. The multimedia module 181 may be implemented in the controller 180, or may be implemented separately from the controller 180.

The controller 180 can perform a pattern recognition processing so as to recognize handwriting or drawing input performed on the touch screen as a text or image.

The power supply unit 190 provides power required by various components under the control of the controller 180. The provided power may be internal power, or external power thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

A terminal 100 as illustrated in FIG. 1 may be configured to be operated in a communication system capable of transmitting data via frames or packets including a wireless or wired communication system and a satellite-based communication system.

Hereinafter, referring to FIG. 2, a communication system in which a terminal associated with the present disclosure is operable will be described.

A communication system may use different wireless interfaces and/or physical layers. For example, a wireless that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. Hereinafter, for the sake of convenience of explanation, it will be described to be limited to CDMA. However, it is apparent that the present disclosure may be applicable to all kinds of communication systems including a CDMA wireless communication system.

Figure 2:
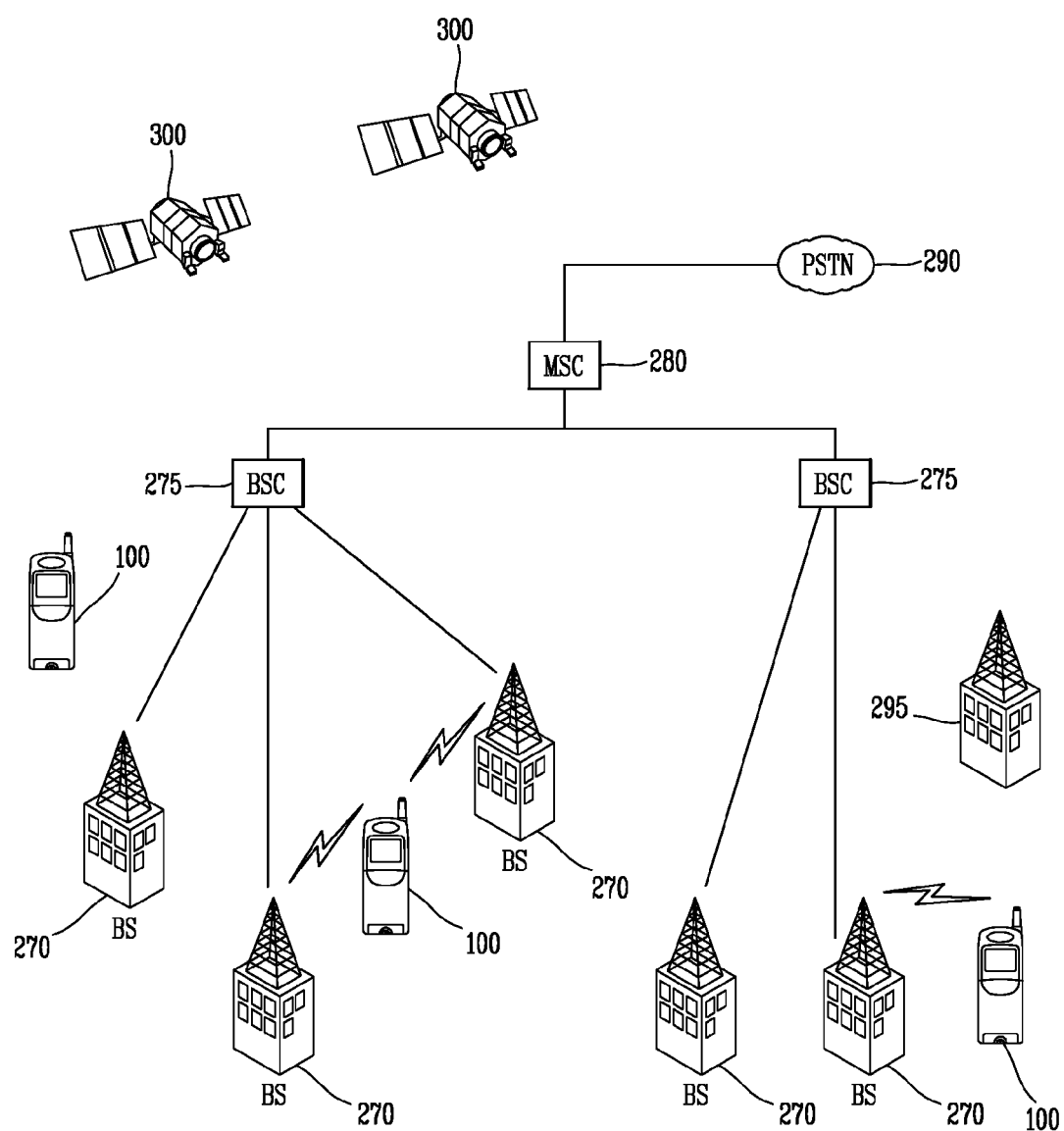
FIG. 2 is a block diagram illustrating a wireless communication system in which a mobile terminal associated with an embodiment of the present disclosure can be operated.

As illustrated in FIG. 2, a CDMA communication system is configured to be connected to a plurality of terminals 100, a plurality of base stations (BSs) 270, a plurality of base station controllers (BSCs) 275, and a mobile switching center (MSC) 280. The MSC 280 is configured to be connected to a public switched telephone network (PSTN) 290, and also configured to be connected to BSCs 275. The BSCs 275 may be connected to BSs 270 in pairs through a backhaul line. The backhaul line may be provided with at least one of E1/T1, ATM, IP, PPP, Frame Relay, HDSL, ADSL, and xDSL. Accordingly, a plurality of BSCs 275 may be included in a system as illustrated in FIG. 2.

Each BS 270 may include at least one sector, and each sector may include an omni-directional antenna or an antenna directing a specific radial direction from the BS 270. Alternatively, each sector may include two or more antennas in various shapes. Each BS 270 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 270 may also be referred to as Base Station Transceiver Subsystems (BTSs). In this case, the term "base station" may refer to a combination of one BSC 275 and at least one BS 270. The base station may also designate a "cell site". Alternately, each of the sectors with respect to a specific BS 270 may be referred to as a plurality of cell sites.

As illustrated in FIG. 2, a Broadcasting Transmitter (BT) 295 serves to transmit a broadcast signal to the terminals 100 operating in the system. The broadcast receiving module 111 illustrated in FIG. 1 is provided in the terminal 100 so as to receive the broadcast signal transmitted by the BT 295.

Moreover, FIG. 2 illustrates multiple Global Positioning System (GPS) satellites 300. The satellites 300 serve to detect a position of at least one of the multiple terminals 100. Two satellites are illustrated in FIG. 2, however, useful position information may be obtained by more or less than two satellites. The GPS module 115 illustrated in FIG. 1 cooperates with the satellites 300 so as to obtain desiring position information. Here, the module 115 can track the position using all techniques allowing to track positions, as well as the GPS tracking technology. Also, at least one of the GPS satellites 300 may handle satellite DMB transmission alternatively or additionally.

Among typical operations of a wireless communication system, a BS 270 serves to receive reverse link signals from various terminals 100. At this time, the terminal 100 is connecting a call, transmitting and/or receiving a message or executing other communication operations. Each reverse link signal received by a specific base station 270 is processed within the specific BS 270. Data generated resulting from the processing is transmitted to the connected BSC 275. The BSC 275 serves to allocate a call resource and manage mobility, including systemization of soft handoffs between the BSs 270. Also, the BSC 275 transmits the received data to the MSC 280, and then the MSC 280 provides an additional transmission service so as to be connected to a PSTN 290. Similarly, the PSTN 290 is connected to the MSC 280 and the MSC 280 is connected to the BSCs 275, and the BSCs 275 control the BSs 270 so as to transmit forward link signals to the terminals 100.

The present disclosure provides various sound capture methods combined with events allowing the user to select the location, range and situation of subjects of interest and an audio zooming technique to obtain an optimal image while capturing and reproducing an image.

The image during the reproduction phase may include both images stored to which an audio zooming technology is applied and images stored in a state that the audio zooming technology is not applied thereto.

An audio zooming technology applied to the present disclosure denotes a series of operations for capturing a sound source through a microphone and then applying audio zooming to it to selectively record only a desired sound. For example, the user allows a directivity to face the location of the subject or optimizes a sound capture range automatically in connection with the location and size of the subject closed up or focused by the user, thereby capturing or reproducing an image while capturing the audio of the subject of interest in an optimal manner. The image during the reproduction phase may include both images stored to which an audio zooming technology is applied and images stored in a state that the audio zooming technology is not applied thereto.

According to an embodiment, the present disclosure provides a technology for capturing a sound in connection with screen zoom in/out while capturing and reproducing video.

According to another embodiment, the present disclosure provides a technology for capturing a plurality of narrow audios using automatic face recognition while capturing and reproducing video.

According to still another embodiment, the present disclosure provides a technology for zooming in or out the sound of the relevant region when the specific region is zoomed in or out while capturing and reproducing video to capture a sound.

According to yet still another embodiment, the present disclosure provides a sound capture range technology of audio zooming which is preset according to a scene mode (portrait mode, landscape mode, street mode).

According to still yet another embodiment, the present disclosure provides technology capable of configuring a sound capture direction and range in consideration of an image angle based on the front and rear cameras.

Furthermore, the present disclosure provides an expression technology in which the user can control one or a plurality of sound capture locations and ranges in a delicate and convenient manner without being collided with the basic UI scenario of a camera for controlling screen focusing, zoom magnification or the like, thereby providing a scheme capable of capturing or reproducing the audio of the subject of interest in an optimal manner.

The control of the one or a plurality of sound capture locations and ranges is carried out through a contact or non-contact scheme such as the user's behavior or gesture to the captured or reproduced image. An input due to the contact or non-contact scheme may include a single touch, a multi touch, a multipoint touch, a flicking, and a touch & drag.

The captured or reproduced image may be displayed on the display unit of the mobile terminal or displayed on a hologram in a separate manner from the mobile terminal. The foregoing input and display methods will be commonly applied to all embodiments which will be described later.

Furthermore, the present disclosure can visually display a sound strength ratio between each subject when the one of plurality of sound capture locations and ranges are controlled.

In general, a selectable directivity between sound sources on the horizontal or vertical axes on the basis of the user is required to capture a sound source. In order to provide the selectable directivity, a plurality of microphones are disposed in an orthogonal or cross pattern on the rear surface of the mobile terminal, and when only two microphones are used, they are disposed to be apart from each other in a horizontal or vertical linear direction. In particular, the directivity is carried out through signal processing such as beamforming for sounds (or voices) captured through a plurality of microphones. The beamforming denotes forming a range to be sound captured with a sound beam to generate a directivity.

Figure 3:
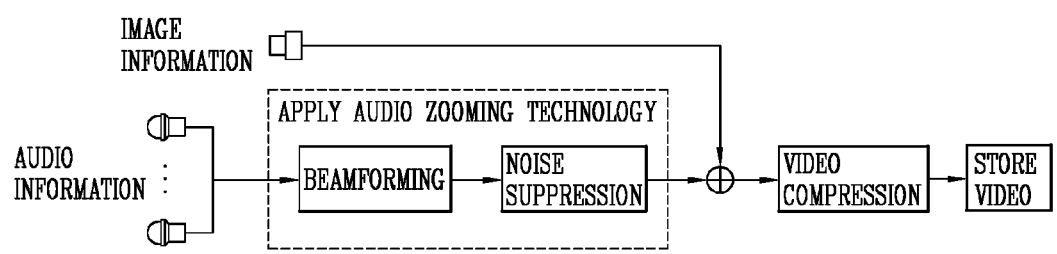
FIG. 3 is an application example of an audio zooming technology in a capture mode.

FIG. 3 is an application example of an audio zooming technology in a capture mode.

As illustrated in FIG. 3, audio information captured by a plurality of microphones 122 while capturing an image is combined with image information captured by the camera 121 subsequent to applying an audio zooming technology such as beamforming and noise removal thereto, and the combined image is compressed into a predetermined format and then stored in the memory 160. In particular, a unit for processing the beamforming constitutes a signal processing unit (not shown) of the controller 180 along with a unit for removing noise as a portion for adaptably forming a sound beam on the subject selected by the user to configure a sound capture range.

Figure 4:
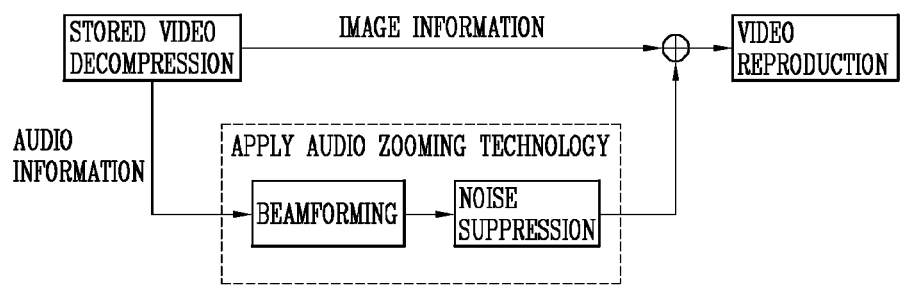
FIG. 4 is an application example of an audio zooming technology in a reproduction mode.

FIG. 4 is an application example of an audio zooming technology in a reproduction mode.

As illustrated in FIG. 4, the compression of a video stored in the memory 160 is released to be separated (restored) into audio information and image information, respectively. Subsequent to applying an audio zooming technology such as beamforming and noise removal thereto, the separated audio information is combined with the separated image again for reproduction. Similarly, a unit for processing the beamforming constitutes a signal processing unit (not shown) along with a unit for performing noise removal as a portion for adaptably forming a sound beam according to the sound capture range and location to generate a directivity.

The audio information subjected to the compression and decompression processes is little different from an audio signal directly captured by the microphone 122, and in particular, a change of information due to loss compression can be secured in the aspect of software.

In this manner, when the arrangement structure of the microphones 122 and cameras 121 of the mobile terminal is known, it may be possible to obtain the same effect even when directly applying an audio zooming technology to the audio signal captured through the microphones 122 or applying an audio zooming technology to the stored audio signal.

First, the audio zooming method in a capture mode will be described and the audio zooming method in a reproduction mode will be described.

Camera Setting Menu

Figure 5:
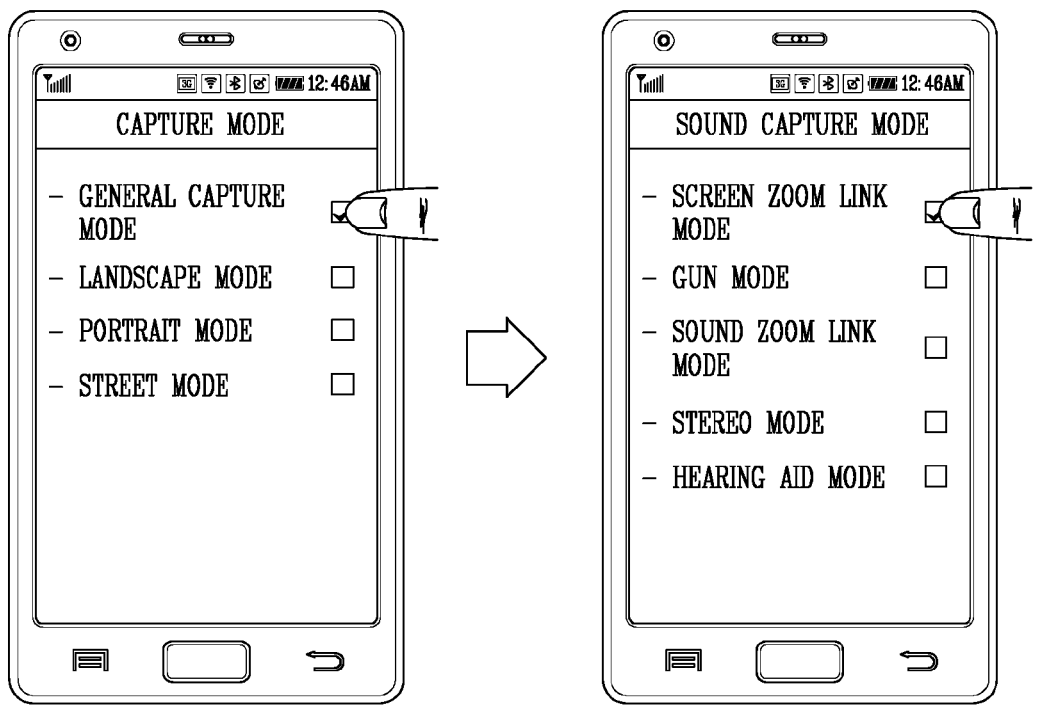
FIG. 5 is a configuration example of a camera mode associated with the present disclosure.

FIG. 5 is a configuration example of a camera mode associated with the present disclosure.

The present disclosure provides various capture modes and sound capture modes in a camera mode to implement the foregoing audio zooming method. The capture mode may include a general (basic) mode, a landscape mode, a portrait mode, and a street mode as illustrated in FIG. 5. Furthermore, the sound capture mode is a sub mode selected and configured by the user in a capture mode, including a screen zoom link mode, a gun mode, a sound zoom variation mode, a gun location change mode, a stereo mode, a hearing aid mode, and the like. The configurations and kinds of the menus may not be limited but operated in an added or integrated manner when the need arises.

Figure 6:
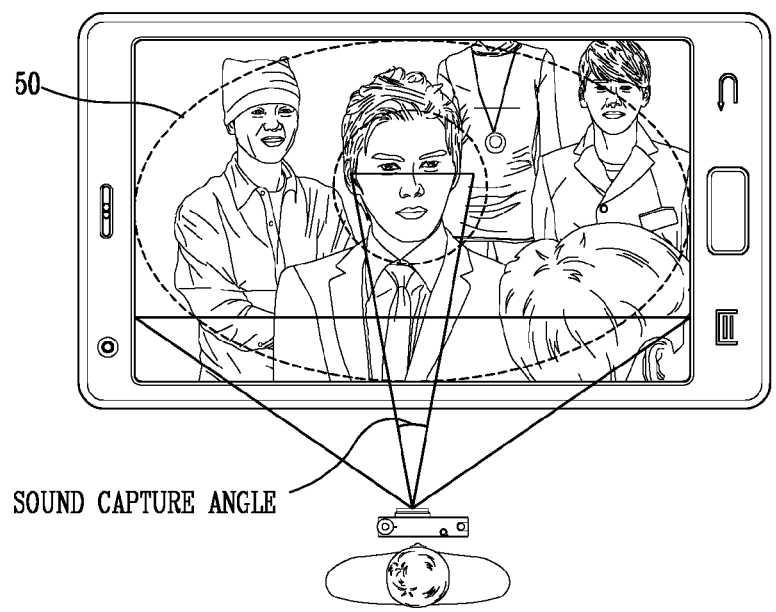
FIG. 6 is a view illustrating a relation between a sound capture angle and a sound capture range.

FIG. 6 is a view illustrating a relation between a sound capture angle and a sound capture range.

As illustrated in FIG. 6, the sound capture range 50 on the capture screen (or preview screen) is displayed with a predetermined shape (sound capture region) on the screen as a horizontal directional range formed by an angle of the sound beam formed in the direction of the subject of interest, namely, a sound capture angle. The sound beam exhibits a directivity to the subject of interest.

The sound capture range 50 is increased as increasing the sound capture angle, and thus the sound can be captured in a wide range, but the sound capture range 50 is decreased as decreasing the sound capture angle, and thus the sound can be concentratedly captured in a narrow range.

The user configures a capture mode and a sound capture mode to capture the subject of interest. It is because the sound capture range 50 can be suitably controlled according to which capture mode and which sound capture mode are selected when capturing the subject of interest to selectively capture the sounds of at least one or more subjects of interest within the capture screen.

Accordingly, the meaning of controlling a sound capture angle in the present disclosure may be used in the same manner as that of controlling a sound capture range 50 (sound capture region).

Sound Capture Information Automatic Setting

According to the present disclosure, sound capture information is information configured to selectively capture the audio of at least one or more subjects of interest. The audio may include a sound of the subject and a user's voice. The sound capture information may include a sound capture range, a sound capture angle, and a display position of the sound capture range (sound capture region).

The sound capture information is automatically configured in connection with a capture mode setting, a front/rear camera selection, and a sound capture mode setting and the like, initially set by the user. The configured sound capture information can be controlled by the foregoing selections and settings even when the user enters a specific mode to capture the subject.

Furthermore, the sound capture information may be directly configured on a capture screen by the user. In other words, when the user selects a specific capture mode according to the environmental situation and the kind of a captured subject, the controller 180 displays the sound capture range 50 with a predetermined size and shape corresponding to the selected capture mode. The sound capture range 50 may have a circular, rectangular, or polygonal shape, and disappear after being displayed for a predetermined period of time. The disappeared sound capture range 50 is displayed again when a long touch is applied to the capture screen.

Figure 7A:
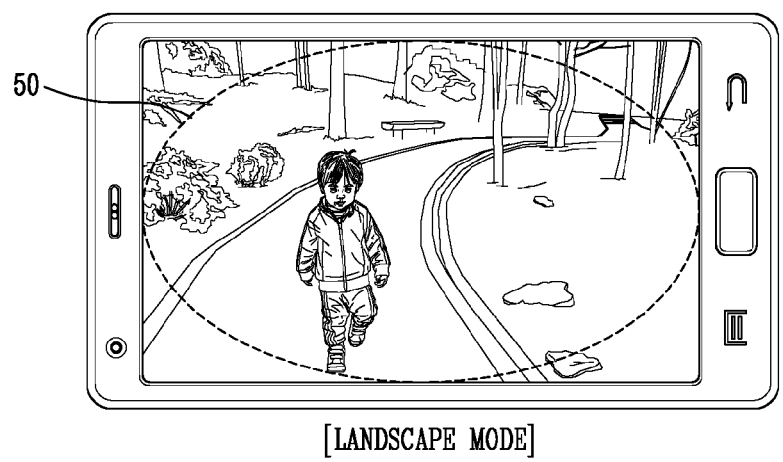
FIGS. 7A through 7C are views illustrating a configuration example of sound capture information for each capture mode.
Figure 7B:
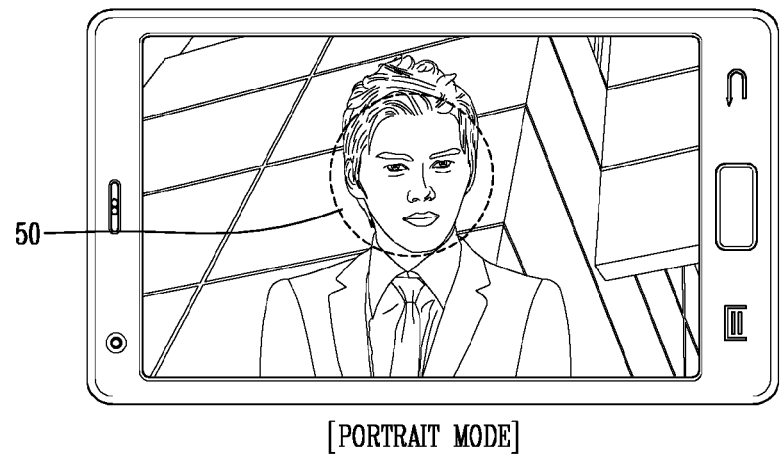
Figure 7C:
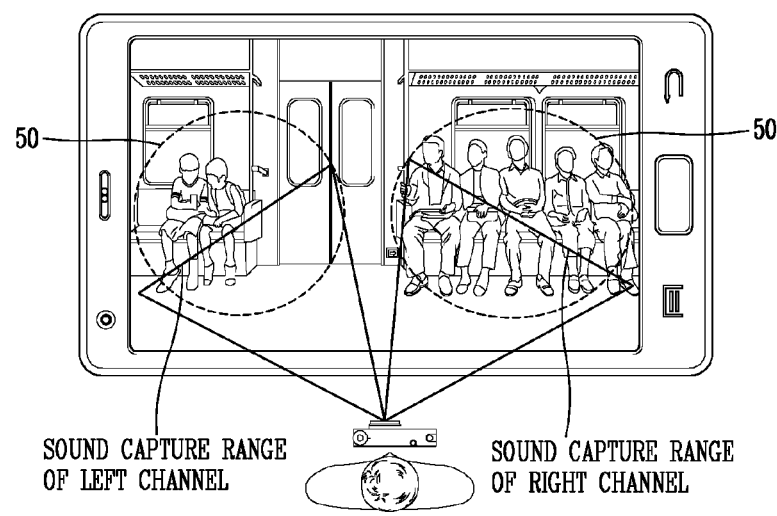

FIGS. 7A through 7C are views illustrating a configuration example of sound capture information for each capture mode.

As illustrated in FIG. 7A, when a general capture mode or landscape mode is selected, the sound capture angle is set to 180 degrees to capture sounds in a broad range so as to contain surrounding sounds to the maximum. At this time, the sound capture range 50 is set to the maximum.

Furthermore, as illustrated in FIG. 7B, when a portrait mode is selected, the controller 180 configures the sound capture angle to be small so as to capture only a specific user's voice, and displays the sound capture range 50 in a narrow range on the automatically recognized face. Furthermore, as illustrated in FIG. 7C, when a street mode is selected, the controller 180 forms the sound capture ranges at the left and right sides thereof to capture an image in a stereoscopic manner, thereby automatically configuring two sound capture ranges 50.

Accordingly, the user may select his or her desired capture mode according to the environmental situation and the kind of a captured subject to control the sound capture angle, thereby automatically controlling the sound capture range.

Figure 8:
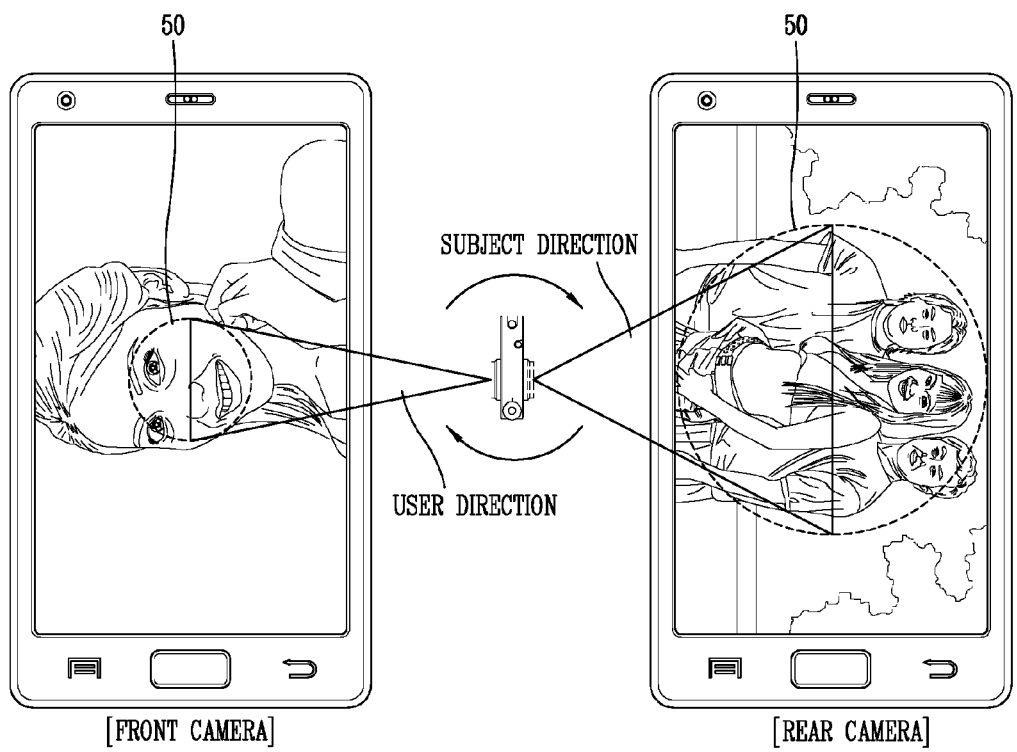
FIG. 8 is a view illustrating a configuration example of sound capture information in connection with the selection of front/rear camera.

FIG. 8 is a view illustrating a configuration example of sound capture information in connection with the selection of front/rear camera.

A front camera mounted on the mobile terminal is mostly used when making a video call or capturing a self portrait image, and a rear camera is mainly used when capturing another person, a landscape or the like. Accordingly, the present disclosure may provide predefined sound capture information, namely, the directivity and capture range of a sound, according to the selection of the front/rear camera based on the user's behavior pattern.

For example, as illustrated in FIG. 8, during the front camera capture phase, the controller 180 sets the sound capture direction to a user direction and forms the sound capture range 50 at the center of the screen in a narrow manner. On the contrary, during the rear camera capture phase, the controller 180 sets the sound capture direction to a direction of the subject of interest and configures the sound capture range 50 in a broad manner.

Accordingly, the controller 180 controls the sound capture angle and sound capture direction according to the user's selection of the front/rear camera to automatically control the sound capture range.

FIGS. 9A through 9E are views illustrating a configuration example of sound capture information for each capture mode. The embodiment may not be limited to the capture mode but may be configured in the same manner when the user selects a reproduction mode.

According to the present disclosure, the capture mode may include a screen zoom link mode, a gun mode, a sound zoom variation mode, a gun location change mode, a stereo mode, a hearing aid mode and the like as a sub mode in addition to a general mode, and a landscape mode, a portrait mode, and a street mode as illustrated in FIGS. 7A through 7C. The screen zoom link mode, gun mode, sound zoom variation mode, gun location change mode, stereo mode, and hearing aid mode may be defined as a sound capture mode. According to another embodiment, the sound capture mode may be integrated into the capture mode for its operation.

The sound capture mode can be individually set in a general capture mode or gun mode, and in particular, a gun mode will be automatically set if a portrait mode is set, and a stereo mode will be automatically set if a street mode is set.

The capture mode and sound capture method can be set according to the user's selection prior to or during the capturing phase, and when a specific capture mode or sound capture mode is set, the controller 180 automatically control the sound capture angle according to the relevant mode.

The screen zoom link mode is a mode used when it is desired to capture only a sound generated by the subject on the screen. The feature of the above mode is in the fact that the sound capture range 50 is controlled in connection with the zoom magnification of the screen.

Figure 9A:
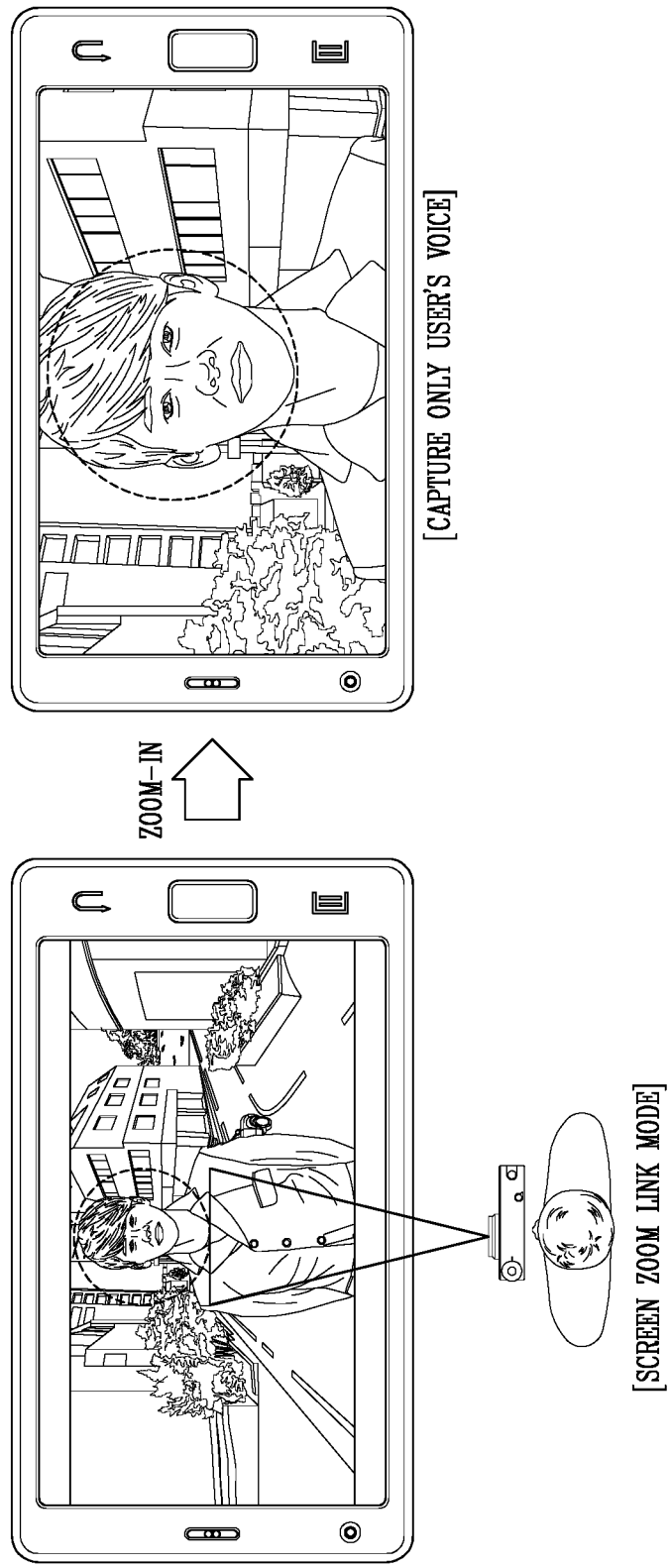
FIGS. 9A through 9E are views illustrating a configuration example of sound capture information for each capture mode.

FIG. 9A is an example of a screen zoom link mode according to an embodiment of the present disclosure.

As illustrated in FIG. 9A, when the user zooms in or out the screen in a state that the screen zoom link mode is set, the controller 180 changes a specified sound capture angle according to the zoom magnification to control the sound capture range 50, thereby capturing the user's voice.

When the user zooms out the screen or the zoom magnification is set to "1", the controller 180 captures sounds within the sound capture range 50 at the sound capture angle of about 180 degrees. In this case, environmental noises are also captured in addition to the user's voice.

When the user zooms in the screen, the controller 180 captures sounds within the sound capture range 50 according to a sound capture angle configured based on the zoom magnification.

For an example, when the zoom magnification is "2", the sound capture angle is 160 degrees, and when the zoom magnification is "10", it is set to about 10 degrees. Accordingly, since the sound capture angle is decreased as increasing the zoom magnification, the controller 180 further captures the user's sound, and removes environmental noises.

The gun mode is a mode used when capturing only a sound generated from a specific subject in a narrowly fixed manner.

Figure 9B:
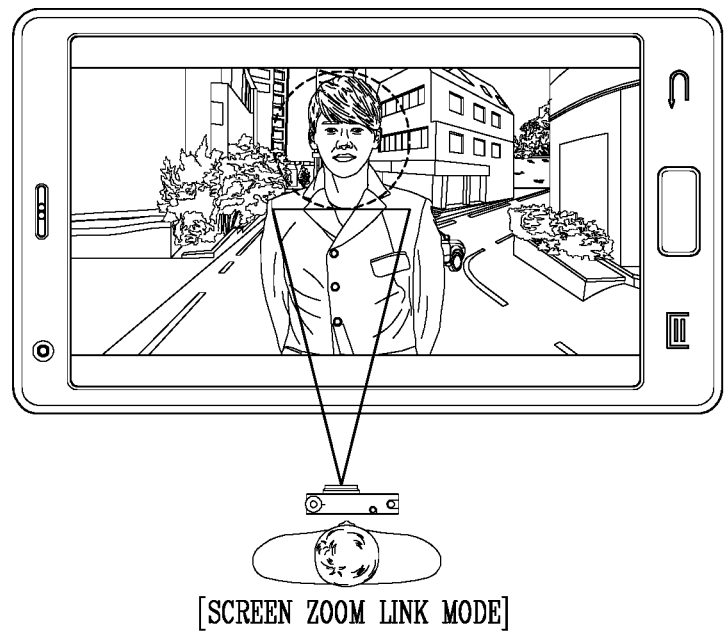

FIG. 9B is an example of a gun mode according to an embodiment of the present disclosure.

As illustrated in FIG. 9B, the gun mode is a mode for focusing and capturing only the sound of a specific subject on the capture screen, and mainly used in a portrait mode. Since the 50 is narrowly formed when the gun mode is set, the user may fix and capture only the sound generated from his or her desired subject.

The sound zoom variation mode is a mode for allowing the user to control a capture range of the sound, and the gun location change mode is an extended mode of the gun mode for allowing the user to select the capture location of the sound.

Figure 9C:
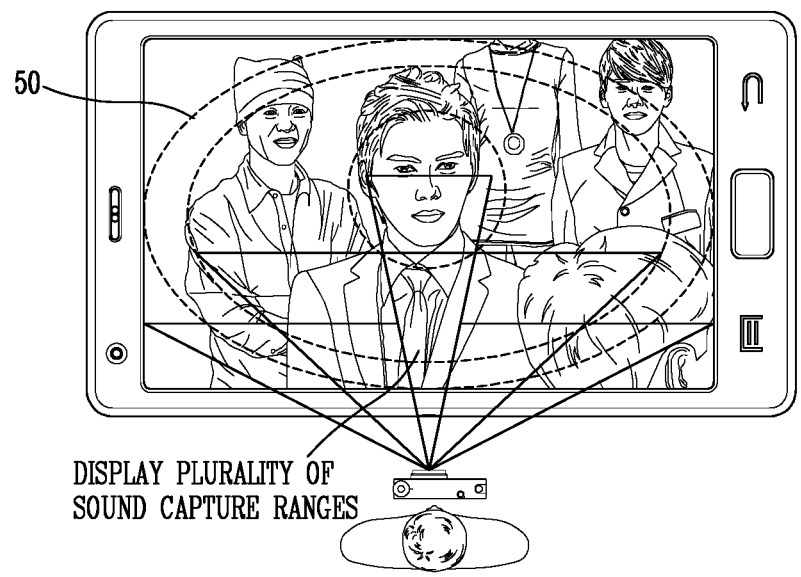
Figure 9D:
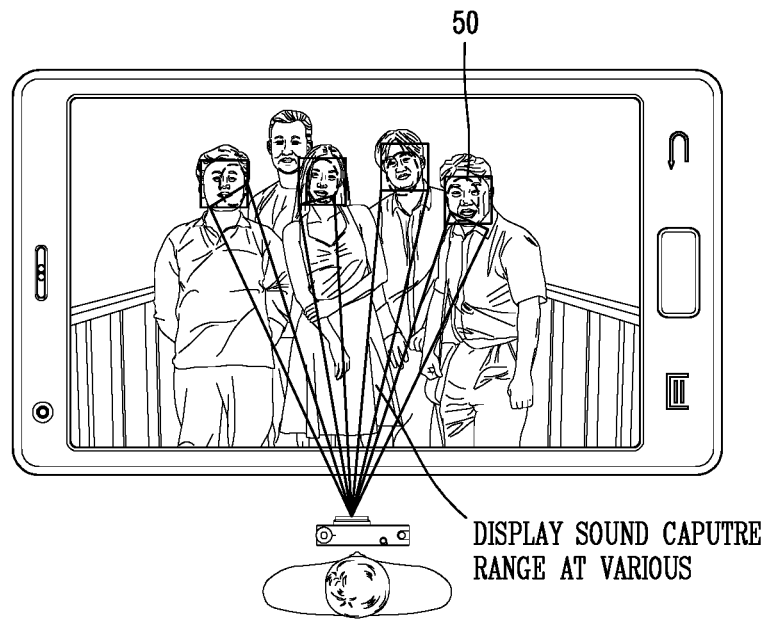

FIGS. 9C and 9D are an example of the sound zoom variation mode and gun location change mode according to an embodiment of the present disclosure.

As illustrated in FIG. 9C, the sound zoom variation mode is a mode for providing at least one or more ranges capable of allowing the user to capture a sound when an event for configuring the location or range and situation of subjects of interest occurs. For example, when zoom in/out occurs, the sound capture range is automatically changed according to the zoom magnification in case of the screen zoom link mode, but the sound zoom variation mode provides a plurality of selectable sound capture enabled ranges 50 to the user, thereby allowing the user to manually select his or her desired sound capture range. This mode has an advantage of controlling the capture range of the sound in various ways.

The at least one or more sound capture enabled ranges may be displayed when an event for configuring the location or range and situation of subjects of interest occurs or when reproduction is started in a reproduction mode. In particular, when the reproduced image is an image to which an audio zooming technology is applied, it may be displayed along with the preset sound capture range. When the preset sound capture range and the at least one or more ranges are displayed in the reproduction mode, image reproduction may be temporarily suspended, and the reproduction suspension is released if a specific sound capture range setting is terminated.

Furthermore, as illustrated in FIG. 9D, when the gun location change mode is set, the controller 180 may display the sound capture range 50 on a plurality of user's faces through face recognition, thereby allowing the user to select the sound capture range 50 and capture only the user's voice at a specific location. This mode has an advantage of focusing the user's voice at various locations to capture a sound.

Figure 9E:
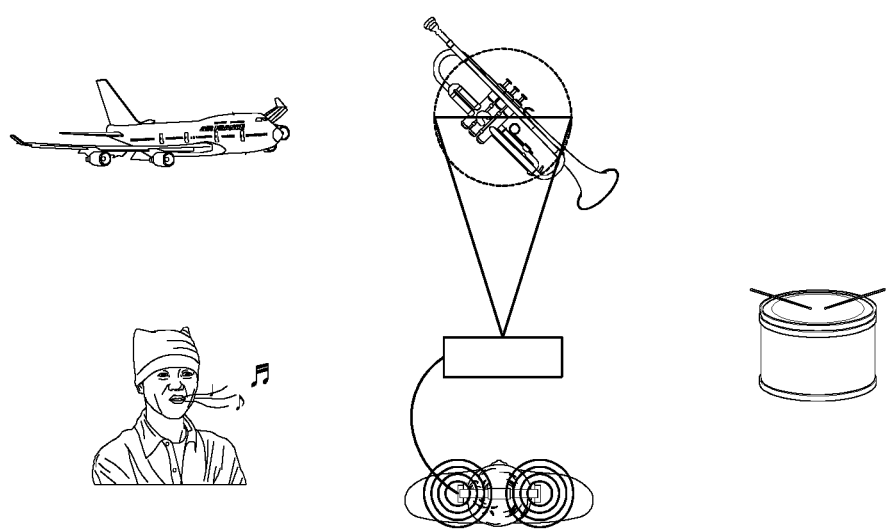

The stereo mode is a mode for performing stereoscopic two-channel (left channel and right channel) sound capture at the same time for a subject with a high degree of left/right location separation such as the street mode as illustrated in FIG. 7C, and the hearing aid mode is a mode for selectively capturing a sound source generated from a specific direction as illustrated in FIG. 9E. In other words, the hearing aid mode is a mode for capturing a sound through the microphone and then applying audio zooming thereto to allow the user to selectively listen to the sound generated from a specific direction, which is a useful mode when watching a performance or attending a lecture.

Sound Capture Information Manual Setting

According to the present disclosure, sound capture information may be directly configured by the user in a capture mode or reproduction mode.

FIGS. 10A through 10E are views illustrating an example of allowing the user to configure sound capture information in a general capture mode. The embodiment may not be limited to a capture mode, and may be applied in the same manner to a case where the user selects a reproduction mode.

Figure 10A:
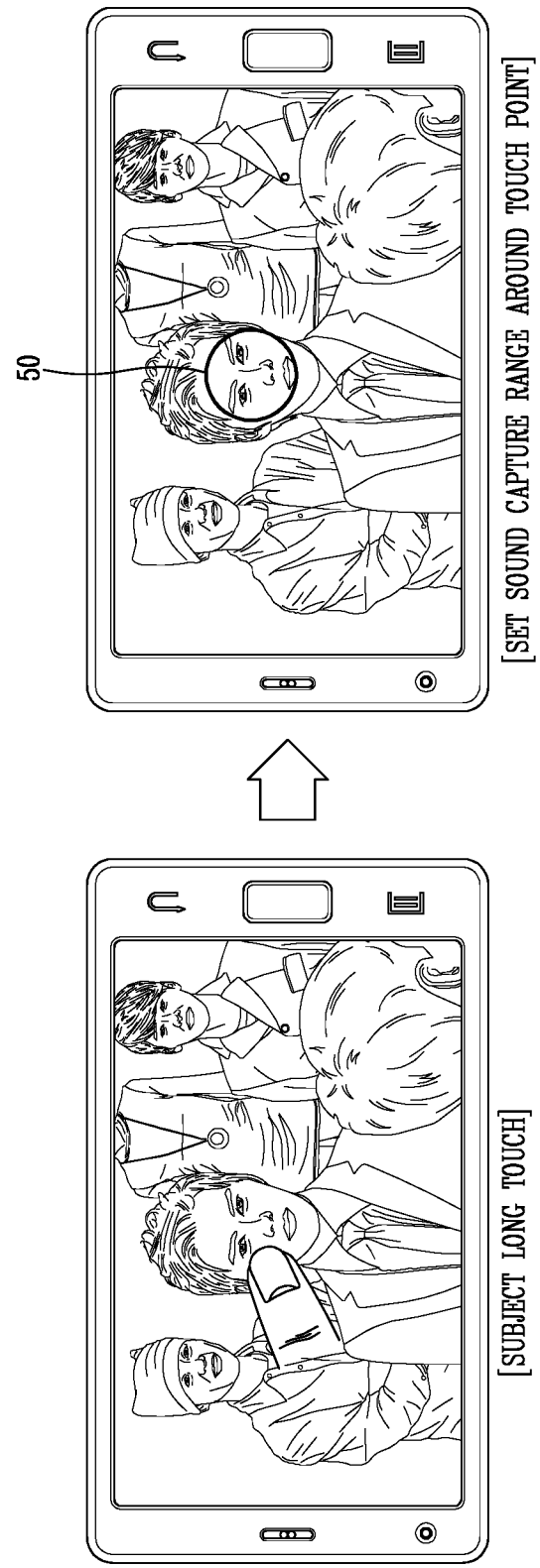
Figure 10B:
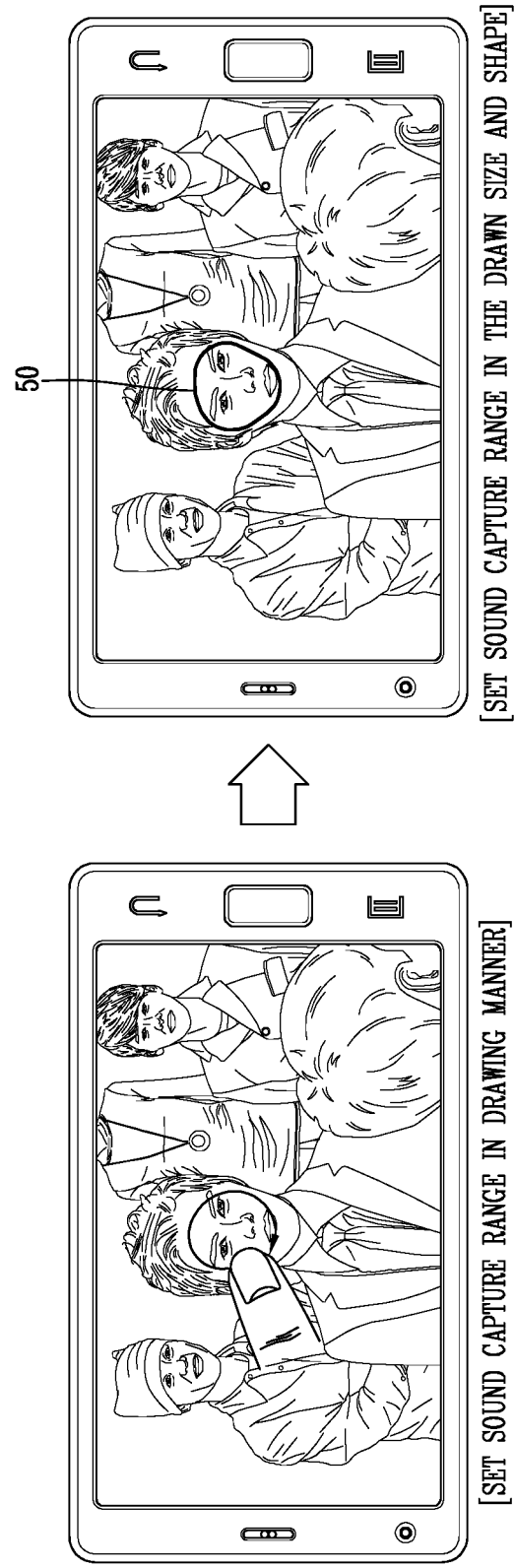
Figure 10C:
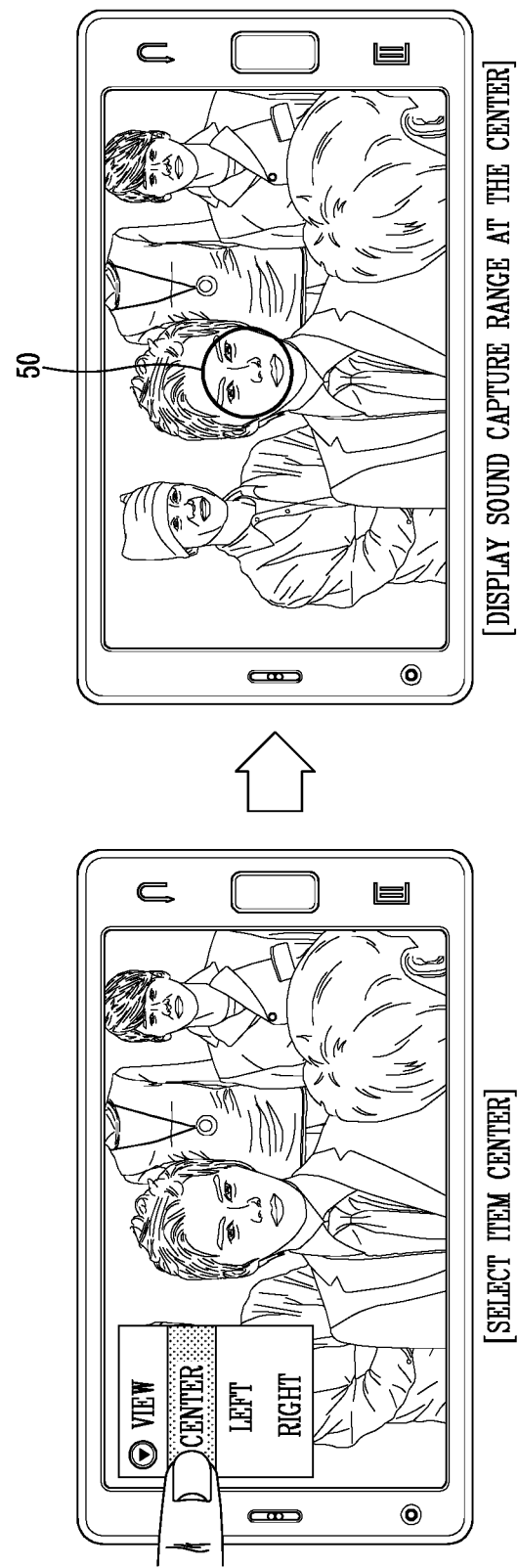

FIGS. 10A and 10B are an example of configuring a sound capture range at the location specified by the user, and FIGS. 10C through 10E are an example of configuring a sound capture range and location through a menu option.

In a general capture mode, the user may select a specific subject (sound capture object, sound source) generating a sound on the screen to configure the sound capture information. The sound capture information may include the size and display location of the sound capture range 50. The selection is carried out through a contact or non-contact scheme.

The sound capture range 50 is generated in a preset size and shape (for example, circle) around the touch point when the user applies a long touch to the sound capture object (location) as illustrated in FIG. 10A. The sound capture range 50 may be removed when a double touch is applied to the edge portion. According to another method, the sound capture range 50 may be removed by selecting a removal icon generated when a long touch is applied to the edge portion for a short period of time. When the edge portion of the sound capture range 50 is touched for a longer period of time, a setting menu capable of configuring the shape and size of the sound capture range 50 is displayed.

The user may select one of an ellipse, a rectangle and a polygon to specify the shape of the sound capture range 50 or configure the color or display duration time.

For another embodiment, the sound capture range 50 is configured with a size and shape formed by a touch & drag as illustrated in FIG. 10B. For example, when a predetermined shape is drawn on the sound capture object using his or her hand, the drawn shape and size are configured and displayed as the sound capture range 50. The setting method has an advantage capable of configuring the sound capture range 50 in a flexible manner.

According to the present disclosure, the sound capture range 50 may be set to a specific location through a menu option. As illustrated in FIG. 10C through 10E, when the user specifies a specific location on a menu option for configuring the sound capture region, the sound capture range 50 having a default shape and size is set to the specified location.

Location and Size Control of Sound Capture Range

The location of the sound capture range 50 can be fundamentally moved by the user's touch & drag, and as will be described later, can be automatically moved according to a change of the focusing region or a change of the sound capture object due to the screen zoom magnification.

The size of the sound capture range 50 may be changed (enlarged or reduced) according to a touch input (manual) using his or her one hand or both hands in a general capture mode or specific capture mode, and may be controlled prior to or during the capturing phase. Furthermore, the size of the sound capture range 50 may be changed in a flexible manner according to the screen zoom magnification as will be described later.

FIGS. 11A through 11D are an example of manually changing the size of the sound capture range 50. The embodiment has been described in a capture mode as an example, but it may not be necessarily limited to this, and may be applicable in the same manner to a case where the user selects a reproduction mode.

Figure 11A:
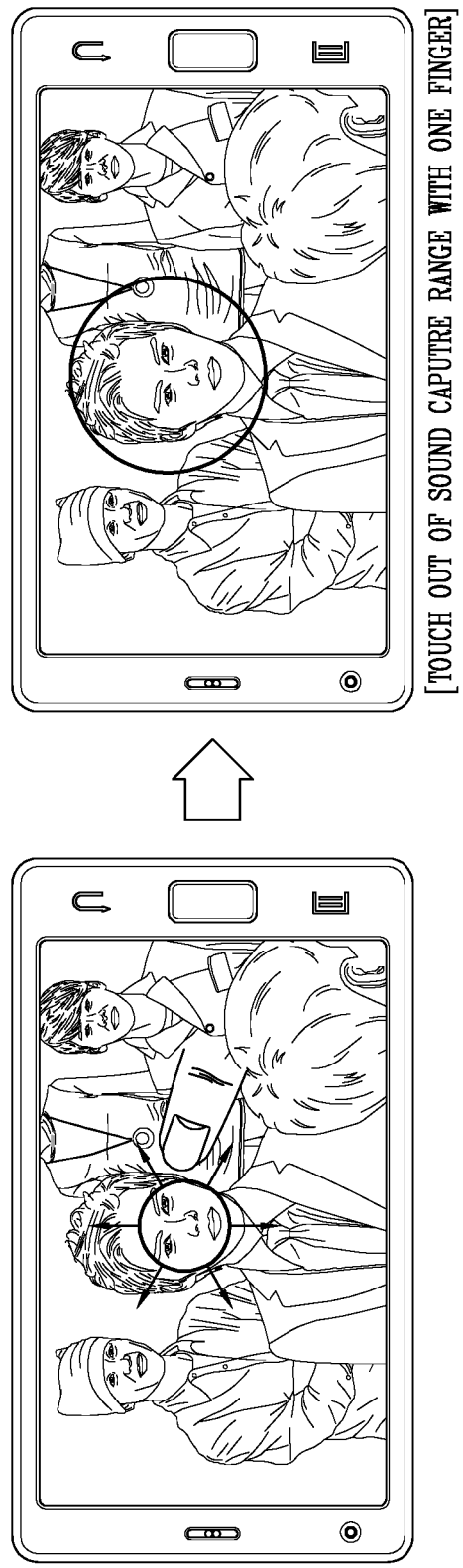
Figure 11B:
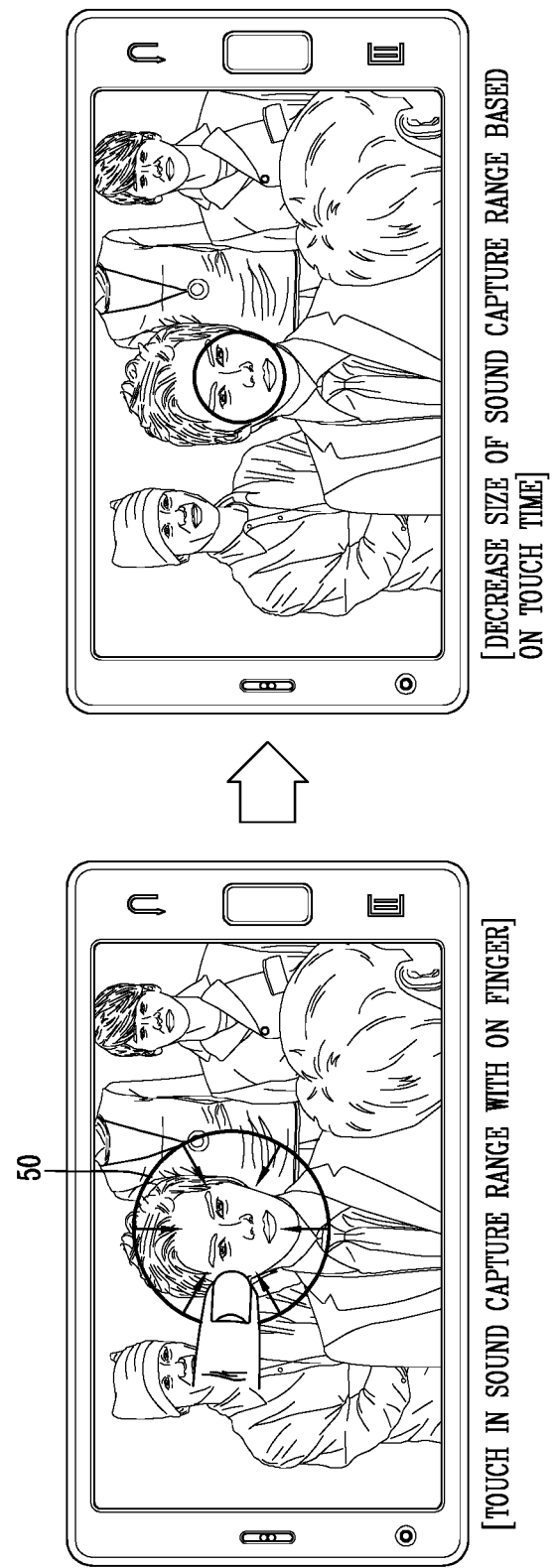

As illustrated in FIG. 11A, when the user applies a touch to the outside of the sound capture range 50 with his or her finger, the size of the sound capture range 50 is gradually increased in proportion to the touch duration time, and as illustrated in FIG. 11B, when a touch is applied to the inside of the sound capture range 50, the size of the sound capture range 50 is gradually decreased in proportion to the touch duration time.

Figure 11C:
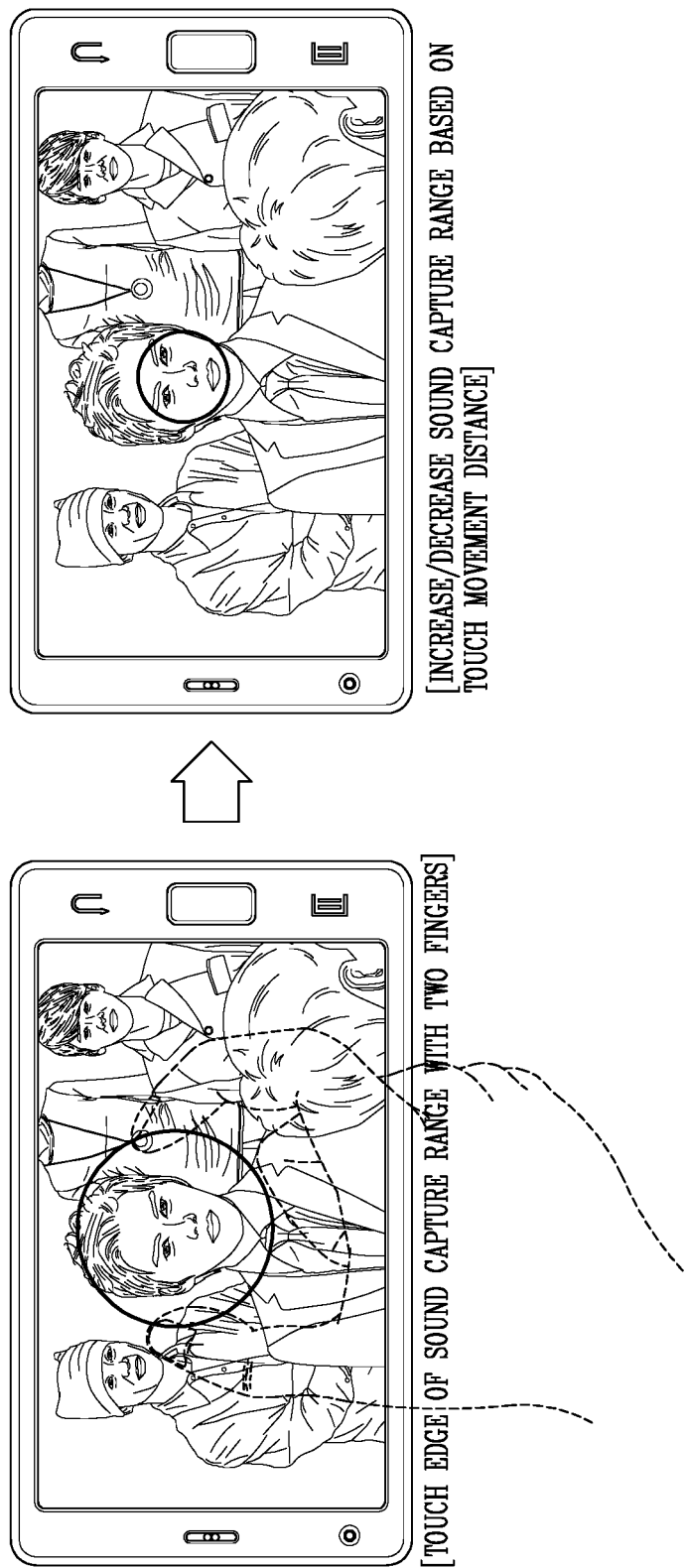

Furthermore, as illustrated in FIG. 11C, the user may apply a touch to the edge portion of the sound capture range 50 with his or her two fingers and then widen them outward or narrow them inward to enlarge or reduce the size of the sound capture range 50. In particular, when operated in a stereo mode, as illustrated in FIG. 11D, the sound capture range of the left or right channel may be controlled with his or her two fingers, respectively, and the sound capture range of the left or right channel may be touched at the same time to widen or narrow them so as to reconfigure the directivity of the sound capture.

Display of Uppermost Limit of Sound Capture Range Variation

As described above, the size of the sound capture range 50 may be enlarged or reduced within a sound capture enabled region. However, when the display size of the sound capture range 50 is enlarged or reduced by a touch or the display size of the sound capture range 50 is enlarged or reduced by the variation of the screen zoom magnification which will be described later, the user is unable to know to which level the sound capture range 50 is increased or decreased.

Accordingly, the present disclosure provides a visual, auditory, and tactile effect at the limit values, namely, minimum and maximum values of the sound capture range 50, thereby providing information on the variation limit of the sound capture range 50 to the user. The information on the variation limit of the sound capture range 50 is visual, auditory, tactile and olfactory information, for example, including a size bouncing effect, a shape bouncing effect, a color bouncing effect, sound or vibration generation, and the like. The information on the variation limit of the sound capture range 50 may be displayed on a popup message or capture screen in a direct manner or stereoscopic (3D) manner.

FIGS. 12A through 12E are an example of providing information on a variation limit of the sound capture range. The embodiment has been described in a capture mode as an example, but it may not be necessarily limited to this, and may be applicable in the same manner to a case where the user selects a reproduction mode.

Figure 12A:
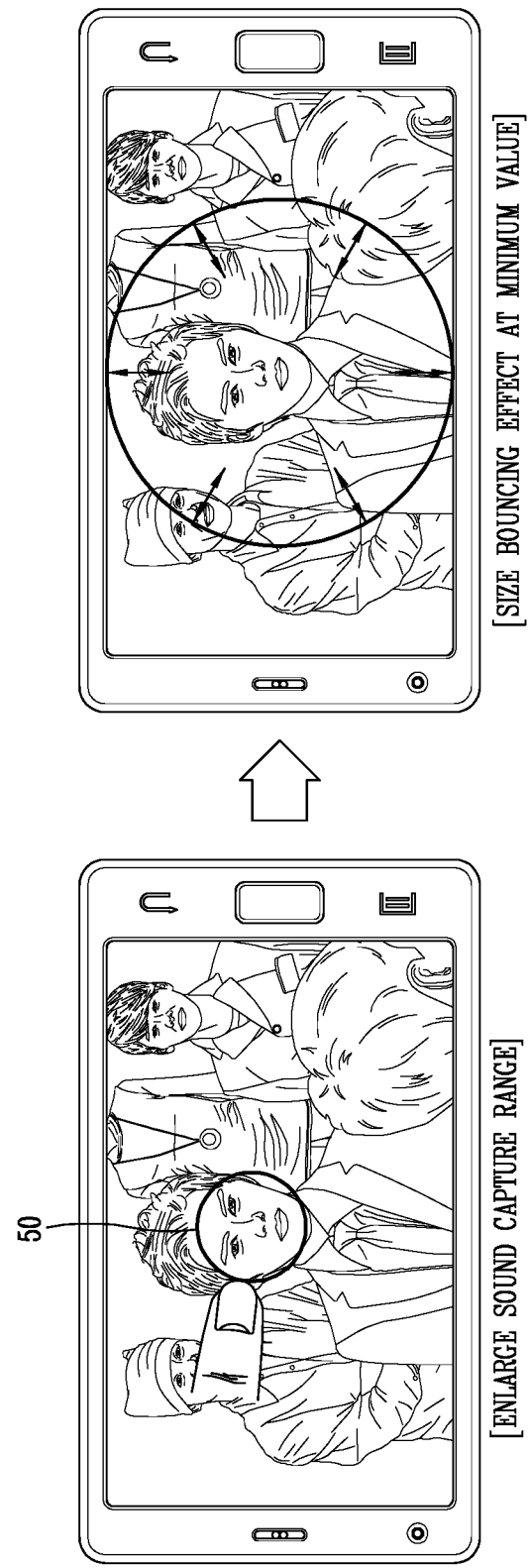
Figure 12B:
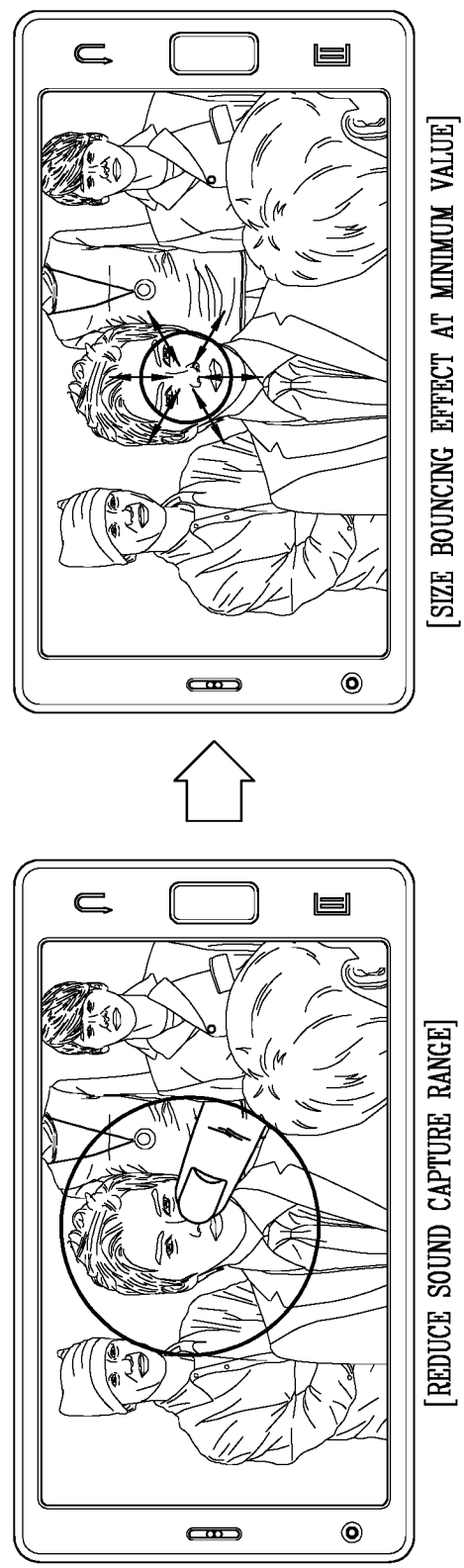

As illustrated in FIGS. 12A and 12B, when the user applies a touch to the outside of the sound capture range 50 to enlarge the size thereof or applies a touch to the inside of the sound capture range 50 to reduce the size thereof, the controller 180 displays a size bouncing effect in which the size of the sound capture range 50 temporarily crosses over the limit value and then restores it again if the enlarged or reduced size of the sound capture range 50 approaches the limit value (maximum or minimum value).

For another embodiment, according to the present disclosure, as illustrated in FIG. 12C, when the size of the sound capture range 50 is enlarged or reduced, the controller 180 provides a shape bouncing effect in which the shape of the sound capture range 50 is temporarily changed and then restored to its original shape again if the enlarged or reduced size of the sound capture range 50 approaches the limit value (maximum or minimum value).

For still another embodiment, according to the present disclosure, as illustrated in FIG. 12D, when the size of the sound capture range 50 is enlarged or reduced, the controller 180 provides a color bouncing effect in which the color of the sound capture range 50 is temporarily changed (for example, red to green) and then restored to its original color again if the enlarged or reduced size of the sound capture range 50 approaches the limit value (maximum or minimum value).

For yet still another embodiment, according to the present disclosure, as illustrated in FIG. 12E, when the size of the sound capture range 50 is enlarged or reduced, the controller 180 generates a new sound or outputs a vibration sound for a preset period of time if the enlarged or reduced size of the sound capture range 50 approaches the limit value (maximum or minimum value).

Store Sound Capture Range

The user's configured sound capture range 50 and a plurality of selectable sound capture ranges are stored in the memory 160. Accordingly, the user's configured sound capture range may be displayed according to the user's touch input, and the plurality of selectable sound capture ranges may be displayed for the user's selection whenever the user's specific event occurs.

Hereinafter, an audio zooming method of a mobile terminal according to an embodiment of the present disclosure will be described as follows with reference to the accompanying drawings.

The audio zooming method according to the present disclosure refers to a method of applying various zooming techniques to the location or range setting of subjects of interest, camera mode, actual camera operation (zooming operation or focusing movement) to capture the sound or voice of the relevant subject in an optimal manner. In order to implement the audio zooming method, the present disclosure captures a sound using a microphone array, and uses beamforming technology, noise suppression technology, face recognition technology, automatic focusing technique, and the like.

Figure 13:
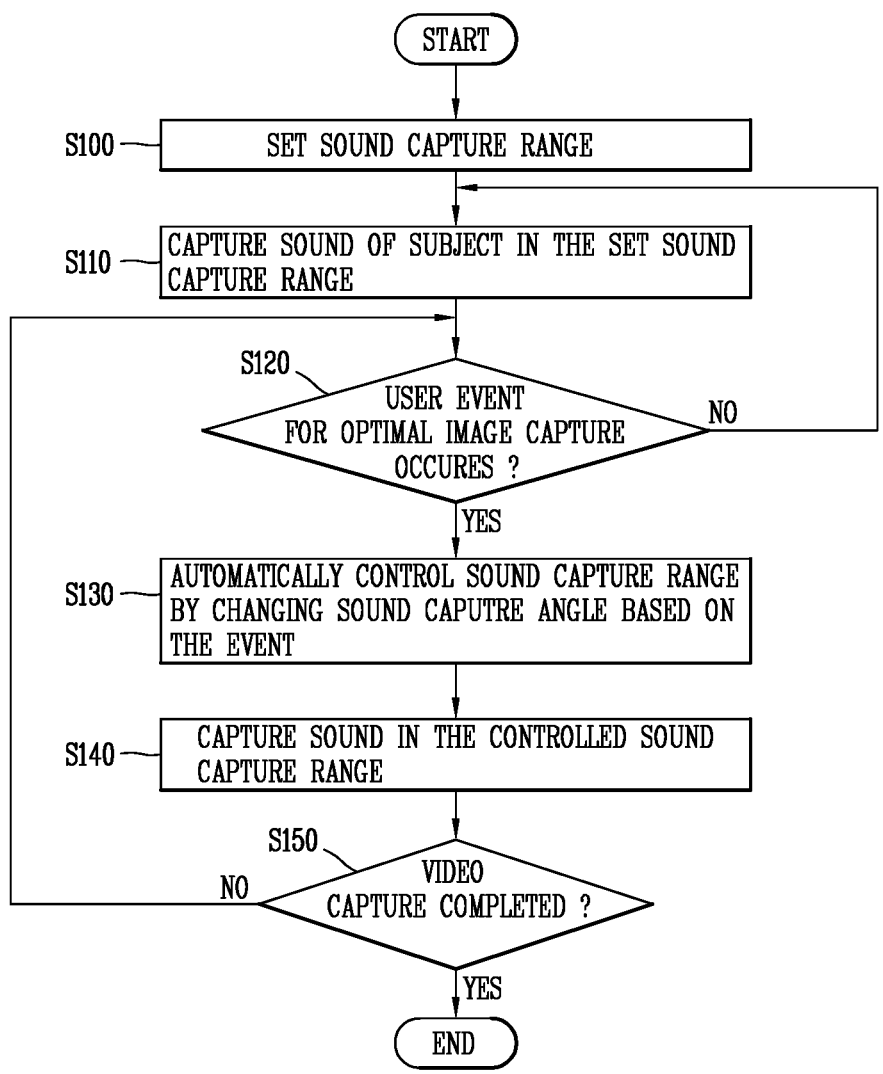
FIG. 13 is a flow chart illustrating an audio zooming method of a mobile terminal according to an embodiment of the present disclosure.

FIG. 13 is a flow chart illustrating an audio zooming method of a mobile terminal according to an embodiment of the present disclosure. The audio zooming method has been described in a capture mode as an example, but it may not be necessarily limited to this, and may be applicable in the same manner to a case where the user selects a reproduction mode.

The user closes up (zooms in) a specific subject when he or she desires to look at the subject, and zooms out it to a wide screen when he or she is interested in the surrounding background of the subject. Accordingly, according to a first embodiment of the present disclosure, user preference information for which the user specifies his or her interest region through the zoom in/out of the screen is used as a reference for determining the capture range of the sound.

In other words, as illustrated in FIG. 13, the user configures a general capture mode and configures the sound capture range 50 during the video capturing phase (S100).

The sound capture range 50 may be automatically set to default or may be set directly by the user. The size or shape of the automatically or manually set sound capture range 50 may be directly controlled by the user using a method illustrated in FIGS. 11A through 11C. Furthermore, the user may control it using a scroll bar displayed at the bottom portion of the screen or control it by entering a sound capture angle, and may select the display location using a menu option.

When the user starts image capturing, the controller 180 captures a subject, for example, a user's voice in the set sound capture range (S110). In this state, when the user's event for capturing an optimal image, namely, a user event for changing the capture location or range and situation of a subject occurs, the sound capture angle is changed according to each event to automatically control the set sound capture range (S120, S130).

The user event may include a change of the screen zoom in/out or capture mode. The change of the capture mode may include one of changes to a landscape mode, a portrait mode, a street mode, a stereo mode and a hearing aid mode in a basic capture mode, and furthermore, may include the selection of a front/rear capture mode. However, it may not be limited to this, and may include a conversion to a general capture mode in the other mode.

Accordingly, the controller 180 may capture a sound of the subject in the automatically controlled sound capture range 50 to capture an optimal sound in connection with an image change. As far as video capturing is not completed, the controller 180 repeatedly performs the foregoing processes.

Figure 14:
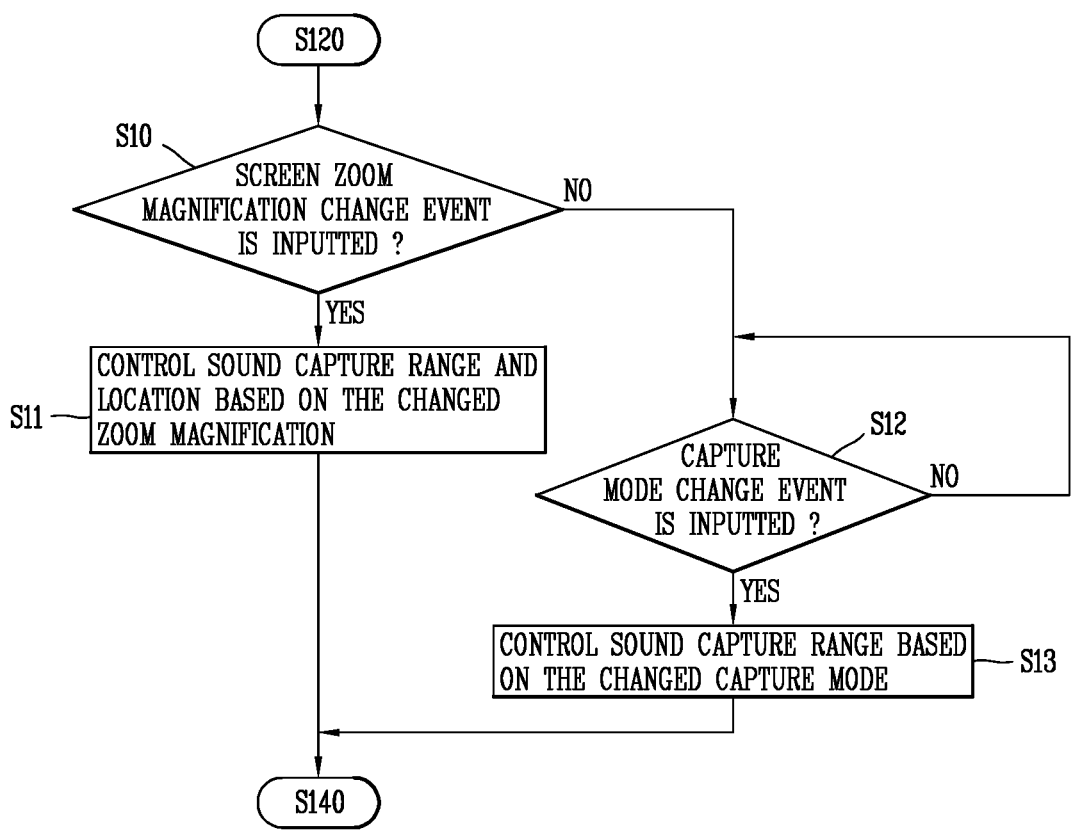
FIG. 14 is a view illustrating an example of controlling a sound capture range when screen zoom in/out which is a kind of user event occurs.

FIG. 14 is a flow chart illustrating an example of controlling a sound capture range when screen zoom in/out which is a kind of user event occurs. The embodiment has been described in a capture mode as an example, but it may not be necessarily limited to this, and may be applicable in the same manner to a case where the user selects a reproduction mode.

As illustrated in FIG. 14, when a user event occurs, the controller 180 determines the kind of the relevant event. When the determined event is screen zoom in/out, the controller 180 changes the sound capture angle and location according to the changed zoom magnification to automatically control the sound capture range 50 (S10, S11).

On the contrary, when the determined event is a specific capture mode as illustrated in FIGS. 7A through 7C, the controller 180 changes the sound capture angle according to the changed capture mode to automatically control the sound capture range 50 (S12, S13).

For another embodiment, when the event is screen zoom in/out, the controller 180 does not automatically change the sound capture range 50, and provides a plurality of sound capture enabled regions to the user, thereby allowing the user to select it.

Figure 15A:
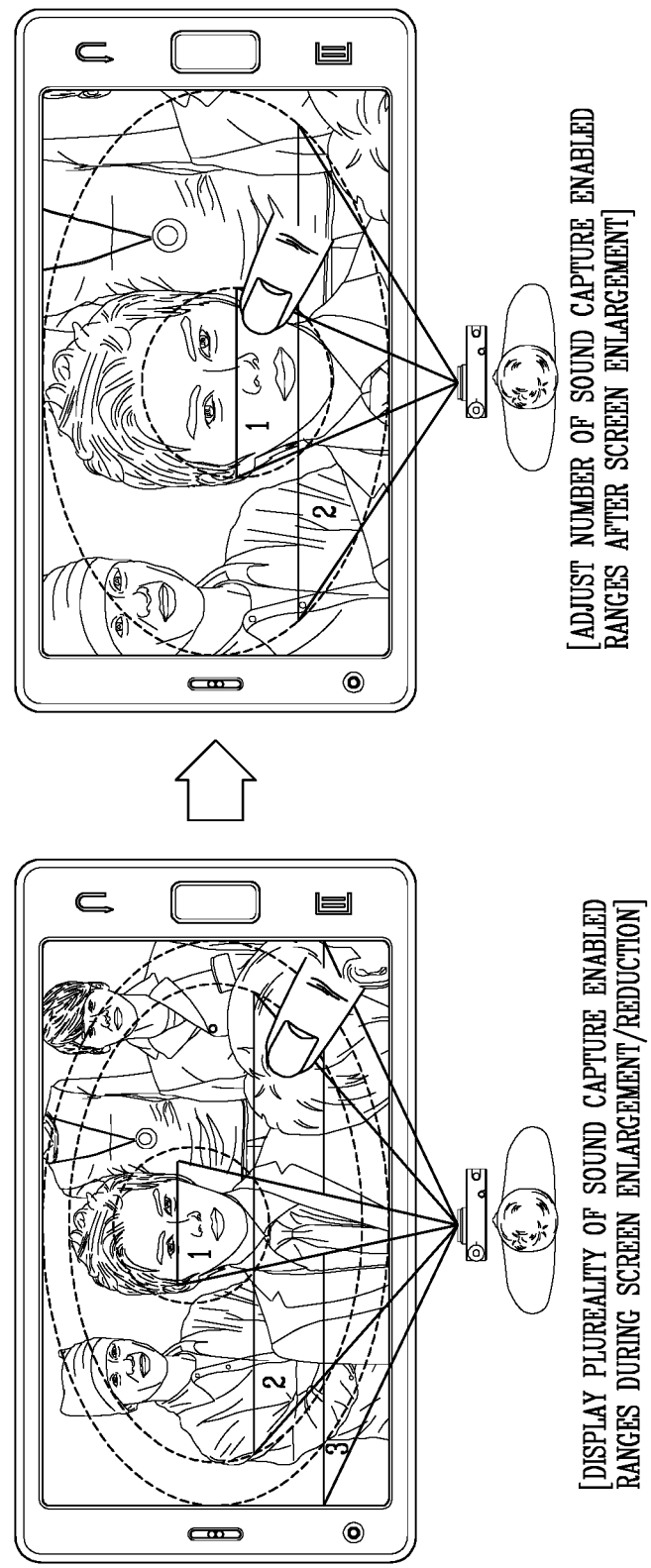

FIGS. 15A and 15B are an example of providing a preset option in a sound capture range during the screen zoom in/out phase. The embodiment has been described in a capture mode as an example, but it may not be necessarily limited to this, and may be applicable in the same manner to a case where the user selects a reproduction mode.

As illustrated in FIG. 15A, the controller 180 checks a current mode setting during the screen zoom in/out phase, and controls the sound capture range according to the zoom magnification when the screen zoom link mode is set, but displays a plurality of sound capture ranges 50 when the sound zoom link mode is set. If the screen is zoomed in, the number of the displayed sound capture enabled ranges is readjusted and displayed according to the enlarged screen, thereby allowing the user to additionally select the sound capture range 50 on the screen.

Furthermore, as illustrated in FIG. 15B, in case of a portrait mode which is set to a gun mode, the sound capture angle is constantly maintained even when the screen is enlarged. Accordingly, when a gun mode is set, the display size of the sound capture range is enlarged (resized) and displayed in proportion to the screen zoom magnification in a state that the sound capture angle is constantly maintained.

Figure 16A:
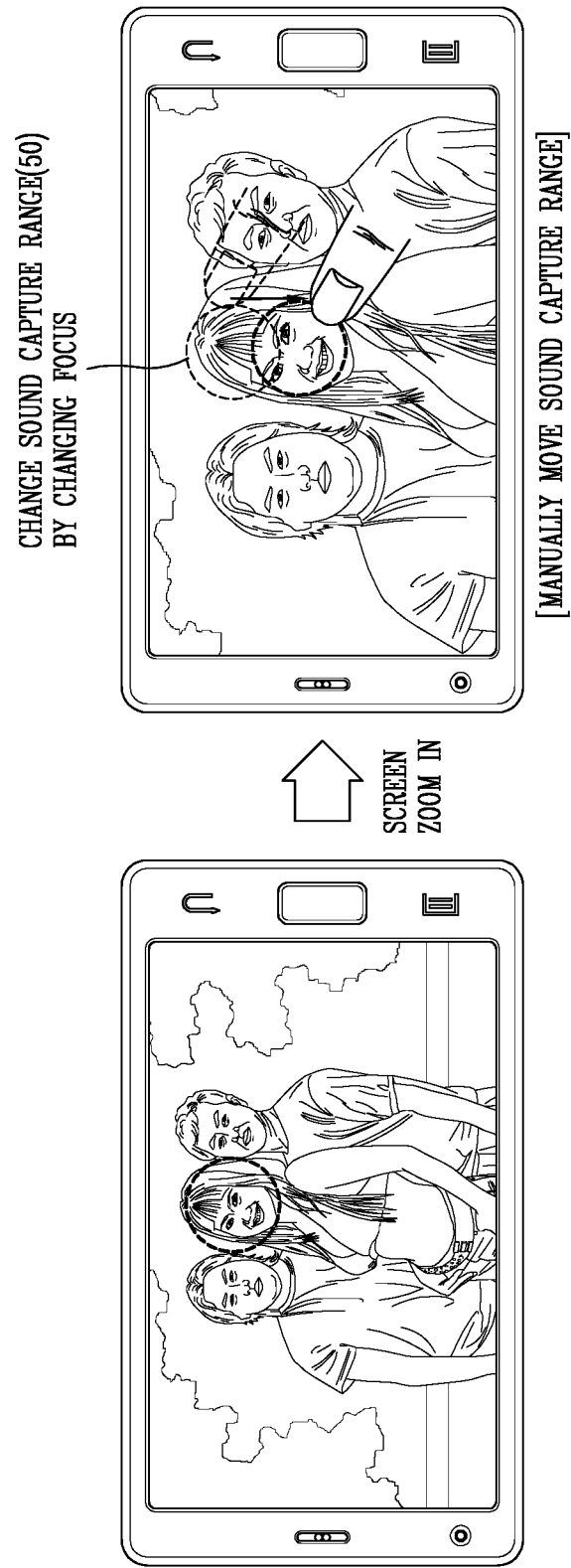
FIGS. 16A and 16B are views illustrating the location change of a sound capture range according to a focus change.
Figure 16B:
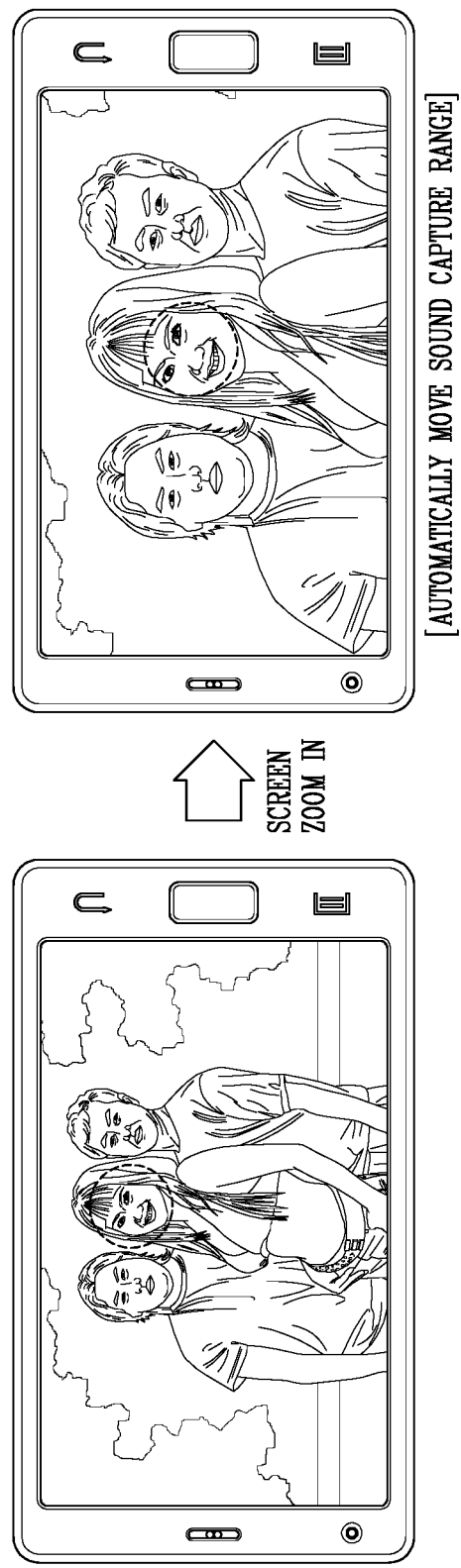

FIGS. 16A and 16B are views illustrating the location change of a sound capture range according to a focus change. The embodiment has been described in a capture mode as an example, but it may not be necessarily limited to this, and may be applicable in the same manner to a case where the user selects a reproduction mode.

As illustrated in FIG. 14, when an event is screen zoom in/out, the controller 180 should change the sound capture location as well as the sound capture angle according to the changed zoom magnification. It is because if screen zoom in (or zoom out) is performed while video reproduction or capturing is carried out by focusing a specific region or subject, then the sound capture region is automatically changed according to the zoom magnification as illustrated in FIG. 16A, and thus the reconfigured focus region does not correspond to the location of the sound capture range. In this case, when the magnification of the screen is changed by a manual pointing technique in the related art, the user specifies the sound capture location one by one again.

However, according to the present disclosure, as illustrated in FIG. 16B, automatic focusing is carried out using a location recognition function, and thus the sound capture location is automatically readjusted around the reconfigured screen automatic focus region according to the zoom magnification.

The user manually selects a specific subject of interest to readjust a focal point around the subject or configure an optimal focal point of the image using an automatic focus control function.

In general, a manual screen focus location adjustment function may be unattainable or burdensome to the user because a specific subject of interest should be selected in real time using a touch when recording or reproducing video with a lot of scene changes or when using VT calling in which a call should be carried out in parallel.

As a result, though there is a function of automatically selecting the subject of interest in connection with an object (face) detecting/tracking technology, when a plurality of subjects (for example, two persons) exist on the screen, how to automatically select a specific subject of interest has been emerged as a task to be solved. For the solution, screen focusing is formed around a subject having the largest face but when there is one person at the center of the screen and the other person exists at the rear to talk to each other, it has a limit in that screen focusing is set only to a central person having the largest face. Accordingly, when the sound capture range is associated with the screen focusing, there is a limit in which the sound capture range is set to only a central person having the largest face.

Figure 17:
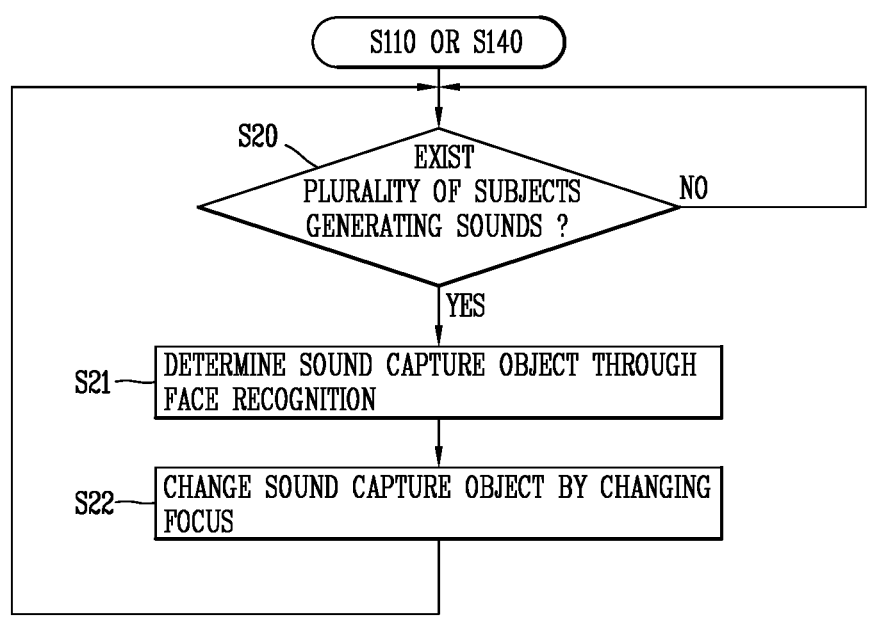
FIG. 17 is a flow chart illustrating a method of changing a sound capture object when capturing the sounds of a plurality of subjects.

FIG. 17 is a flow chart illustrating a method of changing a sound capture object when capturing the sounds of a plurality of subjects. The flow chart has been described in a capture mode as an example, but it may not be necessarily limited to this, and may be applicable in the same manner to a case where the user selects a reproduction mode.

When the sound of the subject is captured in a sound capture range controlled according to the initially configured sound capture range or event, the controller 180 determines whether or not there exist a plurality of subjects generating sounds through face recognition (S20). As a result of the determination, when there exist a plurality of subjects, the controller 180 determines subjects generating sounds and then automatically changes the focus to a subject currently generating a sound to move the sound capture range 50 to the relevant subject, thereby automatically changing the sound capture object (S21, S22).

A method of automatically changing a subject object whenever the sound capture subject is changed may be referred to as an audio/video (A/V) synchronization automatic focusing method.

Figure 18A:
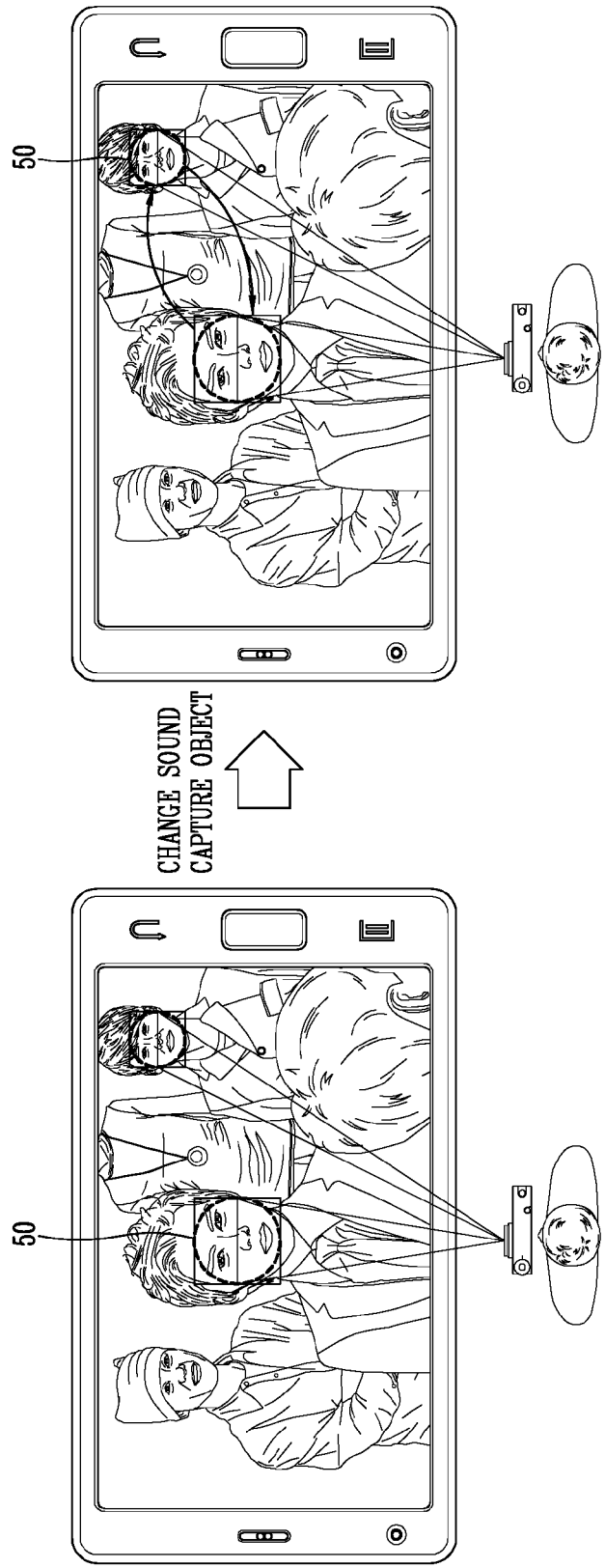
FIGS. 18A and 18B are views illustrating an example of automatically changing a sound capture object according to the present disclosure.
Figure 18B:
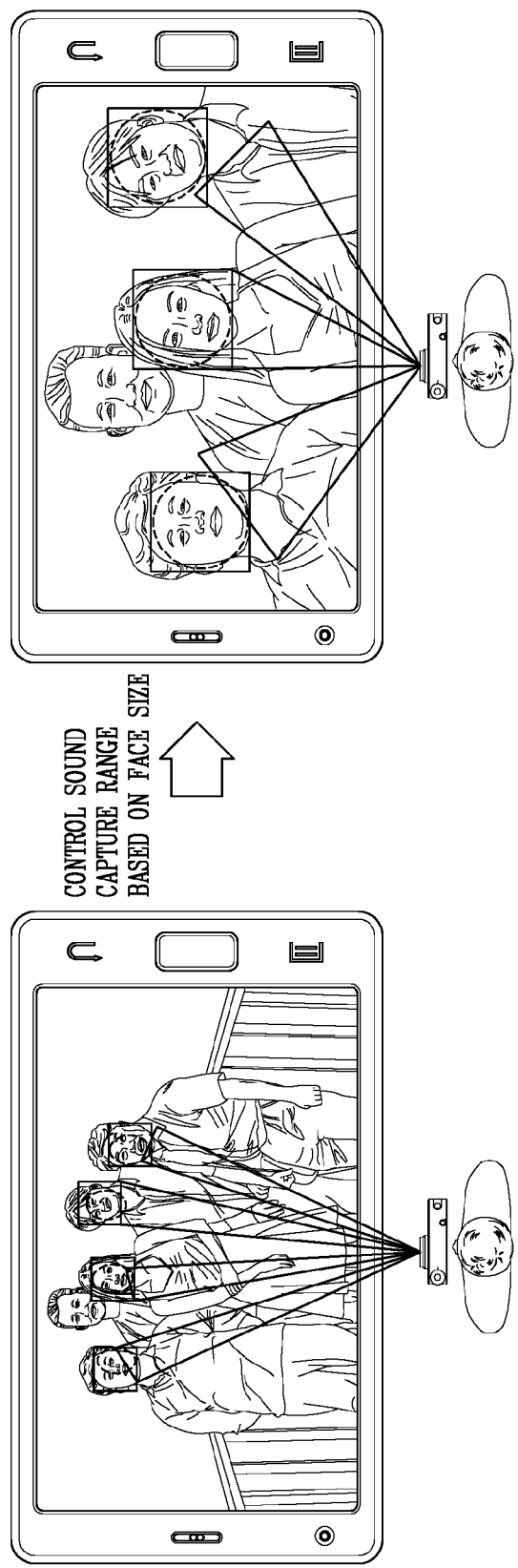

FIGS. 18A and 18B are an example of automatically changing a sound capture object according to the present disclosure. The embodiment has been described in a capture mode as an example, but it may not be necessarily limited to this, and may be applicable in the same manner to a case where the user selects a reproduction mode.

As illustrated in FIG. 18A, the controller 180 automatically changes the sound capture object according to the sound generation subject.

For example, when there exist two or more users, the controller 180 detects each user's face through face recognition and then forms a narrow sound beam (directivity) in each face direction to collect sounds from each user. The controller 180 monitors the collected sounds and detects the sound generation subject, namely, a user generating a sound or a user generating a greater sound, and then automatically focuses on the relevant user's face to form the band stop filter 51, thereby capturing the user's voice currently generating a sound.

Then, when the subject of generating a voice is changed, the controller 180 automatically focuses another user's face in a natural manner to form a sound capture range on the relevant user's face, thereby automatically changing the sound capture object. Accordingly, when the users talk to each other, the controller 180 focuses each user's face to move the sound capture range 50, thereby automatically changing the sound capture object.

As illustrated in FIG. 18B, for another embodiment, the controller 180 may determine a sound capture object in the size of an object in the screen on which the sound capture object is captured. In other words, the initial sound capture object may be adjusted to the user having the largest face size and then automatically focused on the user generating a sound to change the display of the sound capture range 50. At this time, the sound capture range is automatically controlled according to the face size.

As described above, when there exist a plurality of users generating sounds, the sound capture range 50 is moved to the user generating a sound to capture the sound. However, when the sound capture range is moved in a short instant, it may cause the effect of sound capture disconnection. Accordingly, the present disclosure provides various emotional sound capture range movement methods for outputting a smooth audio visual effect during the movement of the sound capture range.

Figure 19A:
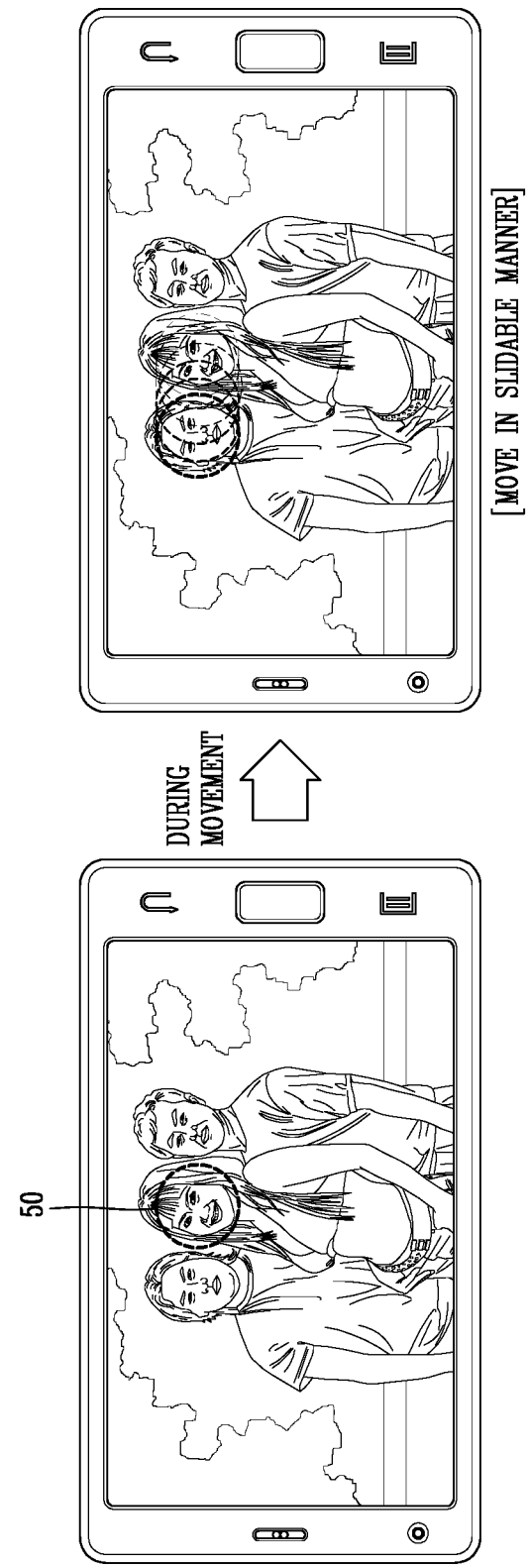
FIGS. 19A through 19C are views illustrating an example of audio-visual effect for preventing the disconnection of sound capture when moving a sound capture region.
Figure 19B:
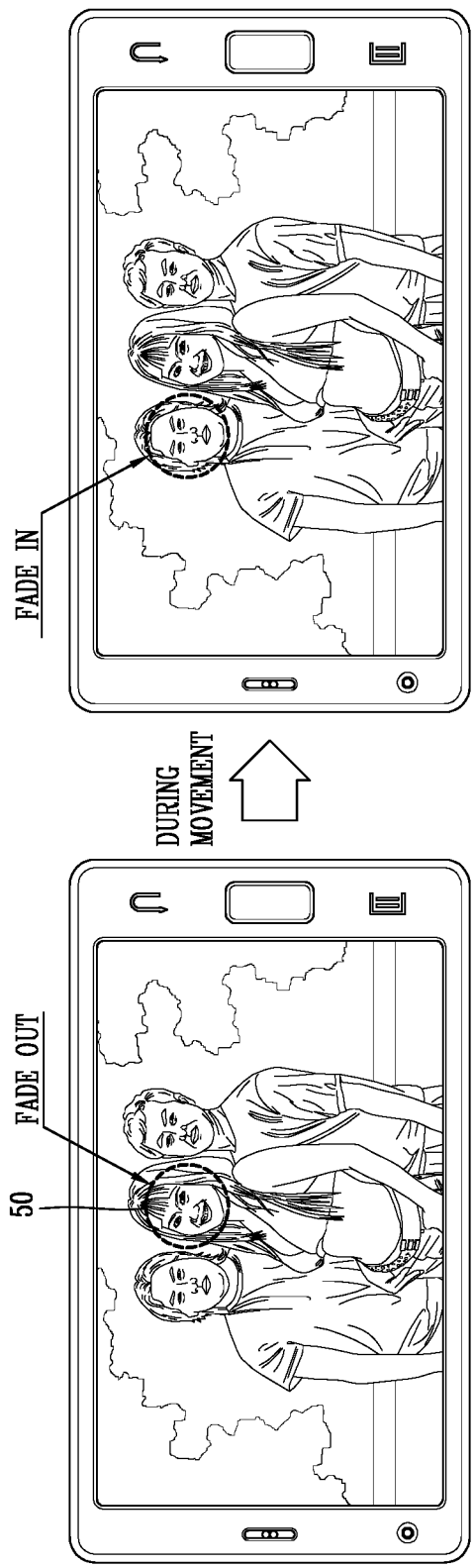
Figure 19C:
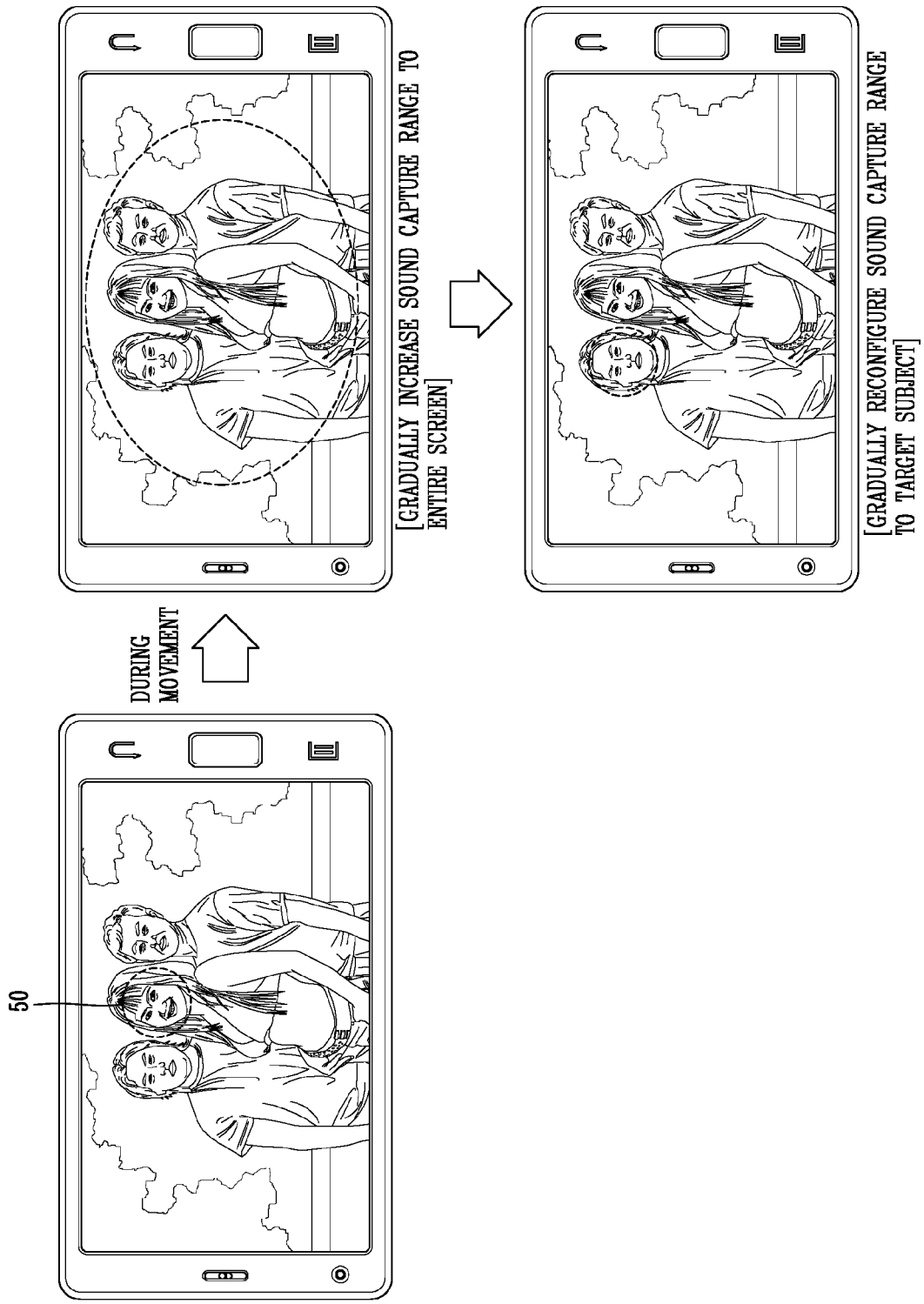

FIGS. 19A through 19C are views illustrating an example of audio-visual effect for preventing the disconnection of sound capture when moving a sound capture region. The embodiment has been described in a capture mode as an example, but it may not be necessarily limited to this, and may be applicable in the same manner to a case where the user selects a reproduction mode.

FIG. 19A illustrates a smooth dragging technique in which the controller 180 outputs a sound effect moved when the sound capture object is changed to move the sound capture range 50 in a sliding manner. Furthermore, FIG. 19B illustrates a method of changing the sound capture object using a fade-in/fade-out technique, wherein the controller 180 generates a predetermined sound along with a visual fade-in/fade-out effect. Furthermore, FIG. 19C illustrates a method of changing the sound capture object using a sound capture region enlargement technique, wherein the controller 180 expands the sound capture range 50 to the entire range and then reconfigures the sound capture range 50 to a new subject again.

On the other hand, in case where the location of the subject is different from the location of a sound generated by the relevant subject when an audio zooming method according to an embodiment of the present disclosure is applied thereto, it exhibits a significantly limited sound capture performance.

Accordingly, the present disclosure forms a sound directivity at a location different from the subject desired to be captured and reproduced to provide an audio/video dual focusing method capable of optimally capturing the sound of the relevant subject.

The present disclosure may provide various sound capture methods combined with events during which the user selects the location, range and situation of a subject of interest and an audio zooming technique to obtain an optimal image while capturing and reproducing an image.

Furthermore, the present disclosure provides an expression technology in which the user can control one or a plurality of sound capture locations and ranges in a delicate and convenient manner without being collided with the basic UI scenario of a camera for controlling screen focusing, zoom magnification or the like, thereby providing a scheme capable of capturing or reproducing the audio of the subject of interest in an optimal manner.

The control of one or a plurality of sound capture locations and ranges is carried out through a contact or non-contact scheme such as the user's behavior or gesture to the captured or reproduced image. An input due to the contact or non-contact scheme may include a single touch, a multi touch, a multipoint touch, a flicking, and a touch & drag. In particular, the present disclosure can visually display a sound strength ratio between each subject when the one of plurality of sound capture locations and ranges are controlled.

The captured or reproduced image may be displayed on the display unit of the mobile terminal or displayed on a hologram in a separate manner from the mobile terminal. The foregoing input and display methods will be commonly applied to all embodiments which will be described later.

Furthermore, when there exists a sound source at a different location from that of the subject desired to be captured or reproduced, a sound directivity is formed at the location of the sound source, thereby providing a scheme capable of optimally capturing the sound of the relevant subject.

Furthermore, the present disclosure provides a scheme capable of allowing the user to select a specific sound source using an audio thumbnail technique for displaying the location and size of the sound sources exiting in the screen and an augmented reality (AR) technique for displaying the direction and size of the sound source existing out of the screen while capturing or reproducing the subject located in the front direction.

To this end, the present disclosure provides a technology to which audio focusing can be applied to a different location from that of screen focusing at the same time in an independent manner when the location of the subject is different from that of the sound generated from the subject.

In general, a selectable directivity between sound sources on the horizontal or vertical axes on the basis of the user is required to capture a sound source while capturing video. The directivity is carried out through signal processing such as beamforming for sounds (or voices) captured through a plurality of microphones. The beamforming denotes forming a range to be sound captured with a sound beam to generate a directivity. The audio zooming method which will be described later has been described in a capture mode as an example, but it may not be necessarily limited to this, and may be applicable to a reproduction mode in the same manner.

As described above, a relation between a sound capture angle and a sound capture range on the capture screen is illustrated in FIG. 6. Referring to FIG. 6, a sound capture range on the capture screen indicates a horizontal directional range formed by an angle of the sound beam formed in the subject direction, namely, a sound capture angle, and a region having a predetermined shape formed by the sound capture range is referred to as a sound capture region. The size and shape of the sound capture region is configured according to the user's touch input. The sound beam exhibits a directivity to the subject of interest. The sound beam indicates an operation due to a beamforming unit in FIG. 3 without being displayed in actuality.

The sound capture range is increased as increasing the sound capture angle, and thus the sound can be captured in a wide range, but the sound capture range is decreased as decreasing the sound capture angle, and thus the sound can be concentratedly captured in a narrow range.

Figure 20:
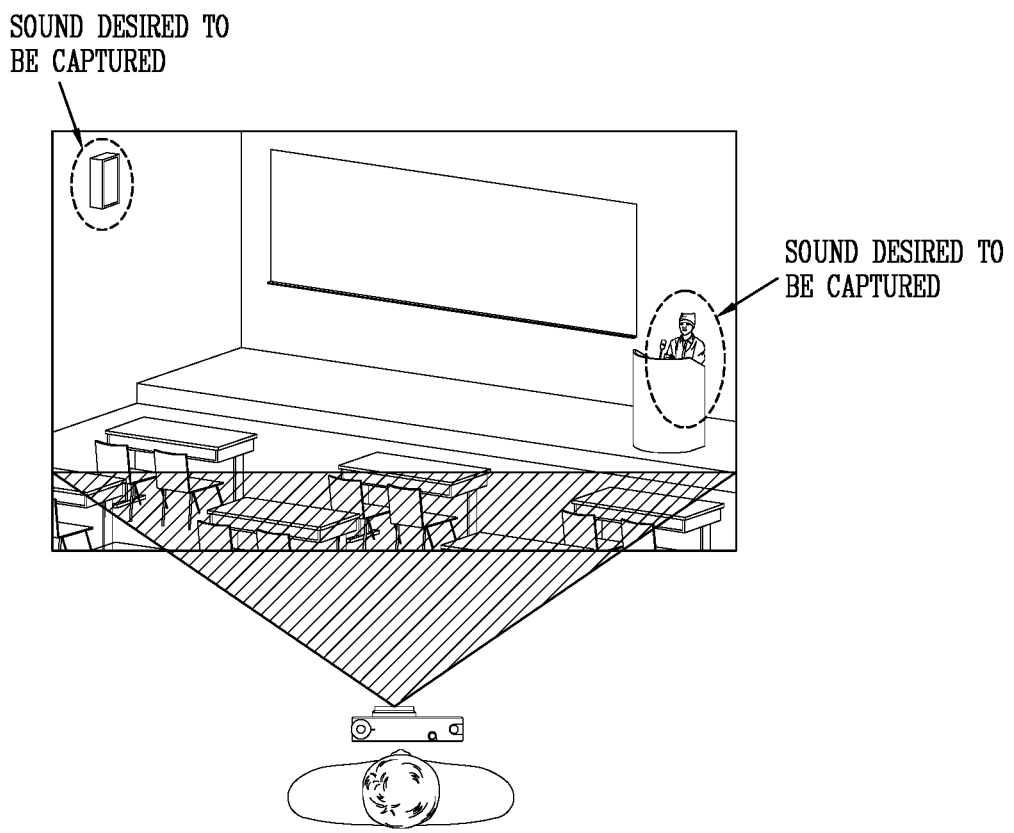
FIG. 20 is a view illustrating an example of capturing a sound when the location of sound generated from the subject is different from the conventional location of the subject.

FIG. 20 is a view illustrating an example of capturing a sound when the location of sound generated from the subject is different from the conventional location of the subject.

When a singer or instructor sings a song or give a lecture using a microphone, there are a lot of cases where a speaker delivering the relevant song or voice exists at a different location though the signer or instructor is located at the center of the screen. In this case, when applying the foregoing audio zooming thereto, the sound capture range and sound capture region are set to the face of the relevant objects (singers or instructors), and thus the voice of the relevant object being outputted through the speaker tends to be improperly captured. In other words, a conventional technology of capturing only a sound generated from the subject existing at the very central region of the screen in a fixed manner all the time exhibits a significantly limited performance in a situation that sound generation locations between objects are different from one another.

However, as illustrated in FIG. 20, when captured or reproduced using a wide screen to capture all sounds generated from a speaker at the left side of the screen while capturing or reproducing an instructor's shape at the right side of the screen, it causes a problem of containing unnecessary background screens and surrounding noises.

Figure 21:
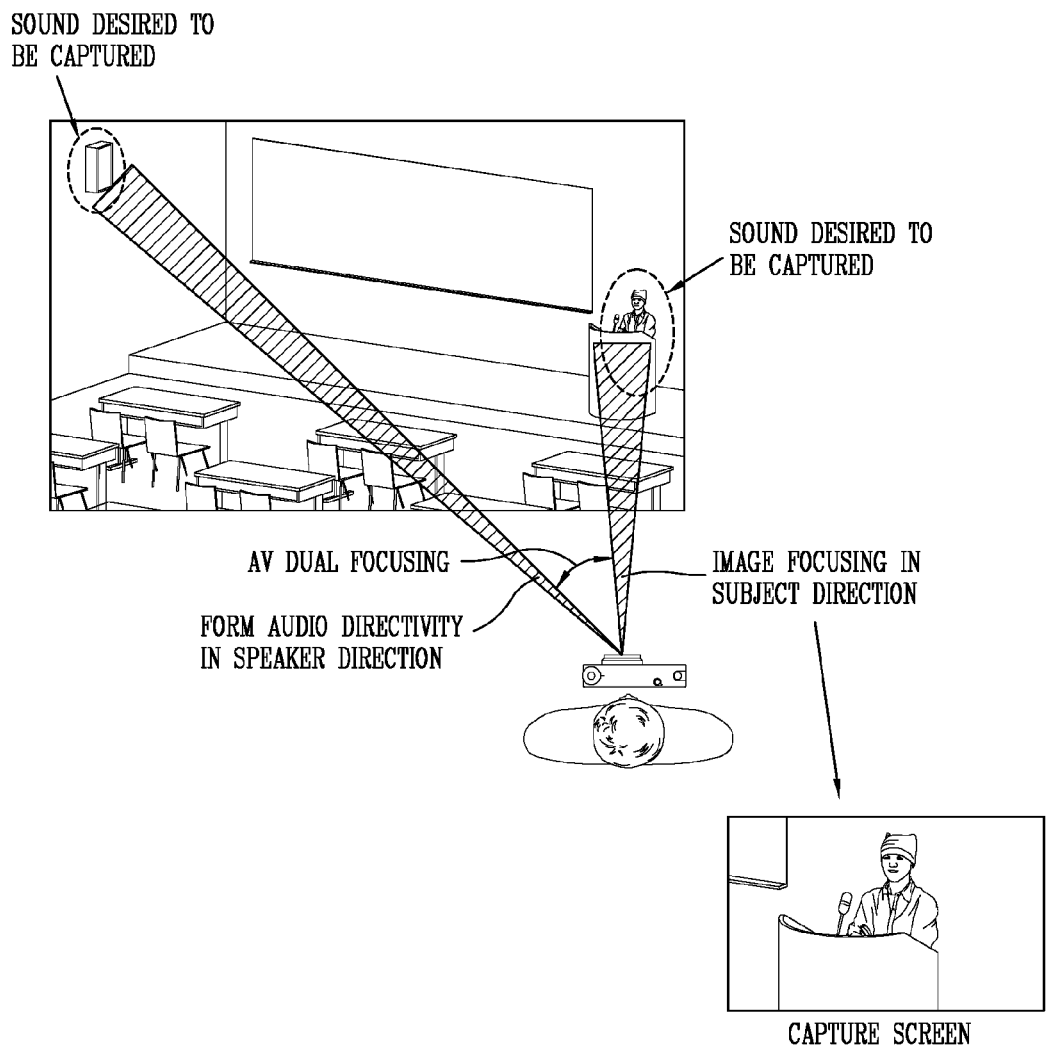
FIG. 21 is a conceptual view illustrating an audio/video dual focusing method according to an embodiment of the present disclosure.

FIG. 21 is a conceptual view illustrating an audio/video dual focusing method according to an embodiment of the present disclosure.

As illustrated in FIG. 21, the present disclosure provides a technology to which audio focusing can be applied to a different location from that of screen focusing at the same time in an independent manner when the location of the subject (for example, instructor) is different from that of the sound (for example, speaker) generated from the subject. In other words, image focusing is carried out in the direction of the subject at a front surface of the camera 121 to capture the subject, and an audio directivity is formed in the direction of the speaker 122 at the left to capture a sound generated from the speaker in a narrow sound capture range.

The foregoing audio/video focusing method can freely perform the zoom in/out of the screen based on the subject since the subject is located at the very center of the screen to capture it, and in particular, has an advantage capable of removing an emotional gap caused by a difference between locations generating the subject and the sound source.

In order to implement the audio/video dual focusing method, the present disclosure uses a voice detecting/tracking algorithm for automatically finding a sound generated from a different location from that of the subject, and uses steering for selectively capturing only a sound existing in an arbitrary direction, namely, beamforming technology. The various technologies and algorithms are carried out by the controller 180.

Furthermore, the present disclosure provides various user interfaces (UIs) capable of displaying the locations of a plurality of sound sources found by a voice detecting/tracking algorithm on the screen and allowing the user to select a sound source.

Figure 22:
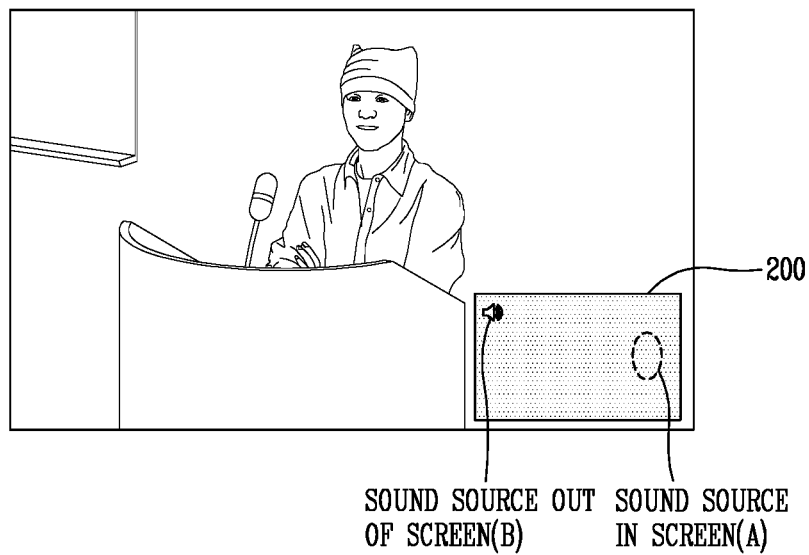
FIG. 22 is a view illustrating an example of displaying the location of sound when capturing video using an audio/video dual focusing method according to an embodiment of the present disclosure.

FIG. 22 is a view illustrating an example of displaying the location of sound when capturing video using an audio/video dual focusing method according to an embodiment of the present disclosure.

As illustrated in FIG. 22, when focusing the subject to capture it, the present disclosure displays an audio thumbnail 200 for notifying the location information (location, size and direction of a sound source) of a sound existing in or out of the screen at one side of the capture screen (main screen).

A sound existing in the screen and a sound existing out of the screen are displayed in a different manner from each other. For an example, a sound (A) existing in the screen is displayed in the form of a sound capture region, and the location of a sound existing out of the screen is displayed in the form of an icon.

The audio thumbnail 200 is displayed in a semi-transparent form using an augmented reality (AR) technique, and displayed for a predetermined period of time and then disappears, and displayed again when touching the relevant location.

Accordingly, the user may know that an invisible sound exists at the upper left direction based on a current screen by viewing a sound icon displayed on the audio thumbnail 200.

Figure 23:
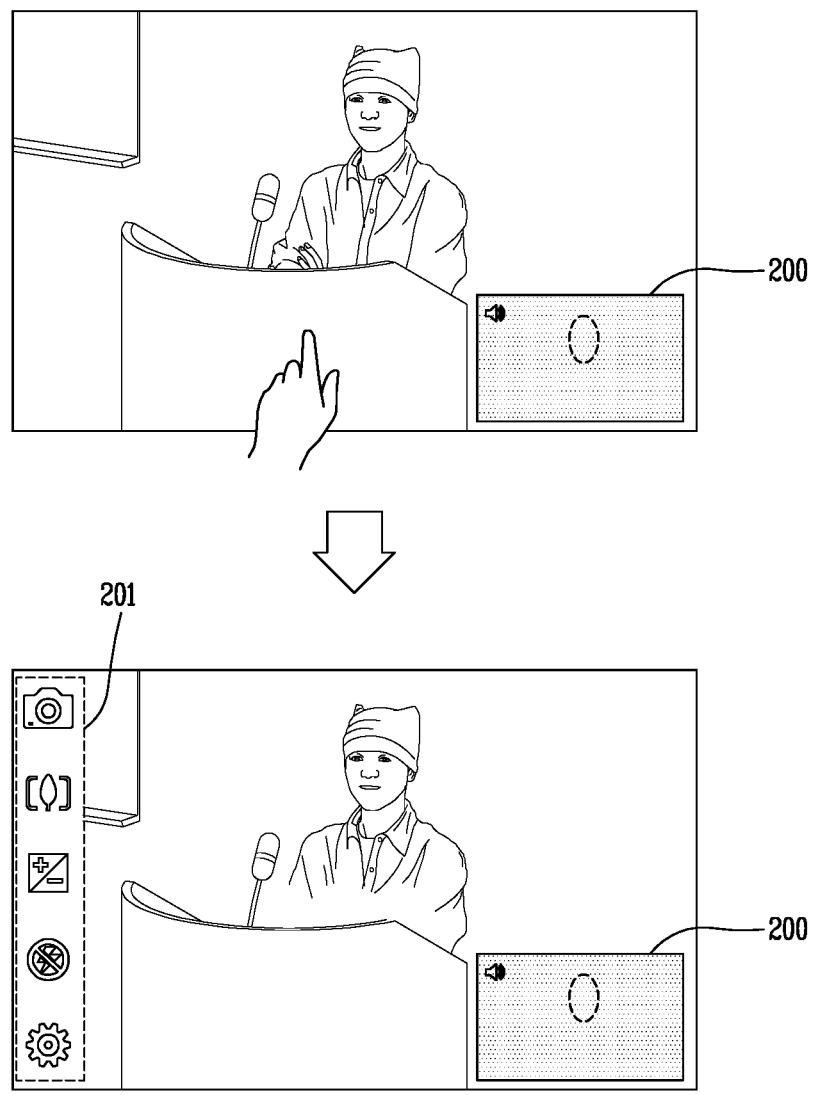
FIG. 23 is an example of activating a control icon on the capture screen.

FIG. 23 is an example of activating a control icon on the capture screen.

As illustrated in FIG. 23, when the user touches a general region (main screen) other than the audio thumbnail 200, a plurality of camcorder control icons 201 are displayed at one side of the screen, for example, at the left side.

The user may enlarge an image around the subject by selecting a specific camcorder control icon 201 or manually/automatically control the focus of the image while capturing the subject.

Figure 24:
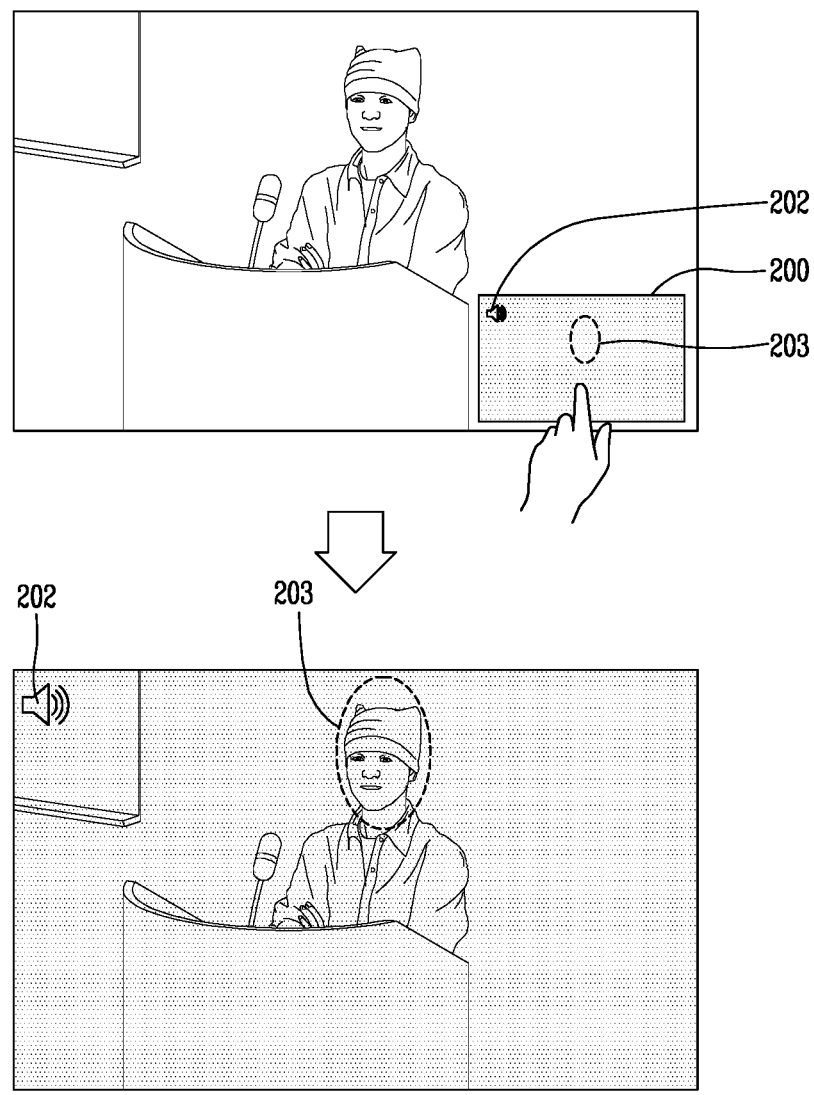
FIG. 24 is an example of overlaying an audio thumbnail on a capture image.

FIG. 24 is an example of overlaying an audio thumbnail on a capture image.

Since the audio thumbnail 200 displayed on the capture screen is small in size, it may be possible to know only the rough information of a sound source. The audio thumbnail 200 is enlarged in size by the user's touch input and displayed to be overlapped with a capture image, and when the same touch input is sensed again, it is reduced to its original size.

A sound source icon 202 indicating a sound source out of the screen and a sound capture region 203 indicating a sound source in the screen are displayed on the enlarged audio thumbnail 200 displayed in a semi-transparent form. Accordingly, the user may view the sound source icon 202 and sound capture region 203 to exactly know the intensity of the sound as well as the location, size and direction of the sound (source).

Figure 25A:
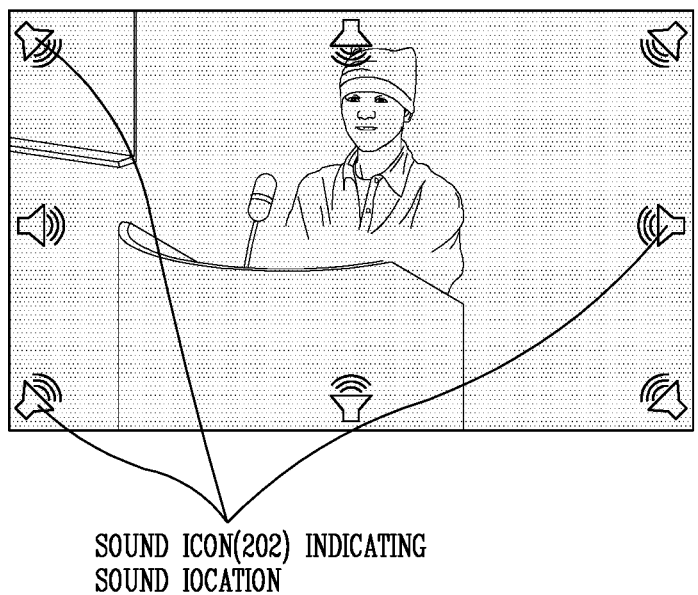
FIGS. 25A and 25B are an example of displaying a sound icon on the audio thumbnail overlaid with the capture image.
Figure 25B:
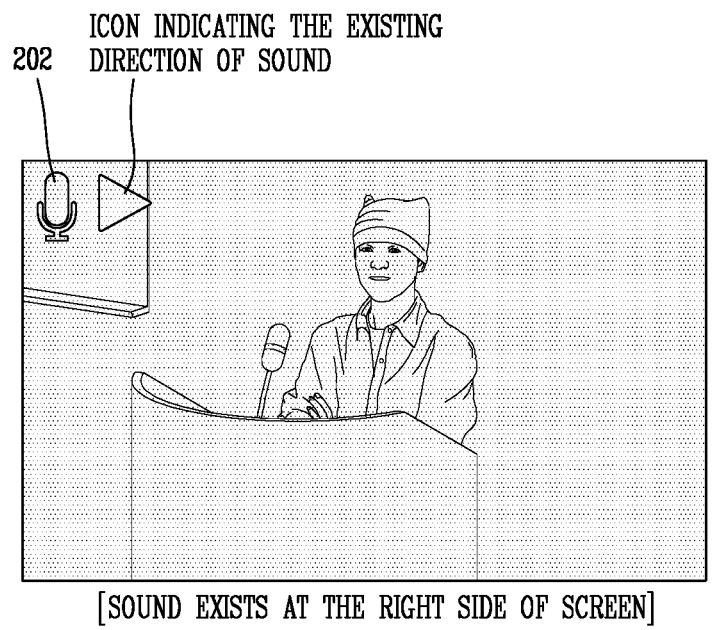
Figure 25B:
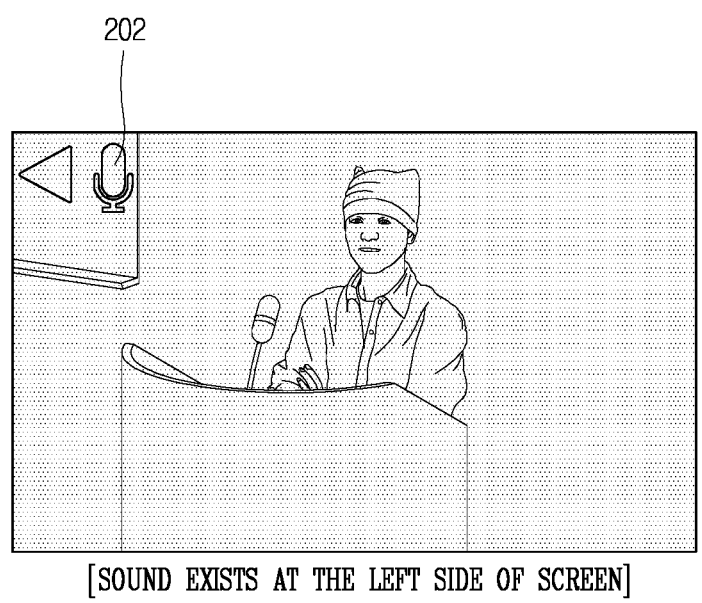

FIGS. 25A and 25B are an example of displaying a sound icon on the audio thumbnail 200 overlaid with the capture image.

When a sound generated from a different location from that of the subject is not seen because of being located out of the screen, the sound source icon 202 may be displayed at various locations. Accordingly, as illustrated in FIG. 25A, when the location of the sound is changed or a new sound is added or removed during the capture phase, the location of the sound source icon 202 is changed or added or removed according to the existing location of the actual sound. The intensity of the sound is concurrently displayed on the sound source icon 202.

For another example, the sound icon may exhibits the existing location of the sound at a fixed location. As illustrated in FIG. 25B, when the location of the actual sound is displayed using a sound icon fixed at the location, the existing direction of the actual sound is displayed at one side of the sound source icon 202. In particular, the sound source icon 202 may be displayed in various shapes and colors.

Figure 26:
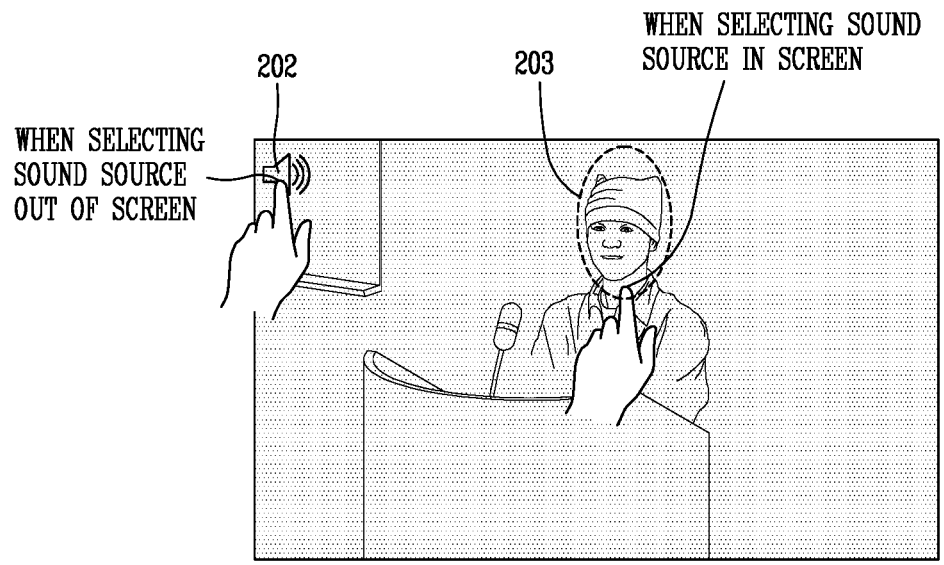
FIG. 26 is an example of selecting an object to be sound captured from the audio thumbnail.

FIG. 26 is an example of selecting an object to be sound captured from the audio thumbnail.

At least one sound source icon 202 indicating a sound source out of the screen and a sound capture region 203 indicating a sound source in the screen are displayed on the audio thumbnail 200 overlaid with the capture image.

Accordingly, the user selects his or her desired sound source icon 202 or selects the sound capture region 203 to fix the sound capture object and then captures an image of the subject.

For another embodiment, the user may move the camera to the location of the target sound source and then directly select it on the screen to fix a sound source to be captured and then capture the image of his or her desired subject.

Figure 27:
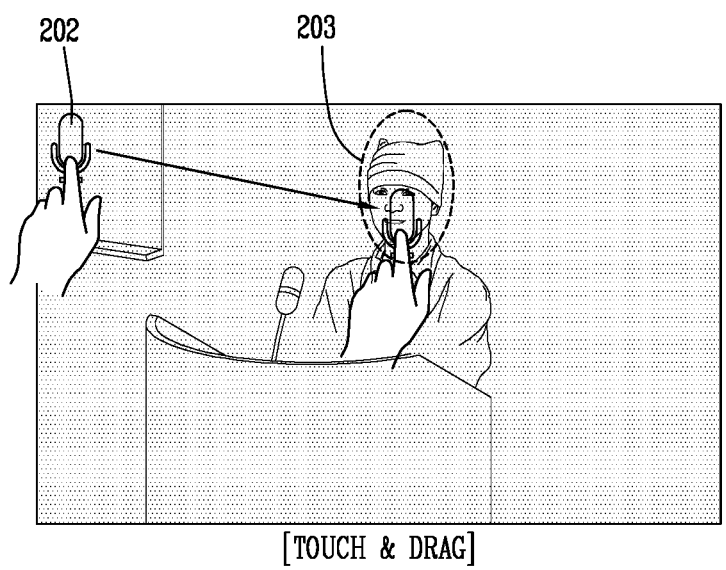
FIG. 27 is an example of performing sound source focusing and subject focusing at the same time.

FIG. 27 is an example of performing sound source focusing and subject focusing at the same time.

As illustrated in FIG. 27, the sound source icon 202 is touched on the audio thumbnail 200 overlaid on the capture image or non-overlaid audio thumbnail 200 to drag it to the subject to be captured, thereby performing sound source focusing and subject focusing at the same time. In other words, when a sound source existing out of the screen is captured, the sound source icon 202 indicating the relevant sound source is touched and then moved to the subject to be captured, thereby capturing the sound of the relevant subject through a sound source located at the outside, namely, a speaker, while capturing around the relevant subject.

Figure 28:
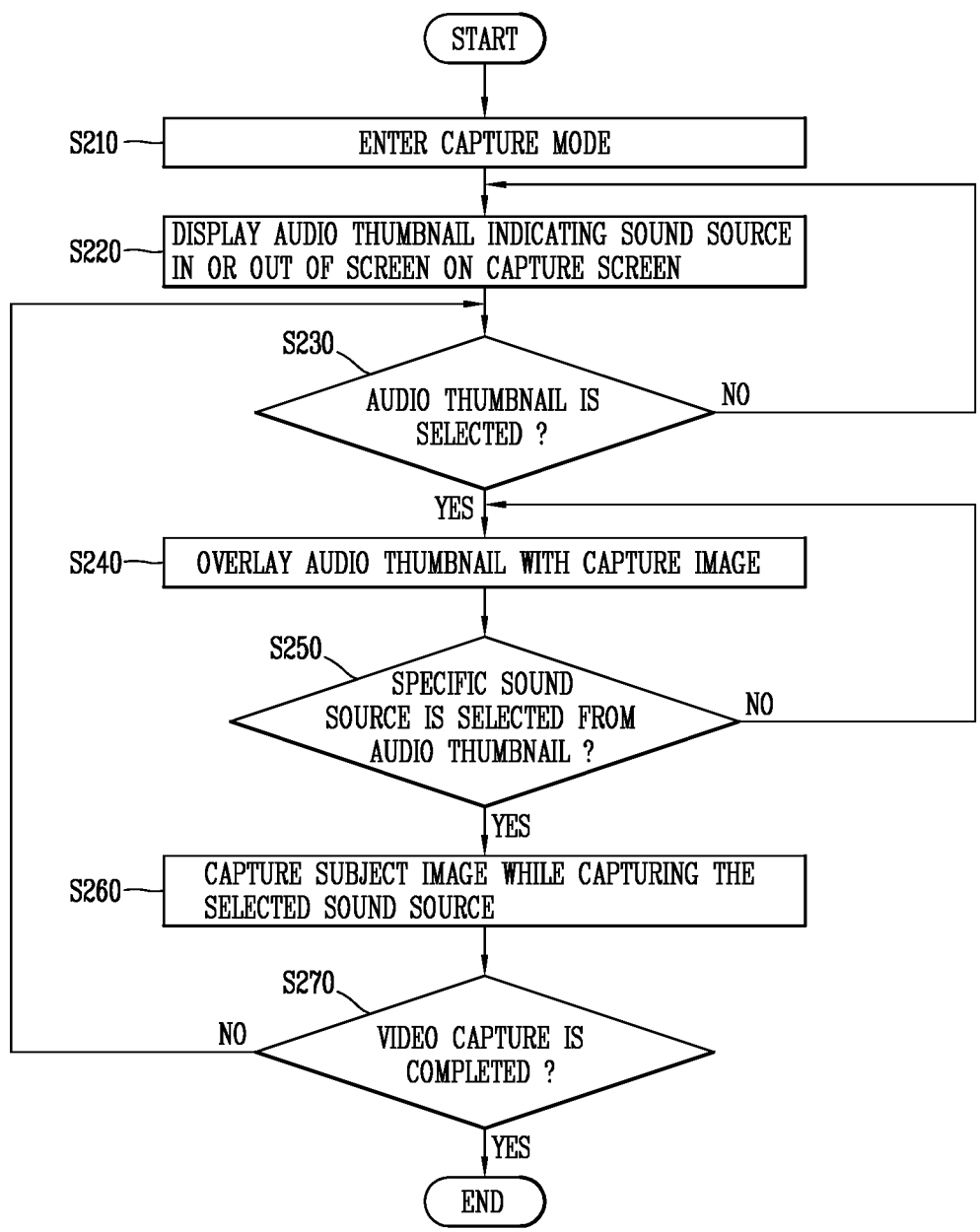
FIG. 28 is a flow chart illustrating an audio/video dual focusing method of a mobile terminal according to an embodiment of the present disclosure.

FIG. 28 is a flow chart illustrating an audio/video dual focusing method of a mobile terminal according to an embodiment of the present disclosure.

When the user selects a capture mode, the controller 180 may control the display unit 151 to display the subject focused by the user on the main screen (S210, S220).

The controller 180 automatically checks the location of a sound source existing in or out of the screen using a voice detecting/tracking algorithm and then displays the relevant sound source location on the audio thumbnail 200 in the form of an icon or sound source region (S230).

When the audio thumbnail 200 is selected by the user, the controller 180 enlarges the audio thumbnail 200 and then overlays the enlarged audio thumbnail 200 on the capture screen according to an augmented reality technique (S240). Since at least one or more sound source icons 202 and sound capture regions 203 indicating the locations of sound sources existing in and out of the screen are contained on the audio thumbnail 200, the user can easily know the number, location and direction of the sound sources and the intensity of the sound. The sound source icon 202 may be displayed in different shapes and colors from one another.

Then, the controller 180 checks whether or not a specific sound source is selected from the audio thumbnail 200 (S250), and forms a narrow audio directivity in the direction of the sound source through a beamforming technology to capture the subject while performing screen focusing on the subject when the specific sound source is selected, thereby performing audio/video dual focusing (S260). The selection of the specific sound source is carried out by selecting a specific audio icon 200 or sound capture region 203 or by the operation of dragging the audio icon 200 to the subject. The operation is repeatedly carried out until the capture operation is completed (S270).

The present disclosure has been described for an audio/video dual focusing method during the capturing phase for the sake of convenience of explanation, but it may not be necessarily limited to this, and may display the information (location, size and direction of a sound source) existing in or out of the screen while at the same time reproducing the subject located in the front surface direction during the reproduction phase, thereby allowing the user to edit sound capture for the subject. Accordingly, the foregoing all control operations for performing the audio/video dual focusing will be applicable thereto in the same manner during the reproduction phase.

Accordingly, the present disclosure may form a sound directivity at the sound location when a sound location exists at a different location from that of the subject desired to be captured or reproduced, thereby capturing the sound of the relevant subject in an optimal manner. In particular, the present disclosure displays the information (location, size and direction of a sound source) of the sound existing in or out of the screen while at the same time capturing the subject located in the front surface direction, thereby allowing the user to directly select a sound source desired to be captured to capture the sound of the subject.

Hereinafter, an audio zooming method while reproducing an image will be described in more detail.

The present disclosure may provide various sound capture methods combined with events during which the user selects the location, range and situation of subject of interest and an audio zooming technique to obtain an optimal image while reproducing an image.

The image during the reproduction phase may include both images stored to which an audio zooming technology is applied and images stored in a state that the audio zooming technology is not applied thereto.

The control of the event or one or plurality of sound capture locations and ranges is carried out through a contact or non-contact scheme such as the user's behavior or gesture to the reproduced image. An input due to the contact or non-contact scheme may include a single touch, a multi touch, a multi-point touch, a flicking, and a touch & drag.

The reproduced image may be displayed on the display unit of the mobile terminal or displayed on a hologram in a separate manner from the mobile terminal. The foregoing input and display methods will be commonly applied to all embodiments which will be described later.

As illustrated in FIG. 4, an image stored in the memory 160 in a reproduction mode is divided into audio information and image information again and output through the display unit 151 and audio output unit 152. Accordingly, an audio zooming technology will be applied to the divided audio information in a reproduction mode.

The present disclosure provides a scheme capable of automatically controlling the sound capture location and range of a sound in connection with the user's edit function (control operation) for a specific region in a reproduction mode. The user's edit function may include an enlargement function, a removal function and focus readjustment function.

Furthermore, the present disclosure provides a scheme capable of automatically controlling the sound capture location and range of a sound in connection with the user's feedback when reproducing an image captured in a dual recoding mode. In other words, the location and size of the sound sources of subjects captured through the front/rear camera is readjusted in connection with the user's feedback. The user's feedback may include the selection and enlargement functions of a specific image as a view function.

Figure 29:
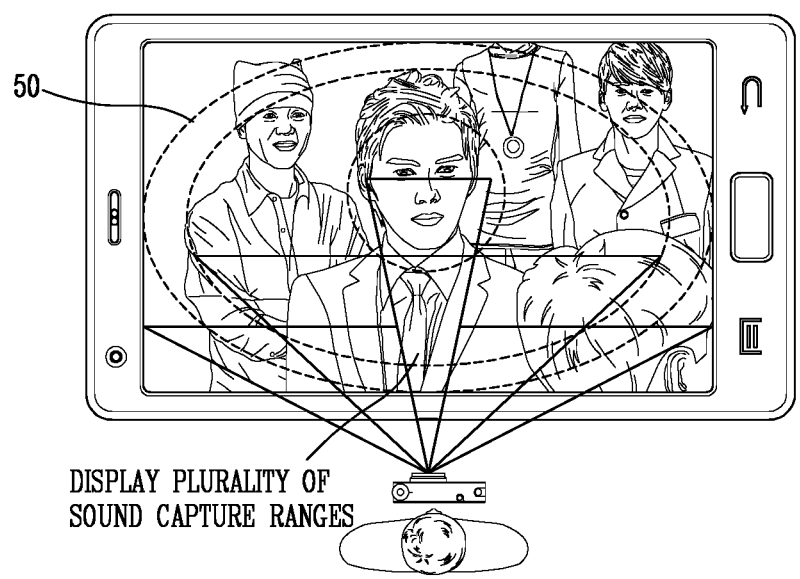
FIG. 29 is an example of displaying a plurality of selectable sound capture ranges while reproducing video.

FIG. 29 is an example of displaying a plurality of selectable sound capture ranges while reproducing video (the same as FIG. 9C).

As illustrated in FIG. 29, the sound capture range 50 on the reproduced screen is displayed with a predetermined shape (sound capture region) on the screen as a horizontal directional range formed by an angle of the sound beam formed in the direction of the subject of interest, namely, a sound capture angle. The sound beam exhibits a directivity to the subject of interest.

The sound capture range 50 is increased as increasing the sound capture angle, and thus the sound can be captured in a wide range, but the sound capture range 50 is decreased as decreasing the sound capture angle, and thus the sound can be concentratedly captured in a narrow range.

When the user starts the reproduction of a specific image in a reproduction mode, the sound capture range 50 set to the relevant image or at least one of or a plurality of selectable sound capture ranges may be displayed according to the kind of the reproduced image. For example, a plurality of selectable sound capture ranges may be displayed along with the preset sound capture range 50 when the reproduced image is a stored image to which a zooming technology has previously applied, and the plurality of selectable sound capture ranges may be displayed as default when the zooming technology is not applied.

The displayed sound capture range 50 may be configured with a predetermined shape (for example, circle, rectangle or polygon) or formed according to a touched and dragged shape. The sound capture range 50 automatically provided during the reproduction phase and the sound capture range 50 directly configured by the user may be controlled in their location movement and size control according to the user's touch input. In particular, the meaning of controlling a sound capture angle is used in a similar manner to that of controlling the sound capture range 50 (sound capture region).

Figure 30:
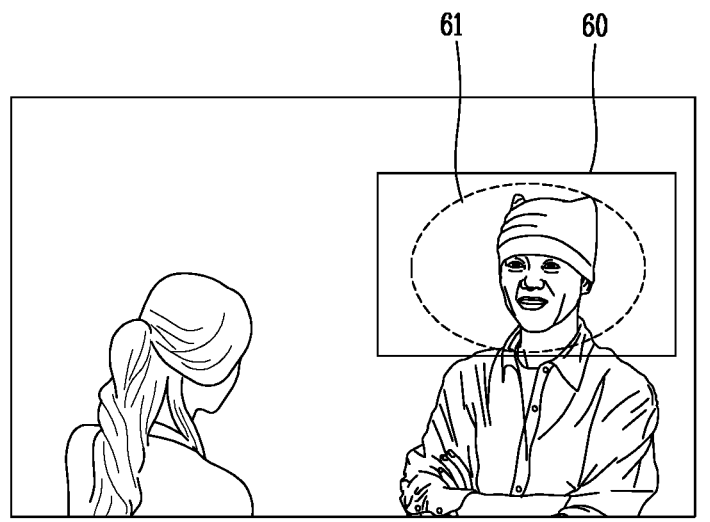
FIG. 30 is an example of displaying a sound capture method in connection with a region enlargement function in a reproduction mode according to an embodiment of the present disclosure.
Figure 30:
Figure 30:

FIG. 30 is an example of displaying a sound capture method in connection with a specific region enlargement function in a reproduction mode according to an embodiment of the present disclosure.

The user may observe the relevant region in more detail by specifying and enlarging a partial region of the specific subject (for example, person) in real time while reproducing video. In this case, the present disclosure controls the sound capture location and range in connection with the enlargement of a partial region of the image during the reproduction phase.

In other words, when the user selects a subject to be enlarged from the reproduced image or configures an enlargement region 60, the controller 180 automatically configures a sound capture range 61 at the location and range corresponding to the selected subject or the enlargement region 60. The enlargement region 60 may be configured by a menu selection or touch gesture.

When the selection region 60 is enlarged, the controller 180 enlarges and reproduces the relevant region 60 in real time, and forms a directivity in the sound capture range 61 corresponding to the enlarged selection region 60, thereby outputting a sound and voice generated from the enlargement region 60 in an optimal manner.

Accordingly, the present disclosure allows the reproduced image to be operated in connection with a specific region enlargement function, thereby having an effect of separating/amplifying (enlarging) only the sound source of a specific subject. For an example, it may be possible to provide a function of separating and then retrieving only music.

Figure 31:
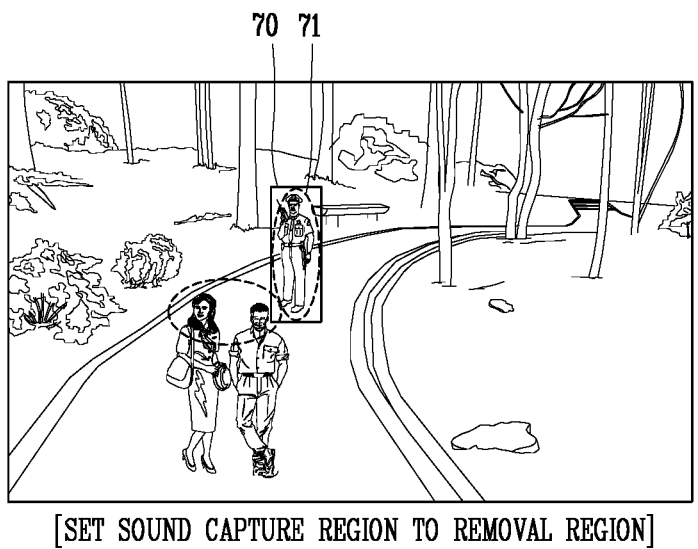
FIG. 31 is an example of displaying a sound capture method in connection with a region removal function in a reproduction mode according to an embodiment of the present disclosure.
Figure 31:
Figure 31:

FIG. 31 is an example of displaying a sound capture method in connection with a region removal function in a reproduction mode according to an embodiment of the present disclosure.

The user may remove a partial region of the specific subject while reproducing video to delete an unnecessary subject (edit). In this case, the present disclosure controls the sound capture location and range in connection with removing a partial region of the image.

As illustrated in FIG. 31, when the user selects the subject to be removed from the reproduced image or configures the removal region 70, the controller 180 automatically configures a sound capture range 71 at the location and range corresponding to the selected subject or the removal region 70. The removal region 70 may be configured by a menu selection or touch gesture.

When the removal operation is carried out, the controller 180 removes the subject contained in the removal region 70 in real time to remove a sound generated from the sound capture range 71 corresponding to the removal region 70 from the original sound stored in the memory 160 while at the same time reproducing video.

Accordingly, the present disclosure forms a directivity in the direction of the subject selected by the user, thereby removing a sound generated from the relevant region in an optimal manner.

Figure 32:
FIG. 32 is an example of displaying a sound capture method in connection with a focus readjustment function in a reproduction mode according to an embodiment of the present disclosure.
Figure 32:
Figure 32:

FIG. 32 is an example of displaying a sound capture method in connection with a focus readjustment function in a reproduction mode according to an embodiment of the present disclosure.

The user may readjust (move) the screen focus in real time based on a specific subject while reproducing video. In this case, the present disclosure forms a directivity to the focus readjusted subject to reproduce a sound and voice generated from the relevant subject in an optimal manner.

As illustrated in FIG. 32, when the user reconfigures the focus from the front side user to the rear side user (manual setting), the controller 180 automatically configures the sound capture range 81 in a location and range corresponding to the reconfigured focus region 80, and selectively reproduces only a sound genre rated from the sound capture range 81.

Accordingly, according to the foregoing embodiment, the present disclosure may form a directivity to the focus reconfigured subject to reproduce a sound and voice generated from the relevant subject in an optimal manner.

Figure 33:
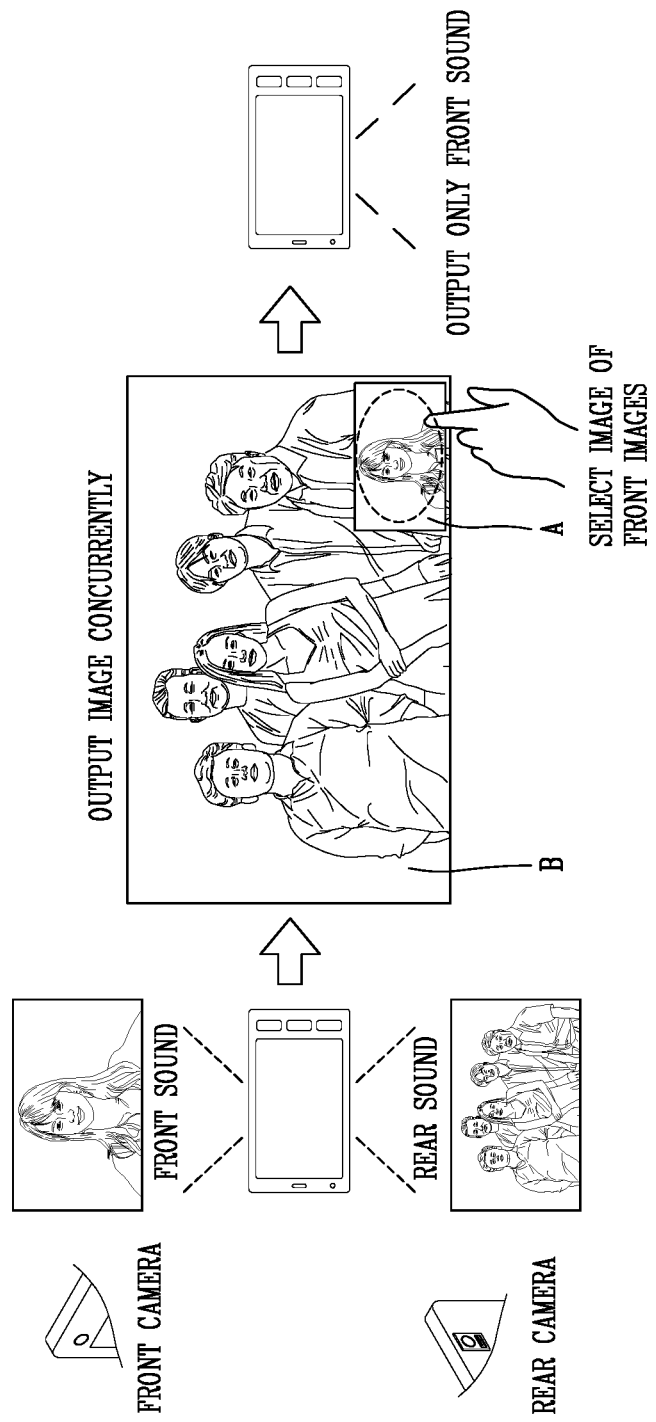
FIG. 33 is a view illustrating a sound capture method in connection with user feedback in a dual recording mode according to a first embodiment of the present disclosure.

FIG. 33 is a view illustrating a sound capture method in connection with user feedback in a dual recording mode according to a first embodiment of the present disclosure.

Single recording mode (or dual record mode) is a mode of receiving capture images of the front and the rear camera at the same time to capture one image on one screen while outputting it in a general capture mode, as illustrated in FIGS. 30 through 32.

On the contrary, dual recording mode is a mode of receiving capture images of the front and rear cameras at the same time to concurrently capture two images on one screen in full HD while at the same time outputting them. Accordingly, the present disclosure provides a scheme capable of selectively reproducing only the sound and voice of a specific image according to the user's selection when reproducing images captured in a dual recording mode.

Referring to FIG. 33, images captured by the front and rear cameras in a reproduction mode are displayed on one screen at the same time along with the sounds. At this time, it is assumed that images captured and stored by the front and rear cameras, respectively, are referred to as "A" and "B".

When the image of the camera in a specific direction is selected from the screen, the controller 180 configures the sound capture location and range of the sound in the relevant direction and then reproduces only a sound source generated in the selected direction from the stored original sound in real time. For example, when the image (A) of the front camera is selected, the controller 180 outputs only a sound generated from the front side in real time from the original sound.

Accordingly, the present disclosure has an effect of selectively reproducing only the sound and voice of a specific image according to the user's selection when displaying images captured by the front and rear cameras at the same time on one screen in a reproduction mode.

Figure 34:
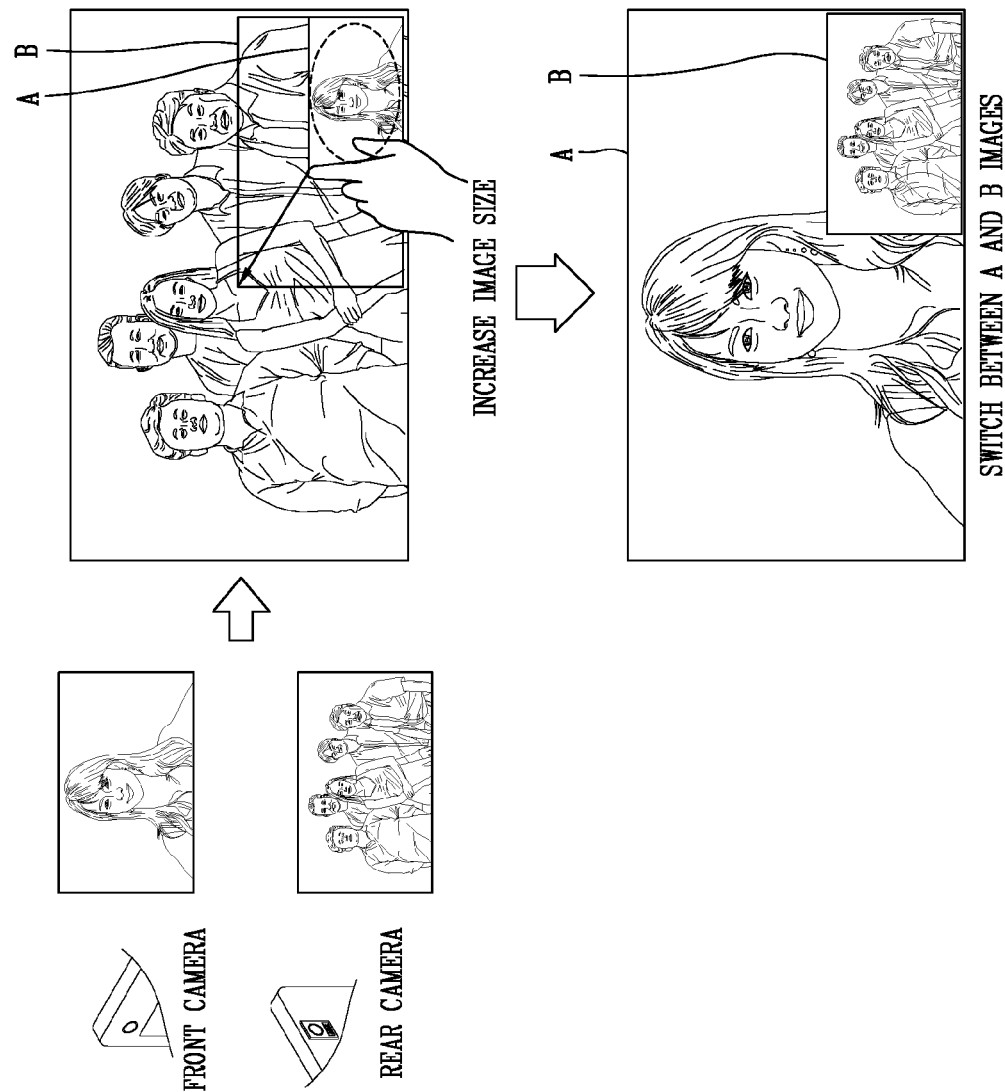
FIG. 34 is a view illustrating a sound capture method in connection with user feedback in a dual recording mode according to a second embodiment of the present disclosure.

FIG. 34 is a view illustrating a sound capture method in connection with user feedback in a dual recording mode according to a second embodiment of the present disclosure. The second embodiment is an example of controlling the sound capture location and range in connection with the size control of an image.

As illustrated in FIG. 34, images captured by the front and rear cameras in a reproduction mode are displayed on one screen at the same time along with the sounds. At this time, the image (A) captured by the front camera is displayed on a sub screen, and the image (B) captured by the rear camera is displayed on a main screen.

In a state that the two images (A, B) are displayed, the user may control the size of the sub image (A) using a touch (for example, touch & drag). When the size of the sub image (A) is increased or decreased, the controller 180 automatically increases or decreases the sound of the sub image (A) in proportion to the image size.

When the increased sub image exceeds a predetermined threshold range, the controller 180 performs the screen display switching of two images, thereby displaying the image (A) captured by the front camera on a main screen, and displaying the image (B) captured by the rear camera on a sub screen.

Accordingly, according to the foregoing embodiment, the present disclosure has an advantage of providing various view points to the user.

Figure 35A:
FIGS. 35A and 35B are views illustrating a sound capture method in connection with user feedback in a dual recording mode according to a third embodiment of the present disclosure.
Figure 35A:
Figure 35A:
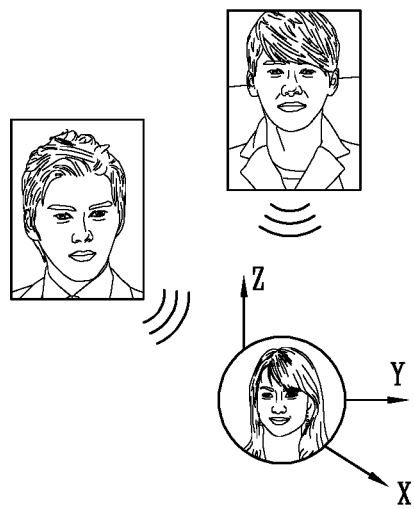
Figure 35B:
Figure 35B:
Figure 35B:
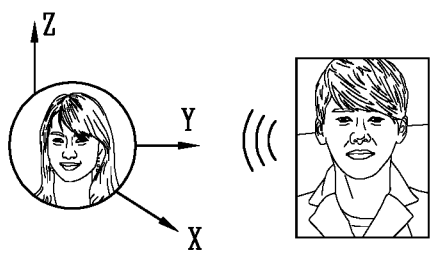
Figure 35B:
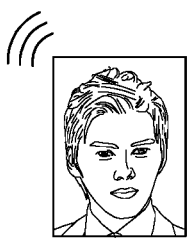

FIGS. 35A and 35B are views illustrating a sound capture method in connection with user feedback in a dual recording mode according to a third embodiment of the present disclosure. The third embodiment is an example of readjusting the generation location of a sound source in connection with the location of an image.

As illustrated in FIG. 35A, the location of the image (A) of the front camera is set to a reference location of the user (listener). The controller 180 forms the directivity of the sound source in a similar manner that the actual shooter listens to the sound at an arbitrary location between the subjects to reconfigure a location between the sound sources of the subjects in a stereoscopic manner.

For example, as illustrated in FIG. 35A, when the image (A) of the front camera is located at the lower right portion of the screen, the controller 180 recognizes that the user is located at the lower right portion thereof and allows the sound source directivity of the subject contained in the image (B) of the rear camera to face the lower right portion thereof. Then, when the image (A) of the front camera is moved to the upper left portion thereof, the controller 180 recognizes that the user is located at the upper left portion thereof and allows the sound source directivity of the subject contained in the image (B) of the rear camera to face the upper left portion thereof.

Accordingly, the present disclosure rearranges the locations of sound sources generated from the subjects according to the location change of the shooter in a spatial manner, namely, stereoscopic manner (for example, 3D sound effect using HRTF), thereby performing reproduction at various angles.

Hereinafter, an audio zooming method in a reproduction mode in a mobile terminal according to an embodiment of the present disclosure will be described below with reference to the accompanying drawings.

The audio zooming method in a reproduction mode refers to a method of applying various zooming techniques to the location or range setting of subjects of interest, camera mode, actual camera operation (zooming operation or focusing movement) to capture the sound or voice of the relevant subject in an optimal manner.

On the contrary, the audio zooming method in a reproduction mode refers to a method of automatically controlling the sound capture location and range of the sound in connection with a specific region enlargement/removal/focus readjustment function of the reproduction screen or in connection with a dual recording function. In particular, the size of the reproduced location and reproduced sound varies according to the sound capture location and range of the sound.

Figure 36:
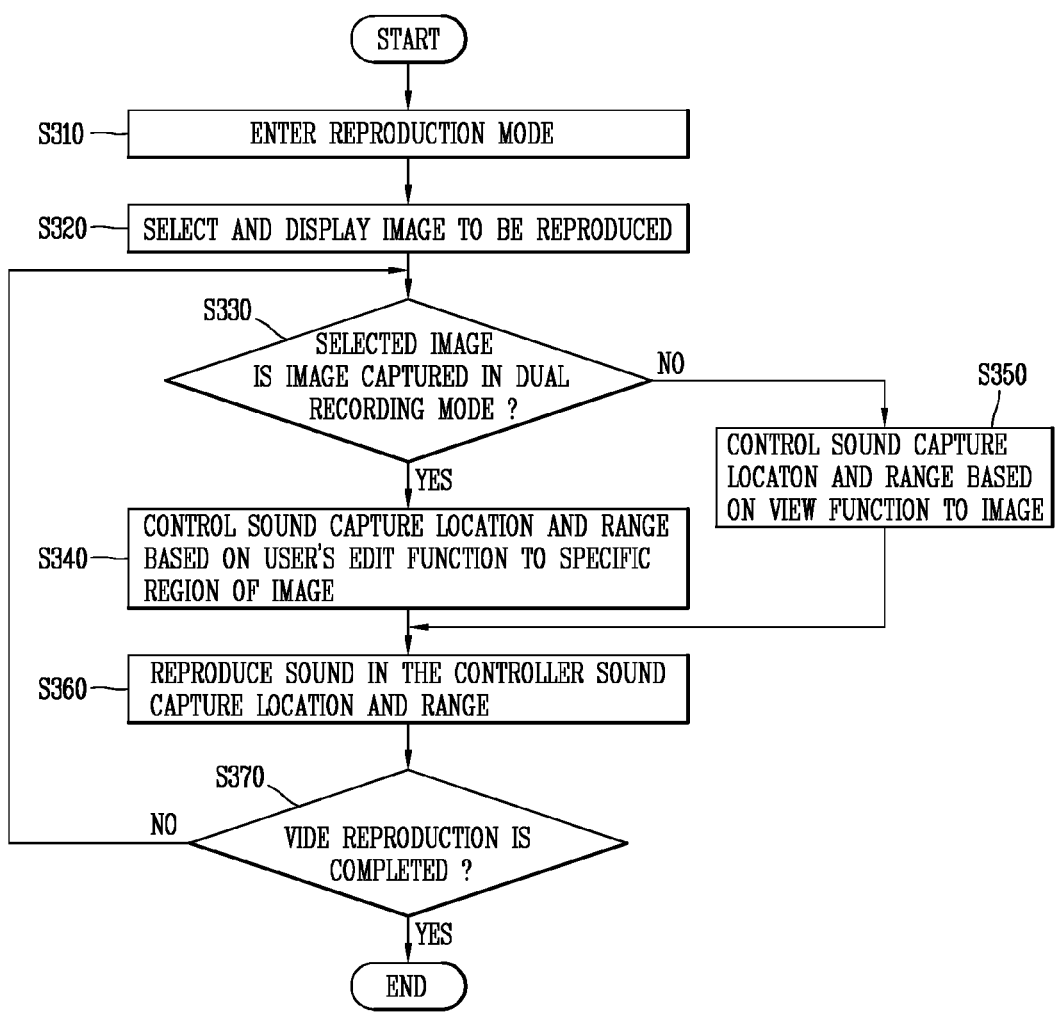
FIG. 36 is a flow chart illustrating an audio zooming method of a mobile terminal during the reproduction phase according to an embodiment of the present disclosure.

FIG. 36 is a flow chart illustrating an audio zooming method of a mobile terminal during the reproduction phase according to an embodiment of the present disclosure.

When the user selects a reproduction mode, the controller 180 retrieves one or more capture images from the memory 160 and displays them on the display unit 151 to allow the user to select them (S310, S320). The capture images are displayed in the form of an icon or list.

When a specific image to be reproduced is selected (S11), the controller 180 checks whether the relevant image is an image captured in a single recording mode (one camera) or an image captured in a dual recording mode (two cameras) (S330).

As a result of the check, when it is an image captured in a single recording mode, the controller 180 controls the sound capture location and range in connection with the user's edit function (e.g., enlargement, removal and focus readjustment) to a specific region of the image (S340).

For example, a sound capture region is automatically set to the relevant region to reproduce only the sound of the subject generated from the relevant region when the user selects a region to be enlarged (FIG. 29), and a sound capture region is automatically set to remove the sound and voice of the subject generated from the relevant region when the user selects a region to be removed (FIG. 30). Furthermore, when the focus is readjusted from the image to another subject, a sound capture region is automatically set to the focus region to reproduce only the sound of the subject generated from the relevant region (FIG. 31).

On the contrary, when the selected image is an image captured in a dual recording mode as a result of the check, the controller 180 adjusts the sound capture location and range or adjusts the generation location of a sound source in connection with the user's view function (e.g., image selection, image size or location adjustment) to one image (S350).

Accordingly, the controller 180 reproduces the sound and voice of the subject in an optimal manner at the controlled sound capture location and range or the generation location of the sound source (S360), and such a series of operations are repeatedly carried out unless the reproduction operation is not completed (S370).

Furthermore, part or all of the audio zooming method of a reproduced image while reproducing the image may be selectively carried out even when capturing the image. In other words, sound capture in connection with the user's event during the reproduction phase may be all applied to the capturing phase.

As described above, the present disclosure performs events allowing the user to configure the location, range and situation of subjects of interest to obtain an optimal image in a capture and reproduction mode, in other words, the user allows a directivity to face the location of the subject or optimizes a sound capture range automatically in connection with the location and size of the subject closed up or focused by the user, thereby capturing or reproducing the sound or voice of the subject of interest in an optimal manner as well as minimizing the inconvenience of the related art in which sound sources desired to be captured are manually pointed one by one. In particular, the present disclosure provides an expression technology in which the user can control one or a plurality of sound capture locations and ranges in a delicate and convenient manner without being collided with the basic scenario of a camera for controlling zoom magnification or the like, thereby capturing or reproducing the sound or voice of the subject of interest in an optimal manner.

Furthermore, according to the present disclosure, when there exists a sound location at a different location from that of the subject desired to be captured or reproduced, a sound directivity is formed at the location of the sound location, thereby capturing the sound of the relevant subject in an optimal manner (audio/video dual focusing). In particular, the present disclosure displays the information (location, size and direction of a sound source) of the sound existing in or out of the screen while at the same time capturing the subject located in the front surface direction, thereby allowing the user to directly select a sound source desired to be captured to capture the sound of the subject.

Furthermore, according to the present disclosure, the capture location and range of the sound may be automatically controlled in connection with the user's input for a specific region edit function on the reproduced screen, and the capture location and range of the sound source of the subjects captured through the front and rear cameras may be readjusted, thereby performing optimal sound source reproduction in a reproduction mode.

According to an embodiment of the present disclosure, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, transmission via the Internet). The computer may include the controller of the terminal.

The configurations and methods according to the above-described embodiments will not be applicable in a limited way to the foregoing terminal and audio zooming method thereof, and all or part of each embodiment may be selectively combined and configured to make various modifications thereto.

What is claimed is:

1. An audio zooming method of a mobile terminal, the method comprising:
configuring a sound capture range of a subject in a predetermined capture mode;
capturing the sound of the subject in the configured sound capture range;
changing a sound capture angle to automatically control the sound capture range when an event for changing the capture location or range or capture mode of the subject occurs during the capturing phase; and
capturing the sound of the subject in the controlled sound capture range,
wherein the sound capture range is configured with a preset size and shape around a touch position when a specific subject is long touched or configured according to the shape and size of a touch movement when the surrounding of the specific subject is touched and dragged.

2. The method of claim 1, wherein the sound capture range is automatically set to a predetermined size and shape at a preset location when selecting a general capture mode, and
wherein the user event comprises screen zoom in/out or a change of a capture mode.

3. The method of claim 1, wherein the sound capture angle is automatically changed according to a screen zoom magnification when the event is screen zoom in/out, and the sound capture angle is automatically changed according to the selection of a specific capture mode or front/rear surface capture mode when the event is a change of a capture mode.

4. The method of claim 3, wherein the change of the capture mode comprises a change to a landscape mode, a portrait mode, a street mode, a stereo mode and a hearing aid mode in a basic capture mode.

5. The method of claim 1, wherein the configured sound capture range can be enlarged or reduced according to a touch input, and
wherein the variation limit information of a sound capture enabled range is displayed when enlarging or reducing the sound capture range.

6. The method of claim 5, wherein the variation limit information of the sound capture enabled range comprises one of a size bouncing effect in which the size is changed and then restored, a shape bouncing effect in which the shape is change and then restored, a color bouncing effect in which the color is change and then restored, and an effect of generating a predetermined sound or vibration when the sound capture enable region approaches the minimum/maximum value.

7. The method of claim 1, further comprising:
readjusting the display location of the sound capture range to a focus region reconfigured by an auto focusing fraction when the event is screen zoom in/out.

8. The method of claim 1, further comprising:
displaying a plurality of preset sound capture ranges on the screen when the event is screen zoom in/out; and
readjusting and display the number of sound capture enabled regions when the screen zoom in/out is completed.

9. The method of claim 1, further comprising:
changing a sound capture object by automatically forming a screen focus on a subject generating a sound when a plurality of subjects generate sounds; and
outputting a visual and auditory effect is output to prevent the disconnection of a sound when changing the sound capture object,
wherein the visual and auditory effect comprises a sound capture range movement and its related sound effect or fade in/out and its related sound effect on the screen.

10. The method of claim 9, wherein said changing the sound capture object comprises:

recognizing a user's face using a face recognition technique;

forming a sound capture range according to the size of the recognized face to sense a sound generated from each user; and automatically forming a screen focus on a face generating a sound or a face generating the loudest sound to capture the relevant user's voice.

11. A mobile terminal, comprising:
a display unit configured to display a screen containing a target subject;
a memory configured to store information associated with capture; and
a controller configured to automatically control a sound capture range to capture the sound of the subject when an event for changing the capture location or range or capture mode of the subject occurs during the subject capturing,
wherein the controller configures the sound capture range with a preset size and shape around a touch position when a specific subject is long touched or configures the sound capture range according to the shape and size of a touch movement when the surrounding of the specific subject is touched and dragged.

12. The mobile terminal of claim 11, wherein the sound capture range is automatically set to a predetermined size and shape at a preset location when selecting a general capture mode, and
wherein the user event comprises screen zoom in/out or a change of a capture mode.

13. The mobile terminal of claim 11, wherein the controller automatically changes a sound capture angle according to a screen zoom magnification when the event is screen zoom in/out, and automatically changes the sound capture angle according to the selection of a specific capture mode or front/rear surface capture mode when the event is a change of a capture mode, and
wherein the change of the capture mode comprises a change to a landscape mode, a portrait mode, a street mode, a stereo mode and a hearing aid mode in a basic capture mode.

14. The mobile terminal of claim 11, wherein the controller enlarges or reduces the sound capture range according to a touch input, and displays the variation limit information of a sound capture enabled range when enlarging or reducing the sound capture range.

15. The mobile terminal of claim 14, wherein the variation limit information of the sound capture enabled range comprises one of a size bouncing effect in which the size is changed and then restored, a shape bouncing effect in which the shape is change and then restored, a color bouncing effect in which the color is change and then restored, and an effect of generating a predetermined sound or vibration when the sound capture enable region approaches the minimum/maximum value.

16. The mobile terminal of claim 11, wherein the controller readjusts the display location of the sound capture range to a focus region reconfigured by an auto focusing function when the event is screen zoom in/out.

17. The mobile terminal of claim 11, wherein the controller displays a plurality of preset sound capture ranges on the screen when the event is screen zoom in/out; and readjusts and displays the number of sound capture enabled regions when the screen zoom in/out is completed.

18. The mobile terminal of claim 11, wherein the controller changes a sound capture object by automatically forming a screen focus on a subject generating a sound when a plurality of subjects generate sounds, and outputs a visual and auditory effect to prevent the disconnection of the sound when changing the sound capture object, and
wherein the visual and auditory effect comprises extending the sound capture range of a previous subject to an entire screen and then gradually configuring a sound capture region to another subject.

19. The mobile terminal of claim 18, wherein the controller forms a sound capture range according to the size of a face recognized using a face recognition technique to sense a sound generated from each user and then automatically forms a screen focus on a face generating a sound or a face generating the loudest sound to capture the relevant user's voice.

20. An audio zooming method of a mobile terminal, the method comprising:
capturing a subject focused in a capture mode;
automatically recognizing sound sources in or out of the screen that outputs the sound of the subject and displaying the recognized sound sources on an audio thumbnail at one side of the screen;
performing audio focusing by forming a directivity on a sound source selected by the user on the audio thumbnail; and
capturing the audio focused sound source.

21. The method of claim 20, wherein the audio thumbnail is displayed in a semi-transparent to display the location and size of a sound source existing in and out of the screen, and enlarged during the touch phase to be overlaid on a capture image.

22. The method of claim 20, wherein a sound source in the screen is displayed as a sound capture region, and sound sources out of the screen are displayed as an sound source icon on the audio thumbnail.

23. The method of claim 22, wherein the sound source icon indicates the direction and location of a sound source and the size of the sound, and has a different shape and color.

24. A mobile terminal, comprising:
a display unit configured to display an image focused on a subject in a capture mode; and
a controller configured to automatically recognize a sound source in or out of the screen for outputting the sound of the subject to display it on an audio thumbnail at one side of the screen, and perform audio focusing on a sound source selected by the user on the audio thumbnail to capture the relevant sound source.

25. The mobile terminal of claim 24, wherein the controller enlarges the audio thumbnail and overlays the enlarged audio thumbnail on a capture image when the audio thumbnail is selected.

26. The mobile terminal of claim 24, wherein the audio thumbnail is displayed in a semi-transparent to display the location and size of sound sources existing in and out of the screen, and
wherein the sound source in the screen is displayed as a sound capture region, and the sound sources out of the screen are displayed as a sound source icon on the audio thumbnail.

27. The mobile terminal of claim 26, wherein the controller displays the sound source icon to correspond to the location of the sound source, and adds or deletes a sound source icon according to the addition or deletion of the sound source.

* * * * *